United States Patent
Wilson, Jr. et al.

(10) Patent No.: US 12,169,800 B2
(45) Date of Patent: Dec. 17, 2024

(54) SYSTEM FOR MAPPING MODEL, COST, AND SCHEDULE OF LARGE-SCALE CAPITAL PROJECTS

(71) Applicant: Hexagon Technology Center GmbH, Heerbrugg (CH)

(72) Inventors: Odell Gene Wilson, Jr., Madison, AL (US); Catherine Elaine Hayes, Roswell, GA (US); Alain Mouyal, Huntsville, AL (US); Suhas Sahebrao Jadhal, Dubai (AE)

(73) Assignee: Hexagon Technology Center GmbH, Heerbrugg (CH)

( * ) Notice: Subject to any disclaimer, the term of this patent is extended or adjusted under 35 U.S.C. 154(b) by 0 days.

(21) Appl. No.: 16/863,666

(22) Filed: Apr. 30, 2020

(65) Prior Publication Data

US 2021/0342761 A1 Nov. 4, 2021

(51) Int. Cl.
  *G06Q 10/0631* (2023.01)
  *G06F 30/13* (2020.01)
  *G06F 111/02* (2020.01)

(52) U.S. Cl.
  CPC ....... *G06Q 10/06313* (2013.01); *G06F 30/13* (2020.01); *G06F 2111/02* (2020.01); *G06Q 10/06314* (2013.01)

(58) Field of Classification Search
  None
  See application file for complete search history.

(56) References Cited

U.S. PATENT DOCUMENTS

| | | | |
|---|---|---|---|
| 7,496,487 | B2 | 2/2009 | Wakelam et al. |
| 7,593,751 | B2 | 9/2009 | Barbosa et al. |

(Continued)

FOREIGN PATENT DOCUMENTS

| | | |
|---|---|---|
| KR | 10-2013-0082872 A | 7/2013 |
| KR | 10-2013-0130100 A | 12/2013 |

(Continued)

OTHER PUBLICATIONS

Kalagnanam et al, A system for automated mapping of bill-of-materials part numbers, 10th ACM SIGKDD international conference on Knowledge discovery and data mining, p. 805-810, Aug. 22 2004 https://dl.acm.org/doi/abs/10.1145/1014052.1016918 (Year: 2004).*

(Continued)

*Primary Examiner* — Octavian Rotaru
(74) *Attorney, Agent, or Firm* — Nutter McClennen & Fish LLP

(57) ABSTRACT

A system includes a model database configured to contain model items representing capital project components. Each model item has at least one model item code. The system includes a schedule database configured to contain schedule items representing a portion of a construction schedule. Each schedule item has at least one schedule item code. The system additionally includes a cost database configured to contain cost items representing a cost for the portion of the construction schedule and/or the capital project components. Each cost item has at least one cost item code. A rules engine is configured to receive a rule for mapping model items, schedule items, and cost items. The rule includes a code sequence related to the model item, the schedule item, and the cost item. A mapping engine communicates with the model, schedule, and cost databases to map model, schedule, and cost based on the rules.

18 Claims, 53 Drawing Sheets

(56) References Cited

U.S. PATENT DOCUMENTS

| | | | |
|---|---|---|---|
| 7,853,463 | B2 | 12/2010 | Orifici et al. |
| 7,908,164 | B1* | 3/2011 | Verma ................ G06Q 10/06 700/106 |
| 2001/0047250 | A1* | 11/2001 | Schuller ............. G06T 15/04 703/1 |
| 2002/0165701 | A1* | 11/2002 | Lichtenberg ......... G06F 30/15 703/7 |
| 2002/0188528 | A1* | 12/2002 | Adelman ........... G06Q 10/087 705/28 |
| 2003/0101168 | A1* | 5/2003 | Chow ............... G06Q 10/087 |
| 2005/0289051 | A1* | 12/2005 | Allin ................. G06Q 10/00 705/40 |
| 2014/0229212 | A1* | 8/2014 | MacElheron .. G06Q 10/063114 705/7.17 |
| 2014/0244019 | A1* | 8/2014 | Zhang .............. G06Q 10/0875 700/107 |
| 2015/0324940 | A1* | 11/2015 | Samson .......... G06Q 10/06313 705/7.23 |
| 2017/0192777 | A1* | 7/2017 | Apte ..................... G06F 8/76 |
| 2018/0026654 | A1* | 1/2018 | Gopal .................. G06F 3/0664 |
| 2018/0204170 | A1* | 7/2018 | Kao ..................... G06F 7/026 |
| 2020/0134560 | A1* | 4/2020 | McLinden ............. G06T 17/05 |
| 2020/0342378 | A1* | 10/2020 | McCormick ..... G06Q 10/06313 |
| 2021/0081865 | A1* | 3/2021 | Darmour ......... G06Q 10/06315 |
| 2021/0304121 | A1* | 9/2021 | Lee ........................ G06N 5/04 |

FOREIGN PATENT DOCUMENTS

| | | | | |
|---|---|---|---|---|
| KR | 10-2014-0077065 A | | 6/2014 | |
| WO | WO-2011091158 A2 * | | 7/2011 | ............. G06Q 10/06 |

OTHER PUBLICATIONS

[No Author Listed] Intergraph Smart Construction—Simple Real-time Construction Management (TV331). HxGN TV, dated Jun. 16, 2017. Retrieved from the Internet under https://www.youtube.com/watch?v=xe4cBv1uzK0 on Dec. 17, 2021. 1 page.

[No Author Listed] HxGN SMART Build: Digital Building Construction Management. HxGN TV, dated Oct. 27, 2017. Retrieved from the Internet under https://www.youtube.com/watch?v=rgRExOKe4fI on Dec. 17, 2021. 1 page.

[No Author Listed] How HxGN SMART Build Benefits Your Bottom Line (TV712). HxGN TV, dated Jun. 15, 2017. Retrieved from the Internet under https://www.youtube.com/watch?v=HASA1a_w2AU on Dec. 17, 2021. 1 page.

[No Author Listed] Hexagon PPM. YouTube, various videos. Retrieved from the Internet under https://www.youtube.com/c/HexagonPPM/videos on Dec. 17, 2021. 8 pages.

[No Author Listed] Hexagon AB Global, YouTube, various videos. Retrieved from the Internet under https://www.youtube.com/c/HexagonABGlobal/videos on Dec. 17, 2021. 20 pages.

[No Author Listed] SmartPlant® Enterprise For Owner Operators Core Solution. Hexagon PPM, Brochure, Nov. 2020. 2 pages.

[No Author Listed] SmartPlant Enterprise for Owner Operators. Hexagon PPM. Retrieved from the Internet under https://hexagonppm.com/offerings/products/smartplant-enterprise-for-owner-operators on Dec. 17, 2021.

[No Author Listed] BricsCAD. Wikipedia, last edited Nov. 12, 2021. Retrieved from the Internet under https://en.wikipedia.org/wiki/BricsCAD on Dec. 17, 2021. 5 pages.

International Search Report and Written Opinion for International Application No. PCT/US2021/021350, mailed Apr. 28, 2021 (14 pages).

[No Author Listed] Autodesk Anz, "Navisworks Manage QTO overview." Jan. 31, 2017. Retrieved from the Internet under https://www.youtube.com/watch?v=kXpib0n2t-Q&feature=youtu.be> May 29, 2020.

[No Author Listed] 5D Institut, "iTWO5D Tutorial: Vorgangsmodell Teil 2—Verknüpfung Terminplan mit LV." May 14, 2018. Retrieved from the Internet under https://www.youtube.com/watch?v=zddrgIOA970&feature=youtu.be on May 29, 2020.

[No Author Listed] HxGN Smart Build. Hexagon PPM, 2017. Published May 4, 2020. Retrieved from the Internet under https://docs.hexagonppm.com/reader/2DcJQ_cxCuDu1BOoajhxUg/bKLUsMChPHv6sH9Ge~dWYg on May 29, 2020.

[No Author Listed] Intergraph Smart® Review. Hexagon PPM, Version 2018. Published Oct. 29, 2019. Retrieved from the Internet under https://docs.hexagonppm.com/reader/T5bWW-OupNgXf2cOunWQ57A/KJTIrfNTM8IjSQpz2_u5yA on May 29, 2020.

[No Author Listed] Navisworks®. Autodesk, 2017. Retrieved from the Internet under https://www.autodesk.com/products/navisworks/overview?plc=NAVSIM&term=1-YEAR&support=ADVANCED&quantity=1 on May 29, 2020.

[No Author Listed] RIB, iTWO. Retrieved form the Internet under https://www.rib-software.co.uk/itwo on May 29, 2020.

[No Author Listed] VICO office R6.8. Trimble. Oct. 2019. Retrieved from the Internet under http://support.vicosoftware.com/FlareFiles/Content/Online%20Help/Vico%20Office%20Introduction.htm on May 29, 2020.

* cited by examiner

| Reports | User | Configure Enterprise Data Integration Admin |
|---|---|---|

• Project Period: 2019-10

| BAC Hours | BAC Cost | Progress Method | Physical % Complete | Preview % Complete | % Complete | Earned Hours | Earned Cost |
|---|---|---|---|---|---|---|---|
| 0 | 2,314,718 | | | 0.0 | 0.0 | | 2,314,718 |
| 0 | 462,944 | Physical % Complete | 100.0 | 100.0 | 0.0 | | 462,944 |
| 0 | 694,415 | Physical % Complete | 100.0 | 100.0 | 0.0 | | 694,415 |
| 0 | 462,944 | Physical % Complete | 100.0 | 100.0 | 0.0 | | 462,944 |
| 0 | 694,415 | Physical % Complete | 100.0 | 100.0 | 0.0 | | 694,415 |
| 0 | 1,597,460 | | | 0.0 | 0.0 | | 738,184 |
| 0 | 424,365 | Physical % Complete | 77.5 | 77.5 | 0.0 | | 328,883 |
| 0 | 324,365 | Physical % Complete | 57.5 | 57.5 | 0.0 | | 186,510 |
| 0 | 424,365 | Physical % Complete | 52.5 | 52.5 | 0.0 | | 222,792 |
| 0 | 424,365 | Physical % Complete | 0.0 | 0.0 | 0.0 | | 0 |

*FIG. 20B Continued*

| Path ID | Name | BAC Cost | PV Cost |
|---|---|---|---|
| PRj-000020 | Manhattan | 16,424,377 | 4,300,040 |
| PRj-000020.01 | Engineering | 4,172,028 | 1,967,743 |
| PRj-000020.01.CV | Civil | 1,495,138 | 667,579 |
| PRj-00020.01.CV.A1 | Natural Gas Liquids | 401,234 | 154,544 |
| PRj-00020.01.CV.A2 | Refining Area | 217,600 | 143,143 |
| PRj-00020.01.CV.A3 | Steam Generation | 260,200 | 145,529 |
| PRj-00020.01.CV.A4 | Sulphur Recovery | 291,000 | 97,927 |
| PRj-00020.01.CV.A5 | Utility Area | 316,600 | 122,435 |
| PRj-000020.01.EL | Electrical | 510,120 | 242,935 |
| PRj-00020.01.EL.A1 | Natural Gas Liquids | 117,010 | 44,588 |
| PRj-00020.01.EL.A2 | Refining Area | 92,030 | 73,011 |
| PRj-00020.01.EL.A3 | Steam Generation | 104,290 | 55,128 |
| PRj-00020.01.EL.A4 | Sulphur Recovery | 91,170 | 32,675 |
| PRj-00020.01.EL.A5 | Utility Area | 98,090 | 29,583 |
| PRj-000020.01.HS | Health, Safety, & Environment | 3,800 | 1,834 |

Rows 1 - 20 of 80  Show All  Page Size 10

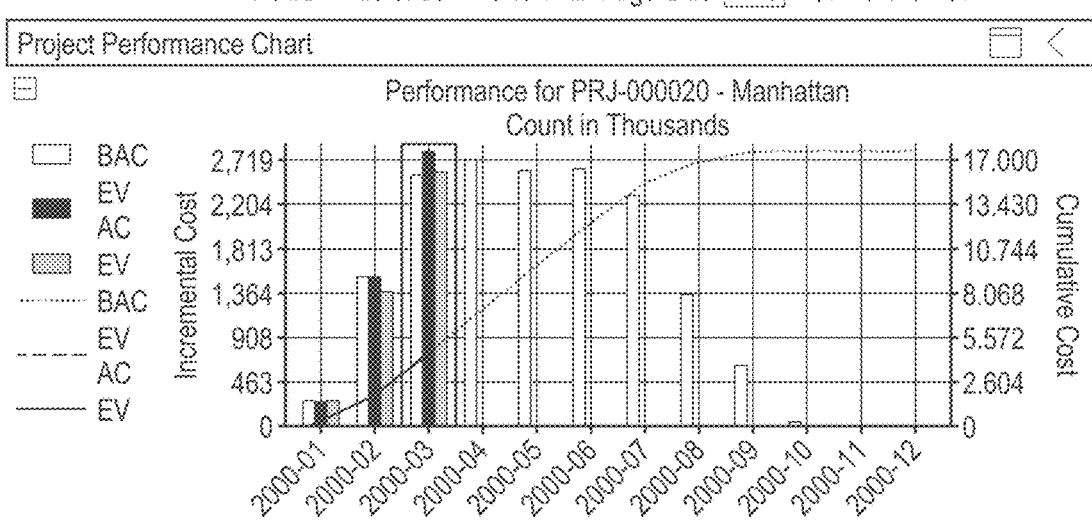

FIG. 20C

Enterprise Data  Configuration  Integration

* Chart End Period: Mar 2020

| % Complete | EV AC Cost | EV Cost | EV Cost* | CPI Cost | SPI Cost | TCPI Cost | TSPI Cost |
|---|---|---|---|---|---|---|---|
| 25.5 | 4,557,327 | 4,232,960 | 4,232,363 | 0.93 | 0.94 | 1.03 | 1.01 |
| 46.5 | 2,060,318 | 1,939,570 | 1,920,579 | 0.94 | 0.99 | 1.06 | 1.01 |
| 43.8 | 728,608 | 655,400 | 655,400 | 0.90 | 0.98 | 1.10 | 1.01 |
| 42.0 | 168,143 | 168,772 | 168,772 | 1.00 | 1.06 | 1.00 | 0.96 |
| 66.0 | 184,436 | 143,614 | 143,616 | 0.71 | 1.00 | 2.23 | 0.99 |
| 48.0 | 142,428 | 127,490 | 127,490 | 0.89 | 0.88 | 1.14 | 1.16 |
| 34.0 | 100,370 | 101,424 | 101,424 | 1.01 | 1.04 | 0.99 | 0.98 |
| 36.0 | 132,211 | 113,976 | 113,976 | 0.86 | 0.93 | 1.10 | 1.04 |
| 45.5 | 246,406 | 231,982 | 231,982 | 0.94 | 0.96 | 1.06 | 1.03 |
| 35.0 | 44,365 | 45,634 | 45,634 | 1.03 | 1.02 | 0.90 | 0.99 |
| 68.0 | 73,455 | 63,152 | 63,152 | 0.86 | 0.86 | 1.55 | 1.50 |
| 50.0 | 58,624 | 54,640 | 54,540 | 0.92 | 0.99 | 1.10 | 1.01 |
| 40.0 | 38,176 | 36,740 | 34,740 | 0.94 | 0.95 | 1.03 | 1.04 |
| 32.0 | 30,382 | 31,709 | 31,709 | 1.04 | 1.07 | 0.98 | 0.97 |
| 48.0 | 2,062 | 1,824 | 1,824 | 0.99 | 0.97 | 1.13 | 1.03 |

*FIG. 20C Continued*

| Cost Variance | Schedule Variance | IEAC1 Cost | IEAC2 Cost | IEAC3 Cost | IEAC4 Cost |
|---|---|---|---|---|---|
| (318,258) | (57,870) | 17,874,684 | 17,740,390 | 18,182,735 | 16,942,735 |
| (120,799) | (28,184) | 4,431,738 | 4,409,637 | 4,466,197 | 4,292,767 |
| (73,120) | (12,091) | 1,661,921 | 1,645,163 | 1,679,138 | 1,567,258 |
| (429) | 10,228 | 400,340 | 397,542 | 316,268 | 401,209 |
| (40,840) | 451 | 279,479 | 274,296 | 279,180 | 258,440 |
| (15,930) | (18,031) | 292,710 | 292,143 | 313,822 | 276,130 |
| 1,256 | 3,719 | 295,207 | 294,231 | 288,076 | 297,444 |
| (18,235) | (8,451) | 367,252 | 363,558 | 384,606 | 334,835 |
| (14,524) | (9,053) | 542,071 | 540,734 | 553,614 | 524,644 |
| 1,265 | 1,085 | 113,766 | 113,834 | 112,176 | 115,745 |
| (10,504) | (9,054) | 108,316 | 108,255 | 113,728 | 103,374 |
| (4,984) | (488) | 119,248 | 118,291 | 119,781 | 114,264 |
| (1,628) | (1,067) | 95,940 | 96,012 | 98,865 | 93,480 |
| 1,237 | 2,116 | 94,543 | 94,601 | 90,635 | 97,763 |
| (228) | (60) | 4,274 | 4,395 | 4,348 | 4,028 |

SYSTEM FOR MAPPING MODEL, COST, AND SCHEDULE OF LARGE-SCALE CAPITAL PROJECTS

FIELD OF THE INVENTION

Various embodiments of the invention generally relate to large-scale capital projects and, more particularly, various embodiments relate to systems for mapping model items, schedule items and cost items of large-scale capital projects.

BACKGROUND OF THE INVENTION

Design, construction, and management of large-scale building and civil infrastructure capital projects, such as airports, hospitals, tall buildings, bridges & tunnel, and road projects. Large-scale capital projects, require coordination of processes and configuration data on a scale that is orders of magnitude greater than those of smaller, common projects (e.g., building and selling a ten room house). Large-scale capital projects consequently often require a substantially more comprehensive production and management solution.

In response to this need, those skilled in the art have developed comprehensive building and civil infrastructure design program that is specially configured for the rigors of such large capital projects. Among other things, this type of building and civil infrastructure design program can be implemented as a broad application suite that manages most or all phases of a large-scale capital project, from initial conception, to design, construction, handover, maintenance, management, and decommissioning.

Many large-scale capital projects run beyond budget and behind on schedule. In part, this is caused by the difficulties in coordination between various teams of the project.

SUMMARY OF VARIOUS EMBODIMENTS

In accordance with one embodiment of the invention, a system for 5D mapping of capital projects includes a model database configured to contain model items from a model representing capital project components. Each of the model items has at least one model item code. The system also includes a schedule database configured to contain schedule items representing a portion of a construction schedule. Each of the schedule items has at least one schedule item code. The system additionally includes a cost database configured to contain cost items representing a budget for the portion of the construction schedule and/or the capital project components. Each of the cost items has at least one cost item code. A rules engine of the system is configured to receive a rule for mapping one or more model items, one or more schedule items, and one or more cost items. The rule includes a code sequence related to the at least one model item, the at least one schedule item, and the at least one cost item. A mapping engine is configured to communicate with the model database, the schedule database, and the cost database. The mapping engine is further configured to map one or more model items, one or more schedule items, and one or more cost items based on the rule.

The rule may require an exact match of two of the following three: the model item code, the cost item code, and the schedule item code to map the model item, the cost item, and the schedule item. For example, a first rule may map model items with schedule items, and a second rule may map schedule items with cost items. The system may be configured to automatically map model items with cost items based on the first two mappings. Alternatively, a first rule may map model items with cost items, and a second rule may map cost items with schedule items.

The system may be configured to automatically map model items with schedule items based on the first two mappings. In another embodiment, a first rule may map schedule items with model items, and a second rule may map model items with cost items. The system may be configured to automatically map schedule items with cost items based on the first two mappings. The mapping engine may be further configured to map one or more documents with the one or more model items, one or more schedule items, and/or one or more cost items based on the rule.

In some embodiments, the rule may require a substring match of two of the following three types of items: the model item code, the cost item code, and the schedule item code to map the model item, the cost item, and the schedule item. To that end, the model item code, the schedule item code, and the cost item code each have at least a portion of identical characters. Furthermore, some embodiments may specify a plurality of code sequences in the rule. Additionally, the code sequence of the rule may include a wild card modifier (e.g., an * character that represents any alphanumeric character).

Among other things, the system may also include a quantification module configured to receive the model and determine quantities of the model items. The system may further be configured to output the determined quantities of model items to a project management cost platform. The system may also include an automated comparator configured to compare updated version of the model, budget, and/or schedule, with an existing version of the model, budget, and/or schedule. Thus, the automated comparator may identify new, deleted, and/or revised model items, cost items, and/or schedule items. The quantification module may determine quantities of the revised model items, and the automated comparator may update the cost items based on the quantities of the revised model items.

In accordance with yet another embodiment, a method maps cost items, model items, and schedule items for a large-scale capital project. The method receives a plurality of model items representing capital project components. Each of the model items has at least one model item code. In a similar manner the method also receives a plurality of schedule items representing a portion of a construction schedule. Each of the schedule items may have at least one schedule item code. Furthermore, the method receives a plurality of cost items representing a cost for the portion of the construction schedule and/or the capital project components. Each of the cost items may have at least one cost item code. The method also receives a rule for mapping one or more model items, one or more schedule items, and one or more cost items. The rule includes a code sequence related to the at least one model item the at least one schedule item, and the at least one cost item. Based on the rule, the method maps one or more of the model items, one or more of the schedule items, and one or more of the cost items. Among other things, the schedule item may be part of a work breakdown structure, and the cost item may be part of a cost breakdown structure.

Illustrative embodiments of the invention are implemented as a computer program product having a computer usable medium with computer readable program code thereon. The computer readable code may be read and utilized by a computer system in accordance with conventional processes.

BRIEF DESCRIPTION OF THE DRAWINGS

The patent or application file contains at least one drawing executed in color. Copies of this patent with color drawing(s) will be provided by the Patent and Trademark Office upon request and payment of necessary fee.

Those skilled in the art should more fully appreciate advantages of various embodiments of the invention from the following "Description of Illustrative Embodiments," discussed with reference to the drawings summarized immediately below.

FIG. 4 shows a pre-defined classification structure for model items in accordance with illustrative embodiments of the invention.

FIG. 15 schematically shows a user interface screen for a change to the budget that is highlighted by the automated comparator in accordance with illustrative embodiments of the invention.

FIG. 17A shows a screenshot of an output of the quantification module in accordance with illustrative embodiments.

DESCRIPTION OF ILLUSTRATIVE EMBODIMENTS

Illustrative embodiments provide a system for rules-based mapping of three-dimensional model items, schedule items, and cost items in large scale capital projects. The model items, schedule items, and cost items have codes assigned to them in their native programs. The codes assigned may include type codes that apply generally to each type of item (e.g., generally to a type of chair model item) and instance codes that apply to the particular instance of the item (e.g., the chair on the 40th floor of the North wing). The system interfaces with the native programs for each of the above-noted items, and extracts the codes. A rules-engine receives one or more code conditions for mapping the model items, the schedule items, and the cost items. The rules-engine applies the rule to the items and maps the items based on their meeting the code condition. The rule may automatically reapply every time there is a change to the model, schedule, or budget to automatically map and compare changes. Details of illustrative embodiments are discussed below.

Figure 1A:
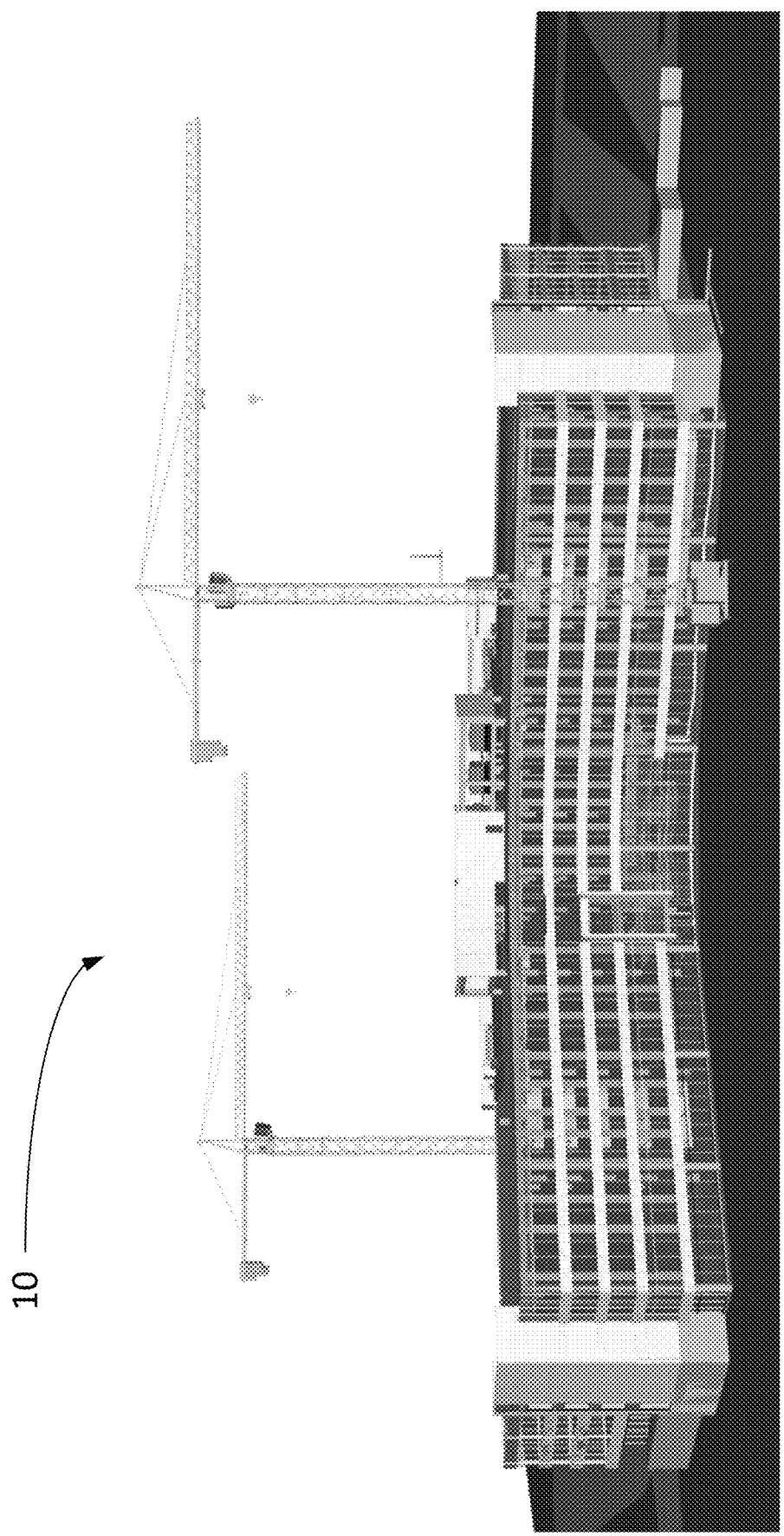
FIG. 1A schematically shows a part of a large-scale capital project that may use illustrative embodiments of the invention.

FIG. 1A generally shows one example of a large-scale capital project 10 (also referred to as "capital project 10") that may implement illustrative embodiments of the invention. More specifically, as known by those skilled in the art, the capital project 10 generally is a long-term investment made to build, augment, add, or improve on a highly capital intensive project-it requires notable amounts of both financial capital and labor capital to undertake, and often takes years to complete. Capital projects 10 are often defined by their large-scale cost relative to other investments requiring less planning and resources (e.g., building a house or a truck). Both the private sector and public sector can be involved in the capital project 10. Some examples of capital projects include developing and maintaining airports, hospitals, tall buildings, bridges & tunnel, and road projects. Additionally, or alternatively, illustrative embodiments may be used with oil refineries, power plants, ships, offshore oil platforms, dams, and factories.

Figure 1B:
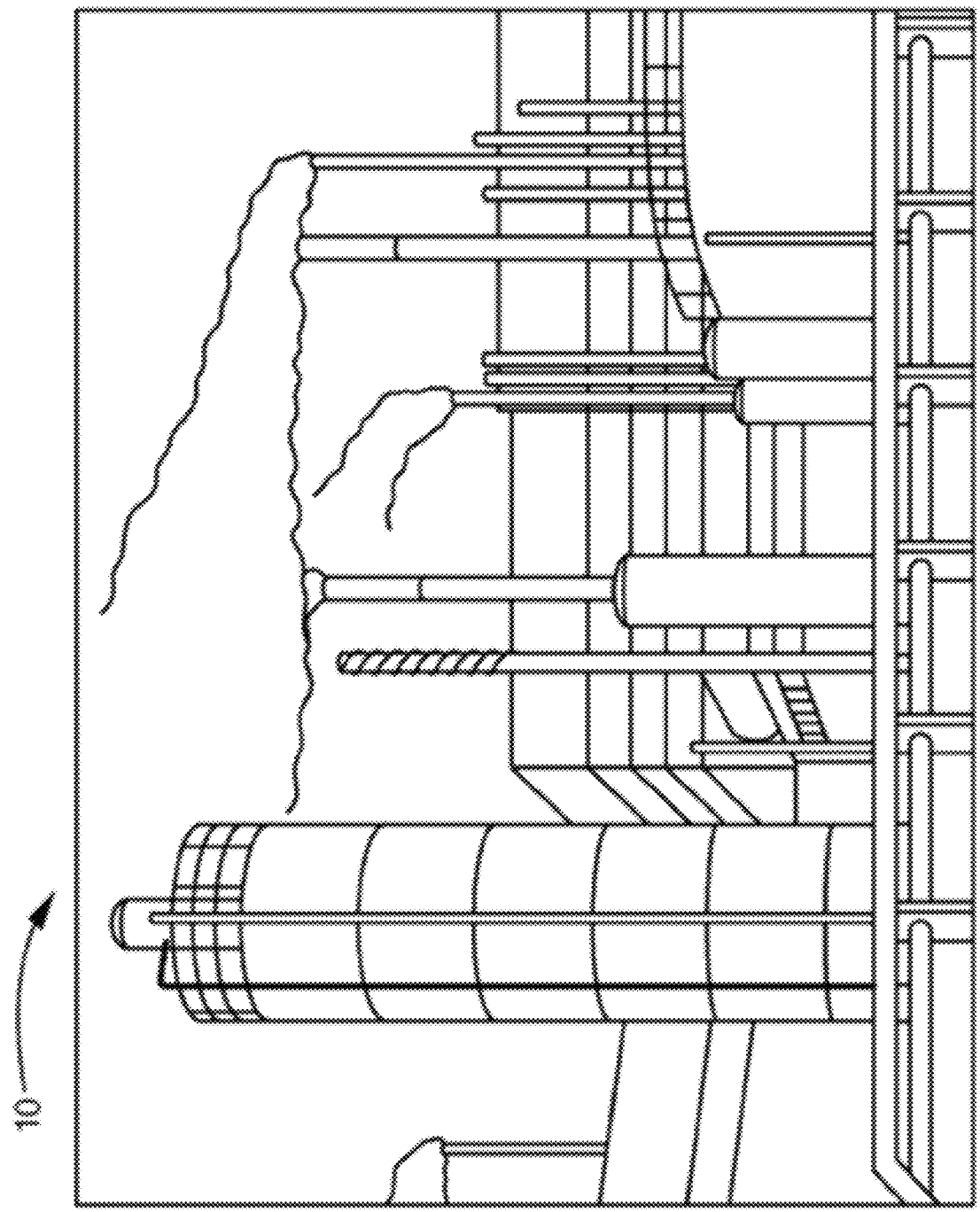
FIG. 1B schematically shows part of a large-scale capital work project in accordance with illustrative embodiments of the invention.

The capital project 10 shown in FIG. 1B is a power plant, which, as known by those skilled in the art, has an enormous number of different components that cooperate to accomplish its function of generating power. For example, among other things, the power plant of this figure has a plurality of large and small buildings, smokestacks, pipes, valves, fuel tanks, ladders, and electrical systems.

Figure 1C:
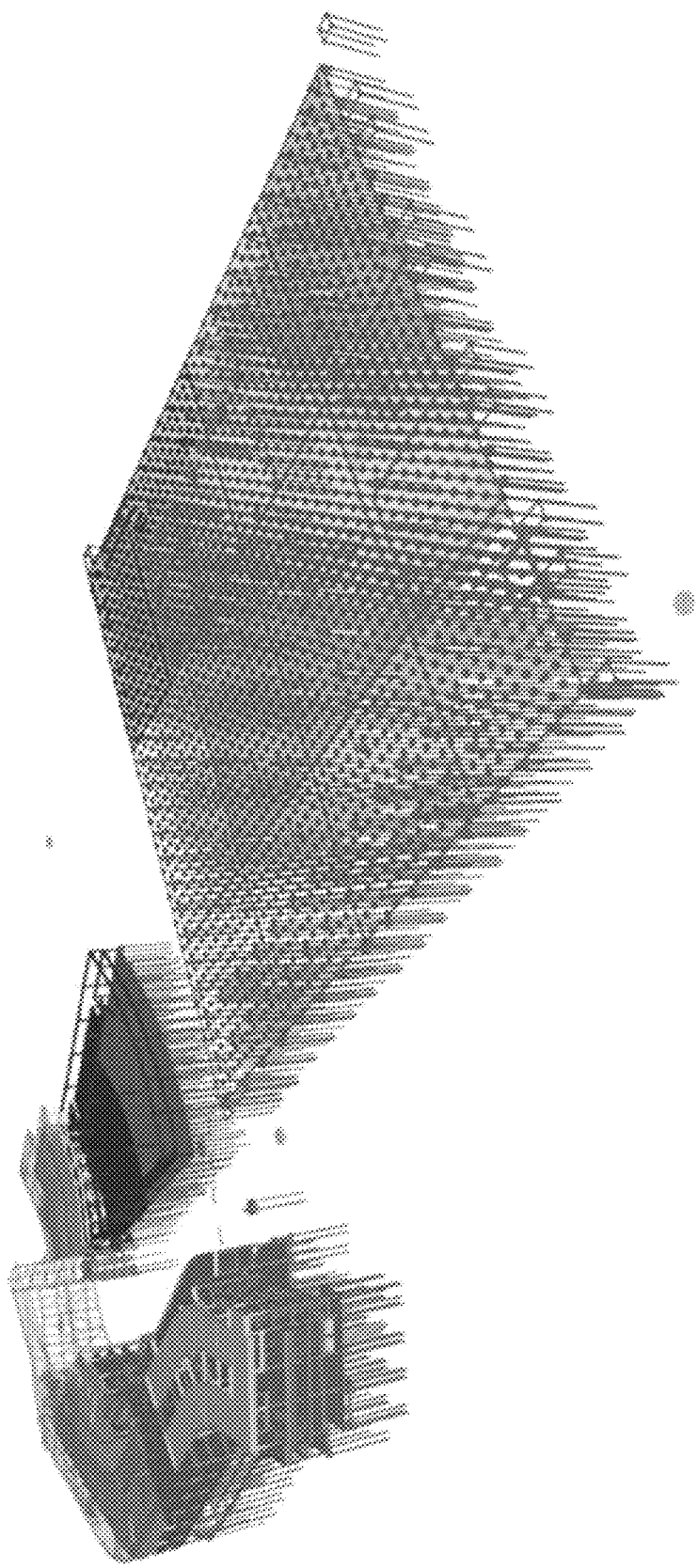
FIG. 1C schematically shows an alternative example of a large-scale capital project.

FIG. 1C shows a layer view of an alternative large scale construction project 10. In a manner similar to FIGS. 1A and 1B, the project 10 requires a large number of resources, materials, and may include multiple buildings. Designing, building, and maintaining the large-scale capital projects 10 requires vast amounts of planning and coordination. A large number of components must be properly positioned, oriented, and connected with other components in accordance with a projected schedule and budget. Without careful planning and coordination, the large-scale capital project 10 may never have been built or operated.

To that end, those skilled in the art have developed plant design programs/products ("plant design programs") to assist in planning/designing, developing, maintaining, and decommissioning capital projects 10, such as those shown in FIGS. 1A-1C. Examples of widely used building & infrastructure design program include BricsCAD® and/or plant design program is known as the SmartPlant® Enterprise product (hereinafter "SmartPlant® product"), distributed by Hexagon PPM of Huntsville, Alabama. In a manner similar to other such products, the above-noted modeling products have at least the following interrelated functions and components:

3D modeling and visualization,
engineering and schematics,
information management,
procurement, fabrication, and construction,
open integration with other proprietary and open systems.

Accordingly, architects, designers, engineers, developers, managers and other relevant parties use these and other features of design programs, such as the SmartBuild® and SmartPlant® products, to design, build, update, manage, and decommission capital projects 10, such as the buildings 10 shown in FIGS. 1A-1C. As known by those skilled in the art, such 3D or 2D design programs often produce a template that, along with multiple software tools, serves as a principal mechanism for designing and managing their projects. Additionally, these design items may include multi-dimensional information such as documents, logistics items, metadata, and other information Among other things, the template typically includes a plurality of options, configurations, and layouts that permit the user to more accurately and efficiently develop their project.

At the risk of oversimplifying various embodiments, one may analogize a template used in the large-scale capital project context to a word processing template that is displayed when a user opens a word processing program. Among other things, a word processing template may be configured to enable a user to select from multiple fonts, colors, shapes, line spacing, and formats. The user then begins preparing their document using the different options that the template provides. In fact, the word processing user can make any of a wide variety of different documents, such as a letter, a memo, a spreadsheet, a book, etc. In a similar manner, a template used for the capital project 10 also can be used with other, vastly different types of capital projects, such as those capital projects 10 noted above.

The configuration data of the template, however, often changes throughout the life cycle of the capital projects 10. Specifically, the template configuration required for the lifecycle of a capital project 10, such as the power plant of FIG. 1B, an oil refinery, or a ship, depends on many factors, including the needs of the owner, the specifics of the industry, and the available configuration options afforded by the software system being used at the various project site(s) 16. Configuration of such capital projects 10 typically includes thousands of types of items, such as custom properties, symbols, drawing templates, rules, etc. In addition, configuration requirements typically differ between the various lifecycle stages of the facility, such as between conceptual design, detailed design, commissioning, construction, operations, maintenance, decommissioning, etc.

Another level of complexity relates to the various software applications used at each project site. In particular, each software application executing at a project site may have its own set of configuration types and options, and specific methods to compare and update the configuration data, as well as the existing design data. In addition, these options and methods may change or depend on the specific version of the software applications. Yet another level of complexity involves an integrated system of applications, and the interdependence between the configuration types and the software applications.

Given these complexities, a building owner, plant owner or engineering company can easily spend years developing a complete set of template configurations to use with their design program. Indeed, the inventors believe that such complexities are a leading cause for extended delays in project completion and massive cost overruns. Data from a Mckinsey analysis on Capital Projects and Infrastructure, June 2016, shows that large capital projects are delayed by twenty months, on average, and have an 80% cost overrun.

In addition to the inherent difficulties of completing large scale capital projects 10, complexities are added because of the various stakeholders of a project. For example, project 10 planners may use a first program to manage a work breakdown structure, and the management/finance team may use a second different program to manage a cost breakdown structure.

Figure 1D:
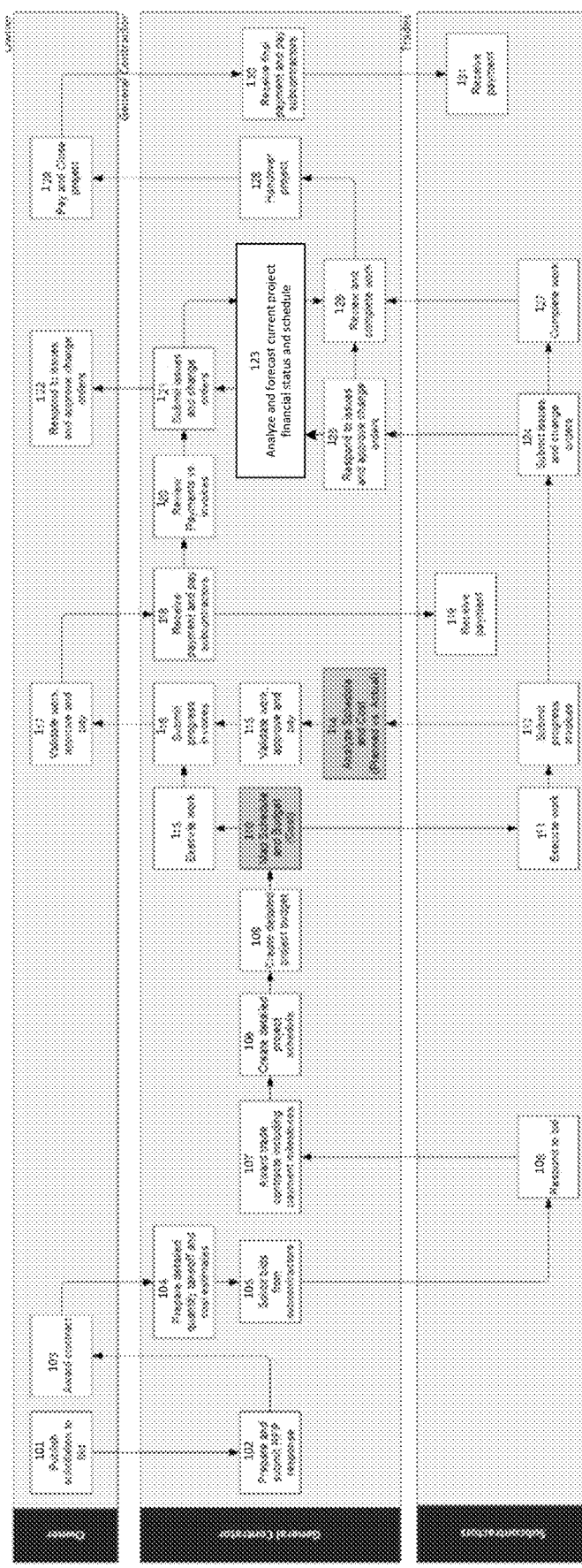
FIG. 1D schematically shows part of a large-scale capital project work process in accordance with illustrative embodiments of the invention.

FIG. 1D schematically shows a capital project 10 work process in accordance with illustrative embodiments of the invention. At a high level, at step 101, an owner of the project may publish a solicitation to bid. An invitation to bid, also called an invitation for bid or sealed bid, is a call to contractors to submit a proposal on a project. While an ITB is very similar to an RFP (request for proposal), the ITB is concerned with pricing more so than the conceptual ideas of the project. Therefore, in some embodiments, the model may substantially be prepared at the time of the invitation to bid. Thus, the model items may already be prepared at this time. Alternatively, the owner may put out a request for proposal. The solicitation attracts bids from a number of general contractors who, at step 102, prepare and submit a response to the request for proposal. In this case, the contractors prepare the model items. After reviewing the various responses from one or more general contractors, the owner awards the contract at step 103.

The process then proceeds to step 104, where the general contractor prepares a detailed quantity takeoff and cost estimates. The detailed quantity takeoff is a listing of the quantity of each model item. For example, there is a detailed quantity takeoff for all of the footings, which share the same assembly code, but have different type codes.

After the quantity takeoff and cost estimates are prepared, at step 105, the general contractor solicits bids from subcontractors. At step 106, one or more subcontractors respond to the solicitation, and then the general contractor awards trade contracts to the subcontractors at step 107. In illustrative embodiments, the contracts include payment milestones that detail various work breakdown structures that must be achieved in order for the subcontractor to receive payment.

At step 108 a detailed project schedule is created after the subcontractors are finalized. The project schedule includes at least one work breakdown structure (WBS) including one or more work packages. A work package (WP), also referred to as a schedule item, is a scheduled activity enhanced with other required construction information such as, for example, documentation, dates, interdependencies, and work steps. The schedule item can have a model and cost item assigned for 4D (schedule-model) and 5D (schedule-model-cost) animation.

In a similar manner, at step 109, a detailed project budget is created. The project budget includes at least one cost breakdown structure (CBS) including one or more cost items.

At step 110 the schedule work breakdown structures and budget cost breakdown structures, or parts thereof, are mapped. Mapping intelligently links the model items, cost items and schedule items using rules to provide an on demand and continuously updating real time project status and cost forecasting. The cost breakdown structures and work breakdown structures are different so as to cater to the various objectives of the project team. In some embodiments, the cost breakdown structures and work breakdown structures are manually correlated in software, such as Microsoft Excel, to allow for passing dates and progress of work breakdown structures and cost breakdown structures for accurate forecasting purposes. By mapping the cost breakdown structures and the work breakdown structures, illustrative embodiments allow for visualization of schedule relative to cost (e.g., to see if there are schedule delays and/or cost overruns).

Manually mapping cost breakdown structures and work breakdown structures is difficult for a large capital project 10. It is typical to have a project 10 of 40+ stories, with more than 10,000 schedule items, and more than 2,000 cost items. The initial mapping of the cost breakdown structure with the work breakdown structure is very time consuming and labor intensive. While the initial mapping is incredibly difficult, keeping the mapping updated after the capital project 10 has begun can be even more difficult. For example, every time the project 10 changes from its original schedule, cost, or model, the mapping needs to be updated. The updated mapping may include adding new items, removing items, creating new links between items, and/or removing links between items.

Furthermore, illustrative embodiments perform a 5D mapping, which maps the 3D model with the work breakdown structure and the cost breakdown structure. In addition to the large number of cost items in the cost breakdown structure and work items in the work breakdown structure, the model may have more than 100,000 model items per project 10.

Accordingly, as discussed further below, illustrative embodiments use a specifically configured rules engine to provide rule-based automatic mapping of the various structures, such as work breakdown structure, cost breakdown structure, estimate, model, and documents to solve many of aforementioned problems.

The process then simultaneously proceeds to steps 111 and 113, where the scheduled work is executed by the subcontractor and/or general contractor, respectively. Both of these parties may then submit progress invoices for the work completed, respectively, at steps 112 and 116. Although illustrative embodiments refer to the subcontractor, it should be understood that in use multiple subcontractors may be executing various portions of work on the same or different schedule items (e.g., in parallel).

At step 112, if the work is satisfactorily performed, the process proceeds to step 112, which allows the general contractor to analyze the schedule and the cost using the mapping performed at step 110. The general contractor may then validate the work and pay the respective subcontractor at step 115. Progress invoices may be submitted to the owner, who in turn, validates the work and approves the pay of general contractor at step 117. At step 118, the general contractor receives payment from the owner and pays the subcontractors. At step 119, the subcontractors receive payment.

Returning to step 112, if the project 10 has gone off-target (e.g., overbudget, delayed, change in model), the process proceeds to step 124, where proposed changes are submitted in the form of change order requests. The change order is used to record an amendment to the original construction contract. For example, one purpose of the change order request is to create a record of added services. If the subcontractor and/or contractor fails to use change orders, then they are likely to lose out on getting paid for those additional services. Therefore, to keep the project 10 running smoothly, it is important that the effect of change orders on the budget, schedule, and/or model be visualized quickly. The process proceeds to step 125, where the general contractor responds to the issues and approves or denies the change order. For certain types of simple work orders changes, the contractor may approve the change order, and the process proceeds to step 126. For change orders involving more complex changes (i.e., changes to schedule items, model items and/or cost items), the process proceeds to step 123.

Analyzing and forecasting the current project 10 financial status and/or schedule may be performed automatically because the schedule items, model items, and cost items were previously mapped at step 110. Therefore, the general contractor and/or subcontractor may input the change order and actual cost (e.g., change to a single cost item), and the effect on all other linked items (e.g., other cost items, schedule items, and/or model items) from step 110 are automatically determined (e.g., using the automatic comparator shown in FIG. 2). Therefore, the general contractor may quickly see the effect of the change and proceed to step 121, which submits issues and change orders with an analysis showing the effect of the change order on the linked items to the owner. This allows the owner, at step 122, to get a deeper understanding of the ultimate effect (i.e., on cost and schedule) of the change order on their project 10, and to approve the change order quickly. Accordingly, all of the parties: owner, general contractor, and subcontractor may quickly determine practical outcomes of change orders and receive approvals, helping to keep the project 10 from straying too far from schedule.

Prior to the introduction of various embodiments of the mapping system 17 (shown in FIG. 2 below), it was impossible to automatically map model items, cost items, and schedule items using property codes of the items. Instead, one or more technicians manually selected and connected items using software. The inventors discovered that using codes from the various items is an efficient and repeatable way of automating mapping-use of these items enable the beneficial result of automating mapping. Although FIG. 1D only shows a single change order, it should be understood that the process of requesting change orders and analyzing the effects of the change on the mapped items may be repeated multiple times during the course of a single project 10.

The process then proceeds to step 126, where the work is reviewed and completed by the general contractor. The general contractor hands over the project to the owner at step 128, at which point the owner pays the general contractor (step 129). At steps 130-131, the general contractor receives payments and pays the subcontractor. The process then comes to an end.

At some time, typically during construction of the project 10, the owner, general contractor, and/or subcontractor may need to update the configuration of the active project site(s) 10 to adopt some new or revised model items, cost items, and schedule items (e.g., in response to a change order). This presents various technical problems solved by the technical solutions of illustrative embodiments. In particular, those technical problems may include one or more of:

1. Uncovering problems before construction begins by simulating the sequence of construction activities and showing it to the project team.

2. Reducing foreseeable time delays and savings on the cost of a rework (e.g., because of a change order after construction has started). For example, without the automatic mapping, results for steps 114 and 123 are inefficient in inconclusive.

3. Forecasting and reporting quickly. Prior art techniques involve manually forecasting, which is very labor-intensive.

4. Generating a 4D animation with forecasted cost (5D) so that the executive team can see the simulated physical model progress over the project period and anticipated cost during that time. During the project tendering/bidding phase, the physical model helps showcase the project details to assist with obtaining work over other contractors. Also, during project execution, the 5D animation helps track the project progress and cost, and can also highlight potential risks in advance. The earlier this information is available, the sooner a decision can be made to reduce delays and cost overruns.

5. Document Linking. In addition to mapping of items, associated documents may be automatically linked using the same codes. The industry has suffered from a loss of productivity due to on-site teams waiting for the correct or updated drawings, resource information, approvals, or work permit. Illustrative embodiments of the mapping engine automates the mapping od documents to work breakdown structure and cost breakdown structure, making it fast and easy for the construction team to find the right documents.

Illustrative embodiments provide a faster and more accurate way to analyze the project by using item codes in conjunction with rules to automate mapping. For example, project forecasts are available immediately instead of waiting for 2 to 4 weeks, or longer, for the construction team to analyze and a prepare a manual project forecast using currently available software.

6. Automating extraction of codes from disparate software applications for model items, schedule items, and cost items. Each software application has its own set of configurations, dependencies, and methods to compare and update the configuration data/files.

7. The amount of time to complete the comparison for revised model items, cost items, and/or schedule items and update the mapping preferably is kept to a minimum to reduce project downtime. It is extremely time consuming, and error-prone to manually map the dozens of properties of each and every one of the thousands of items between the template and the active project, across multiple software applications.

Various embodiments mitigate some or all of these technical risks, and provide a robust and efficient method to compare the updated configuration data of an integrated template system with the configuration of an integrated active project.

Illustrative embodiments therefore may use specially configured technologies, such as a pre-configured mapping system 17 (FIG. 2), to solve some or, preferably, all of these technical problems. Specifically, as known by those skilled in the art, to maintain system integrity, the mapping system 17 systematically manages configuration changes to a computer system or network over time. The mapping system 17 therefore can implement techniques, policies, tools, and procedures in a computer system or network to manage and evaluate changes in configurations and configuration options. To that end, FIG. 2 schematically shows an illustrative embodiment of the mapping system 17 that may be configured to more efficiently map and update mappings of model, cost, and schedule used for large-scale capital projects, such as the capital projects 10 of FIGS. 1A-1D.

Figure 2:
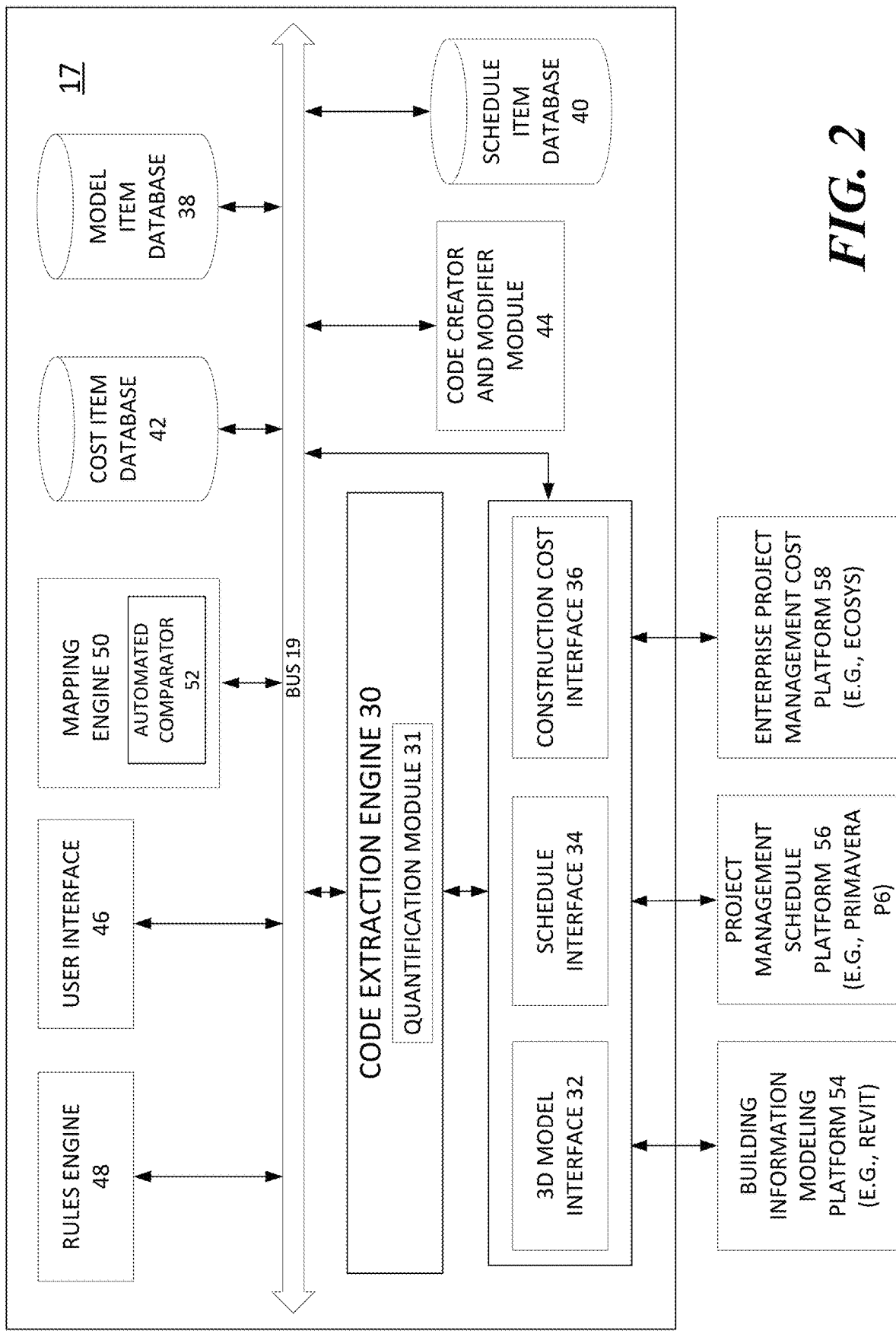
FIG. 2 schematically shows a mapping system configured in accordance with illustrative embodiments of the invention.

The mapping system 17 of FIG. 2 includes a plurality of components that cooperate to efficiently map model, cost, and schedule of large-scale capital project 10. Each of these components is operatively connected by a conventional interconnect mechanism. FIG. 2 simply shows a bus 19 communicating each the components. Those skilled in the art should understand that this generalized representation can be modified to include other conventional direct or indirect connections. Accordingly, discussion of the bus 19 is not intended to limit various embodiments.

The components include a code extraction engine 30 configured to extract codes (e.g., type codes and/or instance codes) from model items, schedule items, and cost items. As known by those of skill in the art model items, schedule items, and cost items are the lowest level of their respective data structure. For example, the model item typically has a 3D geometry and other required property codes. The schedule item typically has a start date and an end date, a duration, and other required property codes. The cost item typically has a cost value, unit of measure, and other required property codes.

The code extraction engine 30 has a 3D model interface 32, a schedule interface 34, and a construction cost interface 36. Each of the interfaces 32-36 is configured to communicate with a respective third-party program, and to extract item codes therefrom. For example, the 3D model interface 32 may communicate with the building information modeling platform 54 (e.g., Revit), where the architects and/or engineers have created the 3D model items with associated properties and codes. Additionally, the schedule interface 34 may communicate with the project management schedule platform 56 (e.g., Primavera P6 EPPM by Oracle), where the general contractor may prepare schedule items with associated properties and codes. Furthermore, the construction cost interface 36 communicates with the enterprise project management cost platform 58 (e.g., Ecosys), which the finance team may use to create budget items with associated properties and codes. The code extraction engine 30 may extract the codes from the various items and store them in a model item database 38, a schedule item database 40, and a cost item database 42, as appropriate.

Some of the items may be input to the system 17 without any property codes, with only type codes, and/or with inaccurate instance codes. Accordingly, the system 17 includes a code creator and modifier module 44 (CCM module 44) to allow for modification of item codes that exist in the system 17. To allow for modification of item codes, the system 17 may include a user interface 46 that receives input from a user (e.g., from a keyboard and a mouse controlled by the user). After importing the model items, schedule items, and cost items, the code extraction engine 30 may identify items that were imported without any codes (e.g., because no codes were initially applied or because of an error during the importing process). The user may thus look at the item and apply one or more codes to the item using the CCM module 44. Additionally, or alternatively, the item may be imported with only type codes (e.g., that are generic to the type of item regardless of project, but that are not specific to the project 10 at hand). Accordingly, the CCM module 44 may be used to input specific instance codes into given items. Furthermore, some items may be imported with inaccurate instance codes (e.g., carry over from different project and/or entered incorrectly). The CCM module 44 may be used to add an appropriate instance code and/or to modify an inaccurate instance code. The modified codes may be stored in their respective database 38-42.

A rules engine 48 is configured to receive one or more code-based conditions and generate a rule that is used by a mapping engine 50. The one or more rules may be custom defined based on the project (e.g., via the user interface 46). Additionally, or alternatively, a previously defined rule (e.g., from a previous project) may be imported and applied to particular model items, cost items, and schedule items of the current project 10. As discussed further below, a variety of different code-based conditions may be used. In some embodiments, the condition may require an exact match between codes of model item, schedule item, and/or cost item. Additionally, or alternatively, the condition may require that only a portion of the code match and/or may include wild card operators.

The mapping engine 50 is configured to map the model items, the schedule items, and the cost items. The mapping engine 50 communicates with the code extraction engine 30 and/or the databases 38-42 to obtain codes for the model items, the code items, and the schedule items. The mapping engine 50 also communicates with the rules engine 48 and obtains the rule having one or more conditions defining the items to be mapped. The mapping engine 50 maps the model items, cost items, and schedule items by applying the rule.

The mapping engine 50 may include an automated comparator 52 to automatically compare updated data in a rapid and automated manner-without human comparison, and memory that stores the updated data, such as in the form of a database (e.g., in any of database 40-42 or other database). Specifically, the comparator 52 compares data relating to updates of model items, cost items, and/or schedule items (e.g., because of a change order). For example, the architects may change the 3D model after the 3D model has already been mapped. The automated comparator 52 detects the change/update and instructs the mapping engine 50 to reapply the rules and automatically map the revised items relative to the other items.

The mapping system 17 of FIG. 2 can be implemented in a variety of manners. In one implementation, the mapping system 17 may have local, independent, collaborating versions at different project sites. For example, the mapping system 17 can locate one schedule interface at the central site where construction is taking place and a construction cost interface at a different project sites 10. As another example, the schedule interface 34 can be at the central site, at the project site(s) (e.g., at least in part acting as an input or output port), and/or at some other location remote from both the central site and the project sites(s). Similarly, the mapping system 17 may be distributed to span an entire network. In the latter embodiment, the components of FIG. 2 operate on both the central site and various project site(s).

It should be noted that FIG. 2 only schematically shows each of these components. Those skilled in the art should understand that each of these components can be implemented in a variety of conventional manners, such as by using hardware, software, or a combination of hardware and software, across one or more other functional components. For example, the mapping engine 50 may be implemented using a plurality of microprocessors executing firmware. As another example, the mapping engine 50 may be implemented using one or more application specific integrated circuits (i.e., "ASICs") and related software, or a combination of ASICs, discrete electronic components (e.g., transistors), and microprocessors. Accordingly, the representation of the mapping engine 50 and other components in a single box of FIG. 2 is for simplicity purposes only. In fact, as noted above, the components of FIG. 2 may be distributed across a plurality of different machines-they are not necessarily within the same housing or chassis.

It should be reiterated that the representation of FIG. 2 is a significantly simplified representation of an actual mapping system 17. Those skilled in the art should understand that such a system typically has many other physical and functional components, such as central processing units, various utilities, controllers, short-term memory, etc. Accordingly, this discussion is not intended to suggest that FIG. 2 represents all of the elements of the mapping system.

Figure 3:
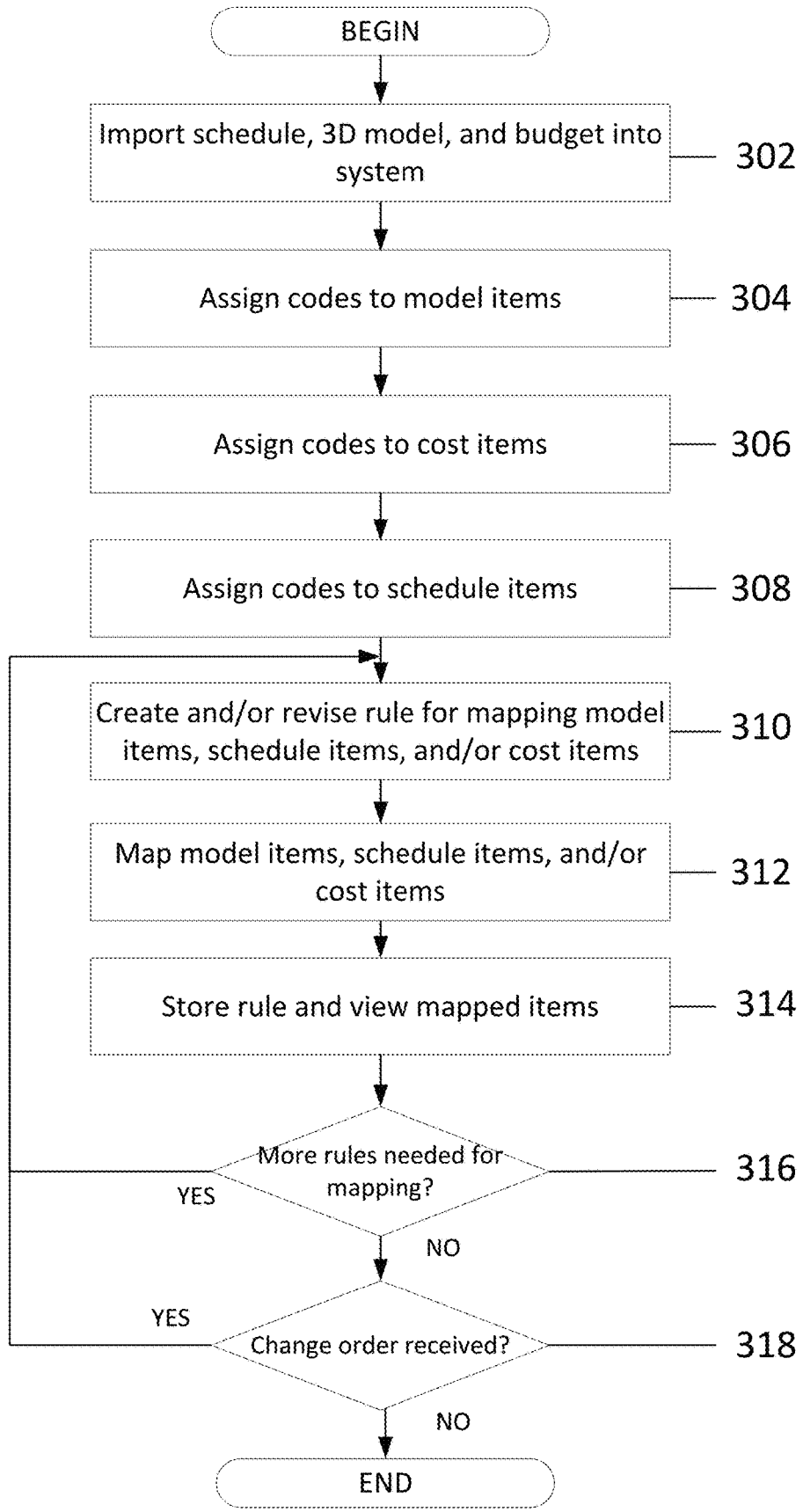
FIG. 3 shows a preferred process used by the mapping system for mapping the model items, schedule items, and cost items in a manner that mitigates some or all of the above noted technical problems.

FIG. 3 shows a preferred process used by the mapping system 17 for mapping the model items, schedule items, and cost items in a manner that mitigates some or all of the above noted technical problems. It should be noted that this process may be considered to be simplified from a longer process that normally would be used to update template configuration data. Accordingly, the process of updating template configuration data may have many other steps that those skilled in the art likely would use. In addition, some of the steps may be performed in a different order than that shown, or at the same time. Those skilled in the art therefore can modify the process as appropriate.

The process of FIG. 3 begins at step 302, in which the schedule, the 3D model, and the budget of the capital project 10 are imported into the system 17. As described previously, the project is a large-scale capital project, often spanning multiple worksites and involving a number of parties, including but not limited to, the general contractor, multiple subcontractors, architects, engineers, a finance team, and a planning committee. Each of these parties may use different software to help them accomplish their goals. For example, the engineers may design model items using a building information modeling platform 54 such as Revit, the finance team may create the budget for the project 10 using enterprise project management cost platform 58 such as EcoSys, and the planners may use the project management schedule platform 56 such as Primavera P6.

All of these various items are imported into the system 17. To that end, the 3D model interface 32, schedule interface 34, and construction cost interface 36 are specifically configured to interact with the various types of platforms and to extract codes from the items for use by the mapping engine 50. Some projects may have more than 10,000 schedule items, more than 2,000 cost items, and more than 100,000 model items per project 10. The interfaces 32-36 are configured to extract all of desired codes from each of the items.

The process moves to step 304-308, which assigns codes to the model items, schedule items, and cost items. The codes assigned to each of these items within the system 17 may be the codes extracted by the code extraction engine 30. Thus, some of the codes may be from prior projects, or previously inputted by appropriate users of the respective management platforms (e.g., EcoSys, Primavera, etc.). To that end, the code extraction engine 30 may be configured to automatically search for pre-defined code classification structures.

Figure 4:
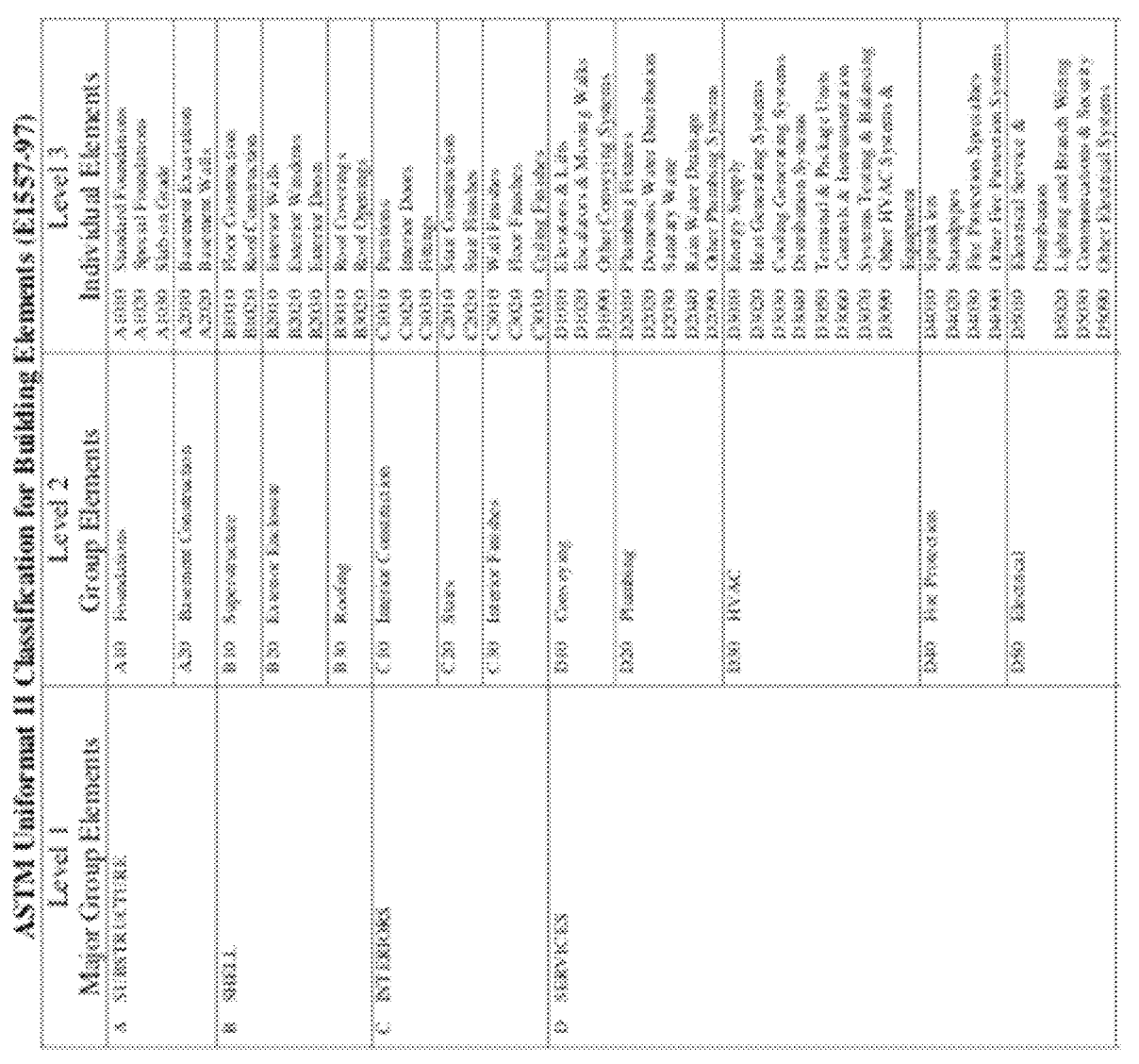

FIG. 4 shows a pre-defined classification structure for building items in accordance with illustrative embodiments of the invention. In the construction industry, there are multiple bodies, such as the Construction Specification Institute (CSI), the International Construction Measurement Standards Coalition (ICMSC), the Building Cost Information Services (BCIS), MasterFormat, Uniformat, and the Royale Institute of Charted Surveyors (RICS), which maintain and release codes for organizing all of the relevant project properties and performance data in a consistent manner.

Every classification structure is developed for a different purpose, such as Uniformat-II by CSI, which is predominantly used for organization information early in the project 10. The Uniformat-II classification structure closely resembles the organization of building information modeling (BIM). It helps to create a direct relationship between a model item and where it is used in the building.

FIG. 4 shows a plurality of group elements having codes, and then specific individual elements having codes. For example, the code for a standard foundation is A1010, and the code for a special foundation is A1020. However, both of these items may share the base code A10. Each of these items has a 3D component that represents the real world item within an architectural model (e.g., a CAD model). In illustrative embodiments, the code extraction engine 30 extracts the model item codes provided by the various classification structure systems. Usually, the codes are provided in the building information modeling platform 54 (e.g., Revit) in model item templates, so that the architects don't have to spend time remaking each model item.

At step 304, the process assigns codes to model items in accordance with illustrative embodiments of the invention.

Figure 5:
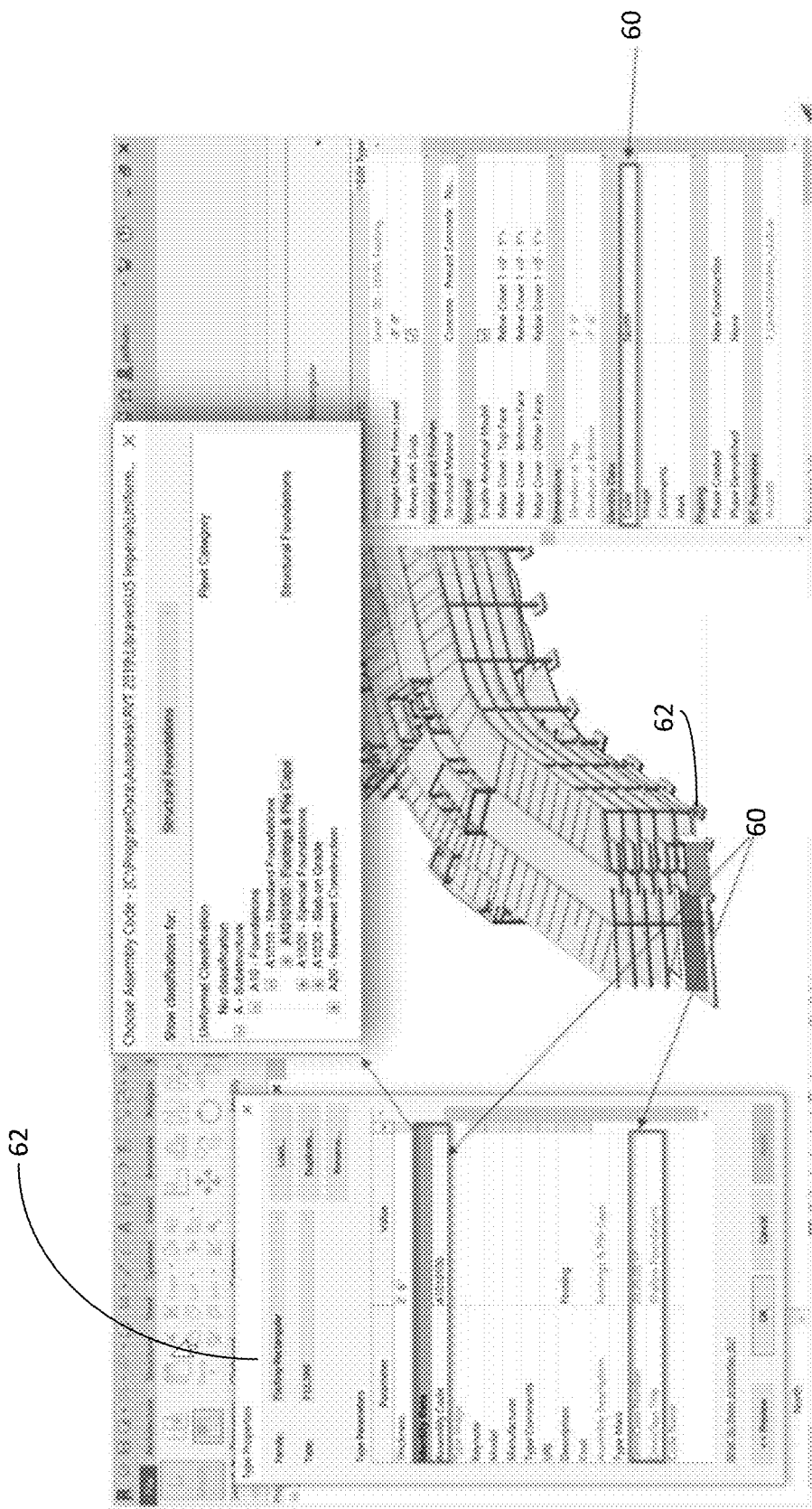
FIG. 5 is a screenshot from an interface of the building information modeling platform for creating classification structure codes for a model item.

FIG. 5 is a screenshot from an interface of the building information modeling platform 54 for creating classification structure codes 60 for a model item. The screenshot of FIG. 5 shows the model authoring tool 54, such as Revit by Autodesk or Tekla by Trimble. Revit is a software product and comprehensive workflow from Autodesk that helps architects, designers, builders, and construction professionals work together. The software is a sophisticated way to create models of real-world buildings and structures. It is primarily used in building information modeling (BIM). Using the model authoring tool, users can attach the code 60 or a property to model items 62. Additionally, or alternatively, the model items 62 may be pre-set with one or more codes 60.

As shown in FIG. 5, the model item 62 for a rectangular footing of the type Ft2.5×8 has an assembly code 60: A1010100, and an omniclass number 23.25.05.17. These are codes/properties of the model item that may already exist prior to the beginning of the capital project 10. Thus, the code extraction engine 30 may be configured to specifically extract the predefined code (e.g., using the Uniformat and/or Masterformat 16 classification structures). Additionally, the user may add a new code 60 for the model that relates specifically to the current project (e.g., Identity Data Code: "North"). In illustrative embodiments, the new code 60 may be added using the model authoring tool 54 (e.g., by architects or engineers using Revit). Additionally, or alternatively, new codes may be added after importation in the system 17 using the CCM module 44.

Figure 6:
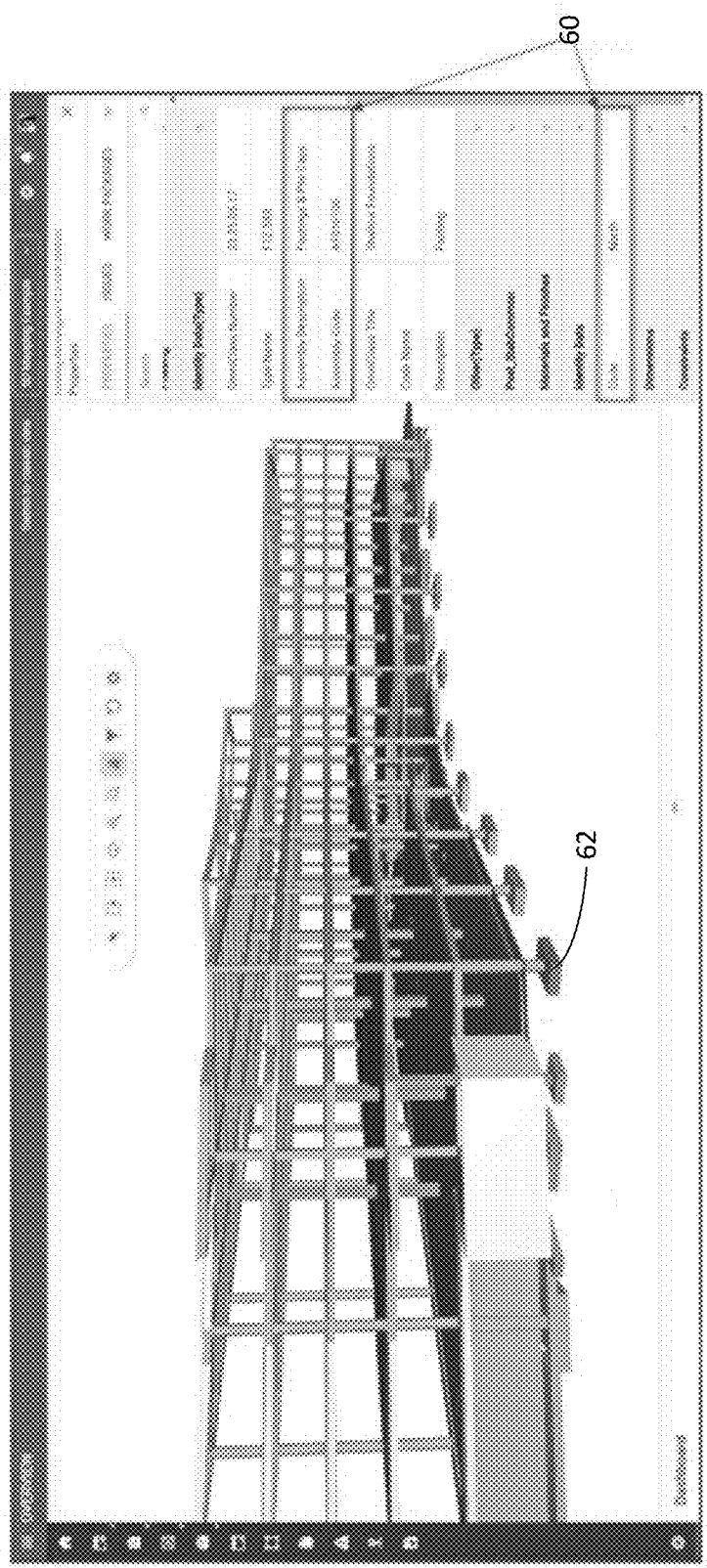
FIG. 6 shows a user interface screen of the system for an imported model item of FIG. 5.

FIG. 6 shows a user interface screen of the system 17 for the selected model item 62 of FIG. 5. As shown in FIG. 6, the selected model item 62, among a large number of other model items, has been imported into the system 17 via the 3D model interface 32. The code extraction engine 30 extracts the codes from the model (output of the building information modeling platform 54), and may store the model item 62, along with the model item codes 60 and other associated properties, in the model item database 38.

Figure 7:
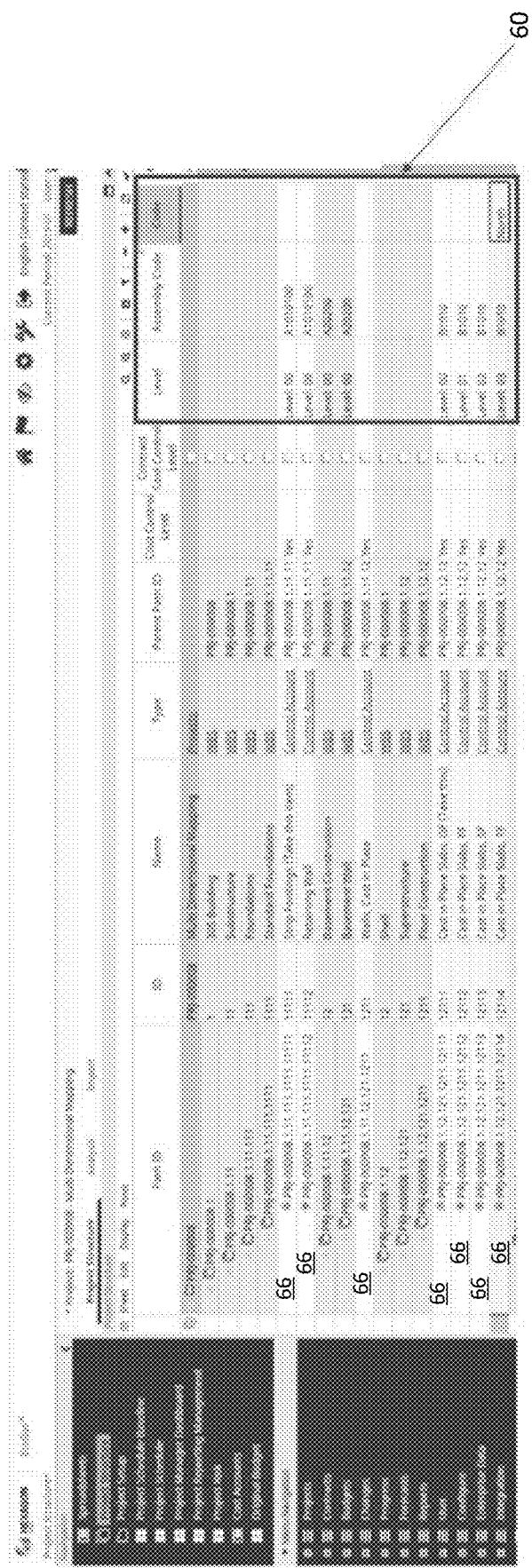
FIG. 7 is a screenshot from an interface of the enterprise project management cost platform for creating classification structure codes for a cost item in accordance with illustrative embodiments of the invention.

At step 306, the process assigns codes 60 to cost items 66 in accordance with illustrative embodiments of the invention. FIG. 7 is a screenshot from an interface of the enterprise project management cost platform 58 for creating classification structure codes 60 for a cost item 66. To add classification structure codes 60 to cost items 66, the user may use a pre-defined classification structure or create a classification structure in the system 17, in a manner similar to the codes 60 for the model authoring tool 54 (e.g., shown in FIGS. 5-6). The user publishes classification structures to enable the cost control system 58 (e.g., EcoSys). Illustrative embodiments store such a classification structure in the cost item database 42, and assign the classification structure to a cost item.

As shown in the screenshot of FIG. 7, the user can assign single or multiple classification structures to an existing cost breakdown structure. The user can assign single or multiple classification structures codes 60 to one cost item 66. When the estimate/budget is imported into the system 17 through the cost interface 36, the codes 60 are extracted and assigned to the respective cost item 66. Thus, using the cost platform 58, the cost items 66 may be pre-set with one or more codes 60 that are extracted using the code extraction engine 30. Additionally, or alternatively, users can attach a code 60 or a property to cost items 66 using the CCM module 44.

Figure 8:
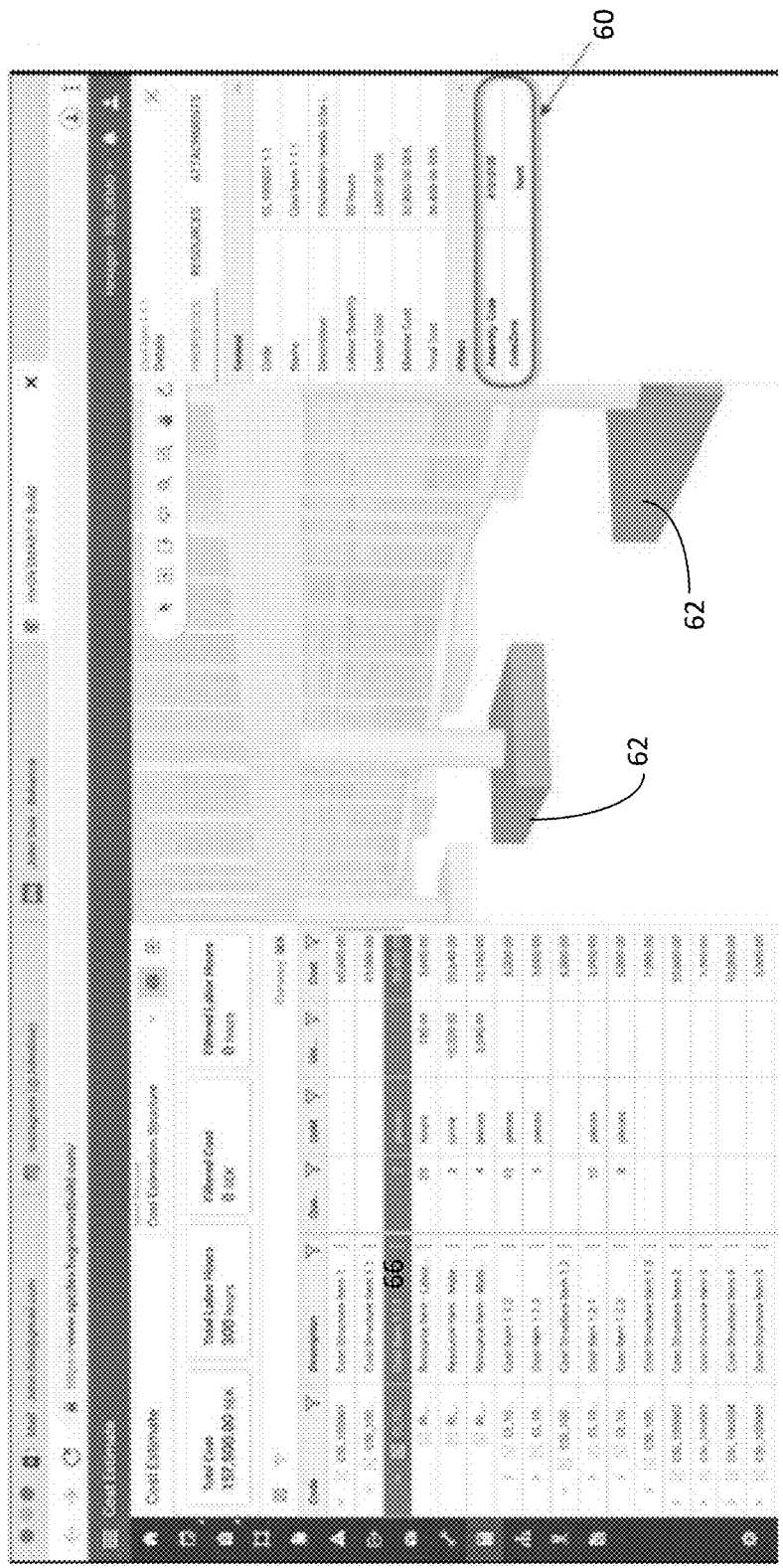
FIG. 8 shows a user interface screen of the system for an imported cost item of FIG. 7.

As shown in FIG. 8, the cost item 66 (1.1.1) for the rectangular footing has the same codes (A1010100 and North) as the model item 62 for the same component. Additionally, the user may add the instance code 60 for the model that relates to the instance of the current project using the CCM module 44. In illustrative embodiments, the new code 60 may be added using the cost management platform 58 (e.g., by the finance team using EcoSys). After the code extraction engine 30 extracts the codes 60 from the cost platform 58, it may store the cost item, along with the cost item codes and other associated properties, in the cost item database 42.

Figure 9:
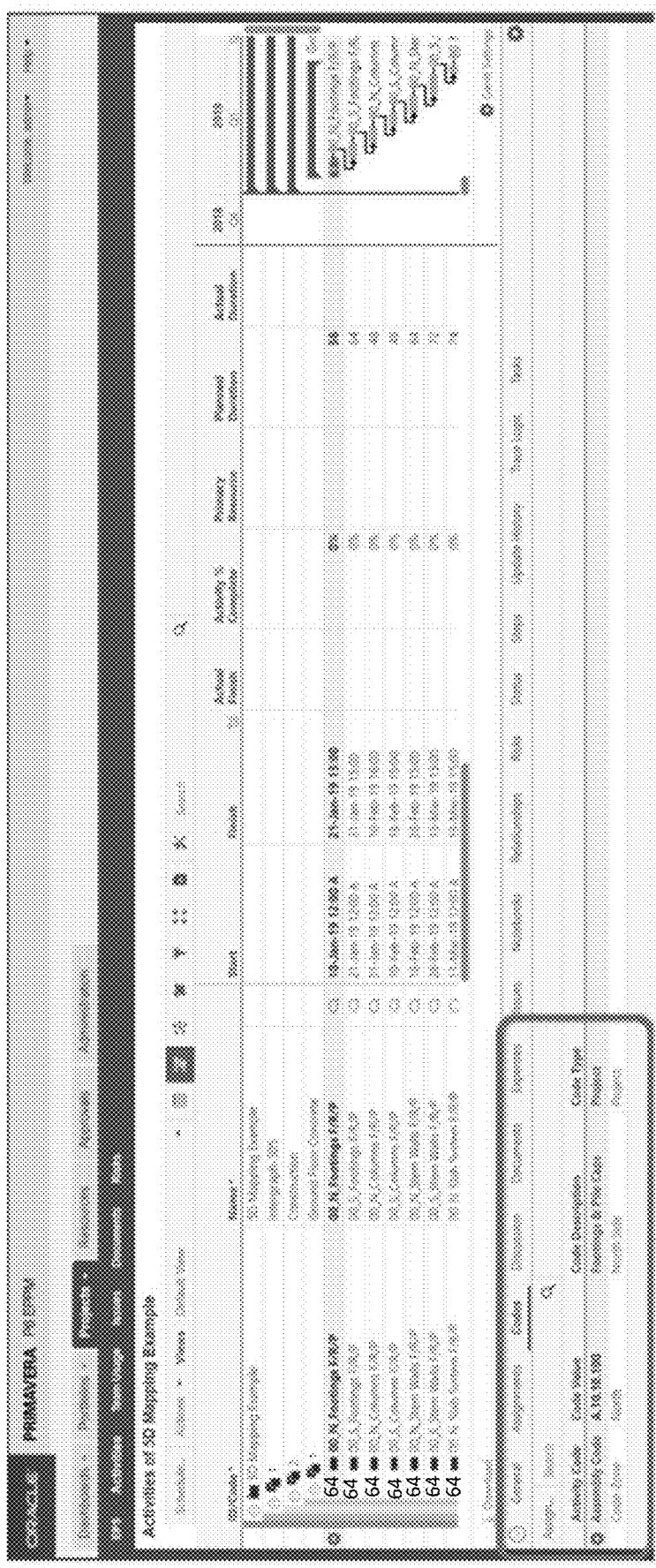
FIG. 9 is a screenshot from an interface of the project management scheduling platform for creating classification structure codes for a schedule item in accordance with illustrative embodiments of the invention.

At step 308, the process assigns codes 60 to schedule items in accordance with illustrative embodiments of the invention. FIG. 9 is a screenshot from an interface of the project management scheduling platform 56 for creating classification structure codes 60 for a schedule item 64. The screenshot of FIG. 9 shows a schedule management tool 56, such as Primavera P6 EPPM by Oracle or Microsoft Project XML. Using the schedule management tool 56, the code 60 or a property may be attached to schedule items 64. Additionally, or alternatively, the schedule items 64 may be pre-set with one or more codes 60.

FIG. 9 shows the schedule item 64 for the rectangular footing of the type having the assembly code: A1010100, and the "North" code-zone. As mentioned previously, these are properties of the model item 62 that may already exist prior to the beginning of the capital project 10. These codes 60 may be extracted directly by the code extraction engine 30 and/or inputted by the user (e.g., using the schedule platform 56 and/or the CCM module 44).

Figure 10:
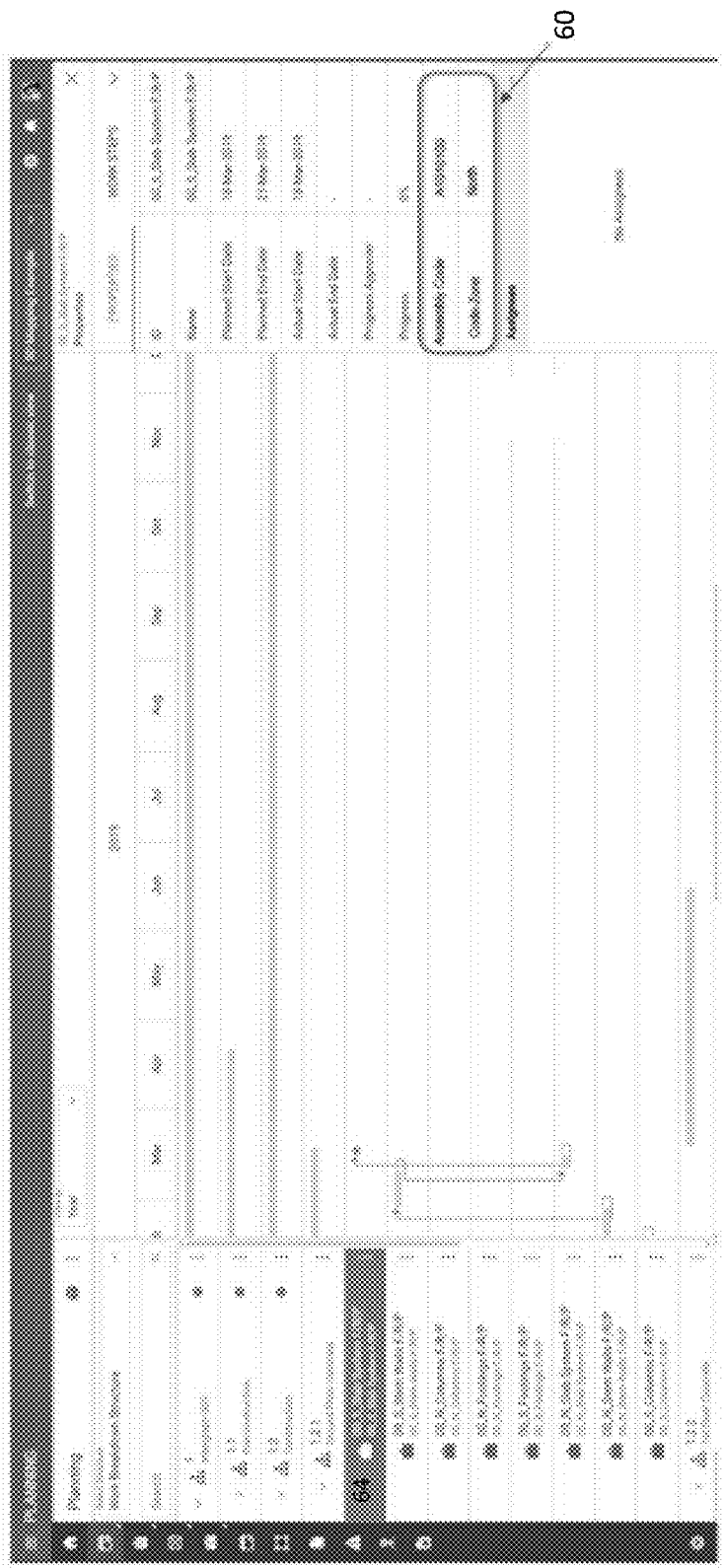
FIG. 10 shows a user interface screen of the system for an imported schedule item of FIG. 9.

FIG. 10 schematically shows a user interface screen of the system 17 for a schedule item 64 of FIG. 9. As shown in FIG. 10, the selected schedule item 64, among a large number of other schedule items, has been imported into the system 17 via the schedule interface 34. The code extraction engine 30 extracts the codes from the schedule platform 56, and may store the schedule item 64, along with the schedule item codes 60 and other associated properties, in the schedule item database 40.

It should be understood that in any of steps 304-308, one or more of the codes 60 may be inputted in the system 17 by the CCM module 44. The CCM module 44 may put instance codes 60 on respective items 62-66 that are related to instances of the current project 10. Thus, the CCM module 44 allows project-specific codes to be inputted (to the extent they have not already been) and provides further versatility to the system 17.

The process then moves to step 310, which creates rules for mapping model items 62, schedule items, and/or cost items. Throughout the process of steps 302-308, illustrative embodiments may import more than 10,000 schedule items and more than 2,000 cost items per project. Manually mapping these items together (e.g., cost items 1, 2, and 3 are associated with schedule item 64) is incredibly difficult. Furthermore, each of the items may have one or more codes. Extracting each of these codes manually is further time-intensive and cost-intensive. However, the inventors recognized that extracting these codes, and applying rules based on the codes, may be used to map items together in a way that is ultimately more efficient than direct mapping of items (e.g., based on item name and/or drag+drop process).

Accordingly, at step 310, the rules engine 48 creates one or more code-based rules for mapping the model items 62, schedule items, and/or cost items using the extracted codes (e.g., classification structure codes). The rule may be a pre-defined rule used from a different project. Alternatively, the rule may be defined by the user through the user interface 46.

Figure 11A:
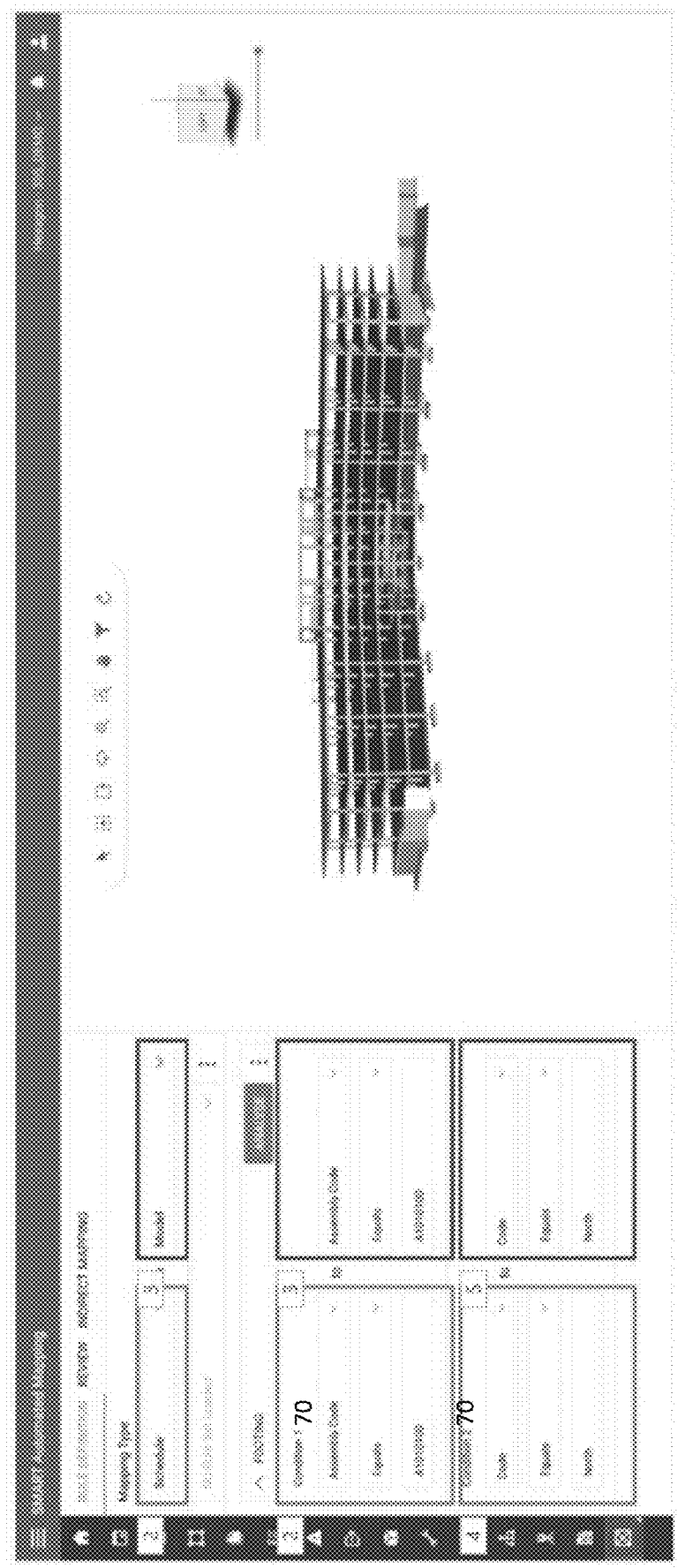
FIG. 11A shows an interface for creating a rule for mapping schedule items to model items using classification structure codes in accordance with illustrative embodiments of the invention.

FIG. 11A schematically shows an interface for creating a rule for mapping schedule items 64 to model items 62 using classification structure codes 60 in accordance with illustrative embodiments of the invention. In the example shown, the model items being mapped are footings for a particular stage of construction. The schedule items and model items are mapped using the rule having one or more conditions. The conditions can be single or multiple, with a plurality of operators (e.g., equals, contains) and stage qualifiers (e.g., initial, design, detailed design, as-built, etc.).

The type of item to be mapped can be selected (e.g., schedule to model). Additionally, a first condition 70 may be set. As shown, in order for the schedule item 64 to be automatically mapped to the model item 62, the assembly code 60 for both items must have an exact match. Additionally, in this example, in order for the mapping to occur a second condition 70 must be met. In this case, both the schedule item 64 and model item 62 must have the "North" code 60. Although only two code conditions 70 are shown in the figure, it should be understood that a large number of code conditions 70 may be defined by the rule in order to map the schedule item 64 and the model item 62. Alternatively, some embodiments may have only a single condition 70 for the rule.

After the rule is created, the process proceeds to step 312, which maps the model items 62, schedule items 64, and/or cost items 66. Specifically, the mapping engine 50 receives the rule defined by the rules engine 48, and maps the items based on the codes received from the code extraction engine 30, the CCM module 44, and/or the databases 38-42. Mapping the model item 62, cost item 66, and schedule item 64 is referred to as a 5D mapping. As known to those of skill in the art, mapping may produce a 5D visualization, where the 5D mapping result is displayed in the user interface 46. In some embodiments, a 5D animation may forecast planned cost curve for any work packages with dates and a 3D visualization of the capital project 10.

Figure 11B:
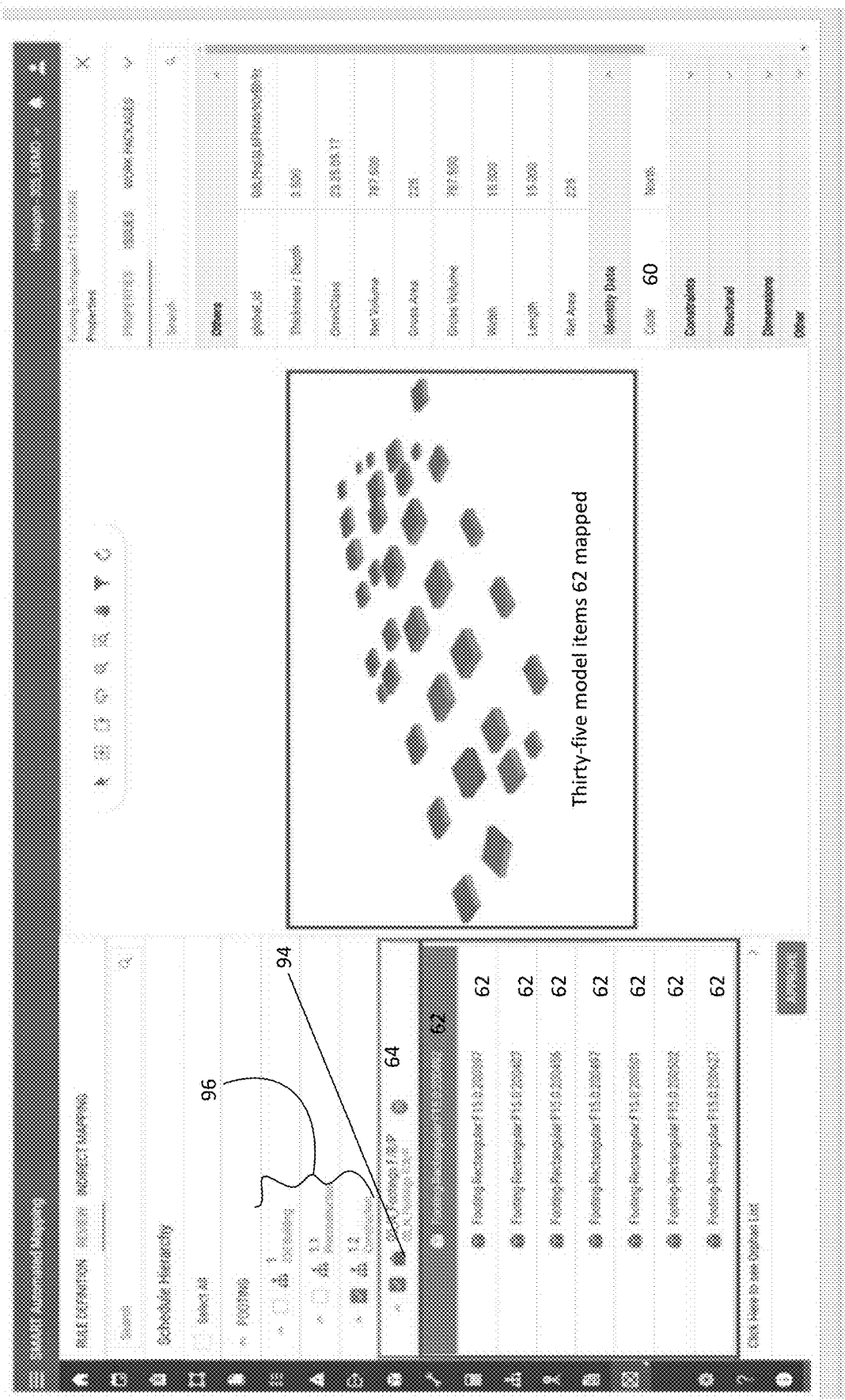
FIG. 11B shows a result of the mapping of FIG. 11A.

FIG. 11B shows a result of the mapping of FIG. 11A. Having run the rule with the two conditions 70 defined previously, the mapping engine 50 determined that thirty-five model elements 62 satisfy the condition 70 of the rule, and that a single schedule item 64 (00_N_footings F/R/P) satisfies the condition 70 of the rule. Therefore, the thirty-five model items 62 are mapped to the single schedule item 64. As shown in FIG. 11B, in some embodiments, work packages 64 are represented by the suitcase icon 94, and the overarching work breakdown structure may be represented by the tree diagram 96.

The process then proceeds to step 314, where the user may review the mapping to confirm the accuracy of the mapping. If the mapping is inaccurate, the user may change the conditions 70 of the rule. Alternatively, if the mapping is acceptable, it can be stored at the global level and can be used for multiple projects 10, thereby saving users additional time.

The process then proceeds to step 316, which asks whether more rules are needed for mapping. If the answer is yes, and more items need to be mapped, then the process returns to step 310, which creates rules for mapping model items 62, schedule items 64, and/or cost items 66. In the example shown in FIGS. 11A-11B, the schedule item 64 has been mapped with the model item 62, but neither of these items has been mapped with a cost item 66. Accordingly, the process returns to step 310.

Figure 11C:
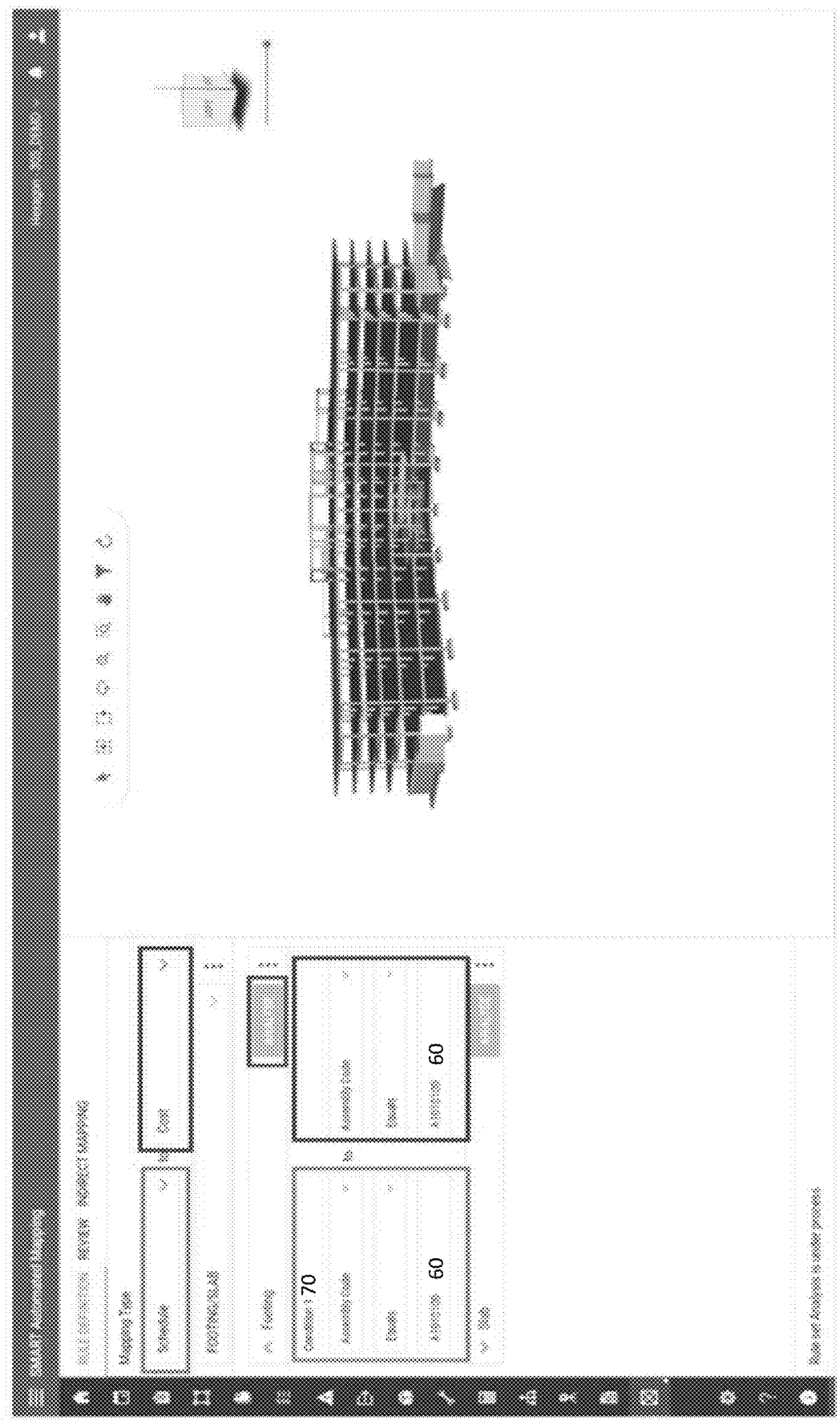
FIG. 11C shows an interface for creating a rule for mapping schedule items to cost items using classification structure codes in accordance with illustrative embodiments of the invention.

Returning to step 310, the schedule item 64 is mapped with the cost item 66. FIG. 11C schematically shows an interface for creating a rule for mapping schedule items to cost items using classification structure codes in accordance with illustrative embodiments of the invention. In the example shown, the schedule items 64 being mapped relate to footings for a particular stage of construction. The schedule items 64 and cost items 66 are mapped using the schedule item-to-cost item rule, which has one or more of the conditions 70. In a manner to the previously described rule, the conditions 70 may include a plurality of operators (e.g., equals, contains) and stage qualifiers (e.g., initial, design, detailed design, as-built, etc.).

Similar to the first rule, the type of item to be mapped can be selected (e.g., schedule to cost), and the first condition 70 may be set. For the schedule item 64 to be automatically mapped with the cost item 66, the assembly code 60 for both items must meet the condition 70. In this example, the condition requires an exact match of the assembly codes 60 (e.g., A1010100). As shown, the cost to schedule mapping doesn't require the "North" code condition 70 shown in a previous figure. Accordingly, illustrative embodiments are mapping the cost item 66 to any schedule item 64 having the same assembly code. Therefore, the cost may be mapped for all assembly items, not just those in the North construction area.

Figure 11D:
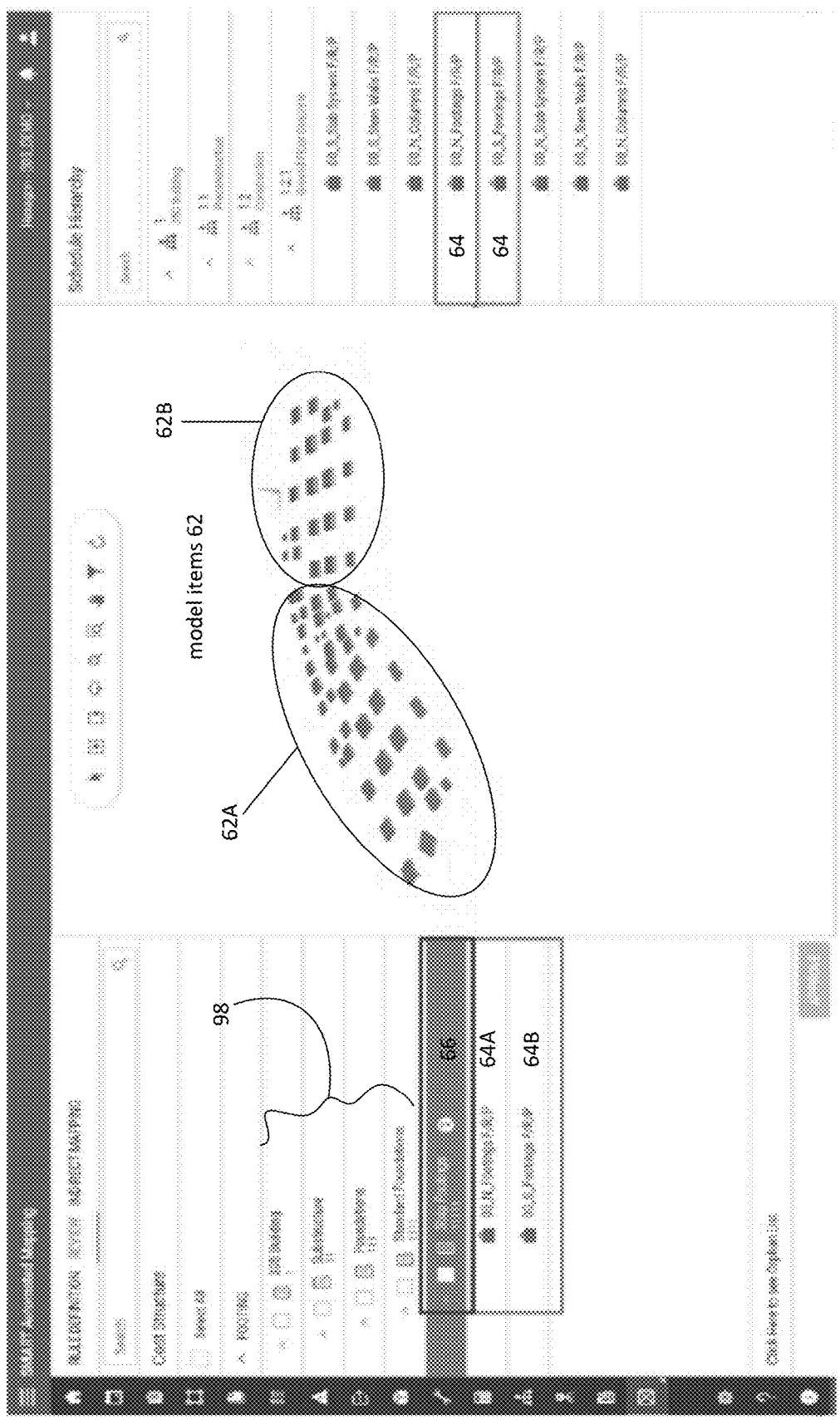
FIG. 11D shows a result of the mapping of FIG. 11C.

The process then again proceeds to step 312, which maps the model items 62, schedule items 64, and/or cost items 66. FIG. 11D schematically shows a result of the mapping of FIG. 11C. Having run the rule with the single condition 70 defined previously, the mapping engine 50 mapped two schedule items 64 (00_N_Footings F/R/P and 00_S_Footings F/R/P) with the strip footings cost item 66 (11111). The cost item 66 is the lowest structure in the cost break breakdown structure 98.

If the user selects the schedule item 64A, then the model items 62A associated with that schedule are also displayed/selected. In a similar manner, if the user selects the schedule item 64B, then the model items 62B associated with that schedule are also displayed/selected.

Accordingly, by mapping the footing model items 62 with schedule item 64 (e.g., FIGS. 11A-11B) and then mapping the schedule items 64 with cost items 66 (e.g., FIG. 11C-11D), the model items 62, schedule item 64, and cost item 66 are mapped. Alternative embodiments may map the model item 62 with the schedule item 64, and then map the model item 62 with the cost item 66. Further embodiments may map the cost item 66 with the schedule item 64, and then map the cost item 66 with the model item 62. However, in illustrative embodiments, after mapping two of the three items, the third item is automatically mapped by virtue of being linked. For example, if model is mapped with cost, and cost is mapped with schedule, schedule automatically becomes mapped to model through the cost link.

The process returns to step 316 which asks if more rules are needed for mapping. As described previously, large-scale capital projects 10 frequently have thousands of items which need to be mapped, so this process may be repeated until all desired model items 62, cost items 66, and schedule items 64 are mapped.

The process then proceeds to step 318, which asks if a change order has been received. As described earlier, capital project schedules, budgets, and models change frequently during the course of the project 10. Therefore, it is common to have a change order revising any of the items associated with schedule, budget, and/or model.

If the system 17 receives the change order, then the process returns to step 310, which creates and/or revises a rule for mapping. For the sake of simplicity, take the example where the change order introduces a new model item 62, such as a slab. For example, this change may be made by the architects or engineers.

Figure 12A:
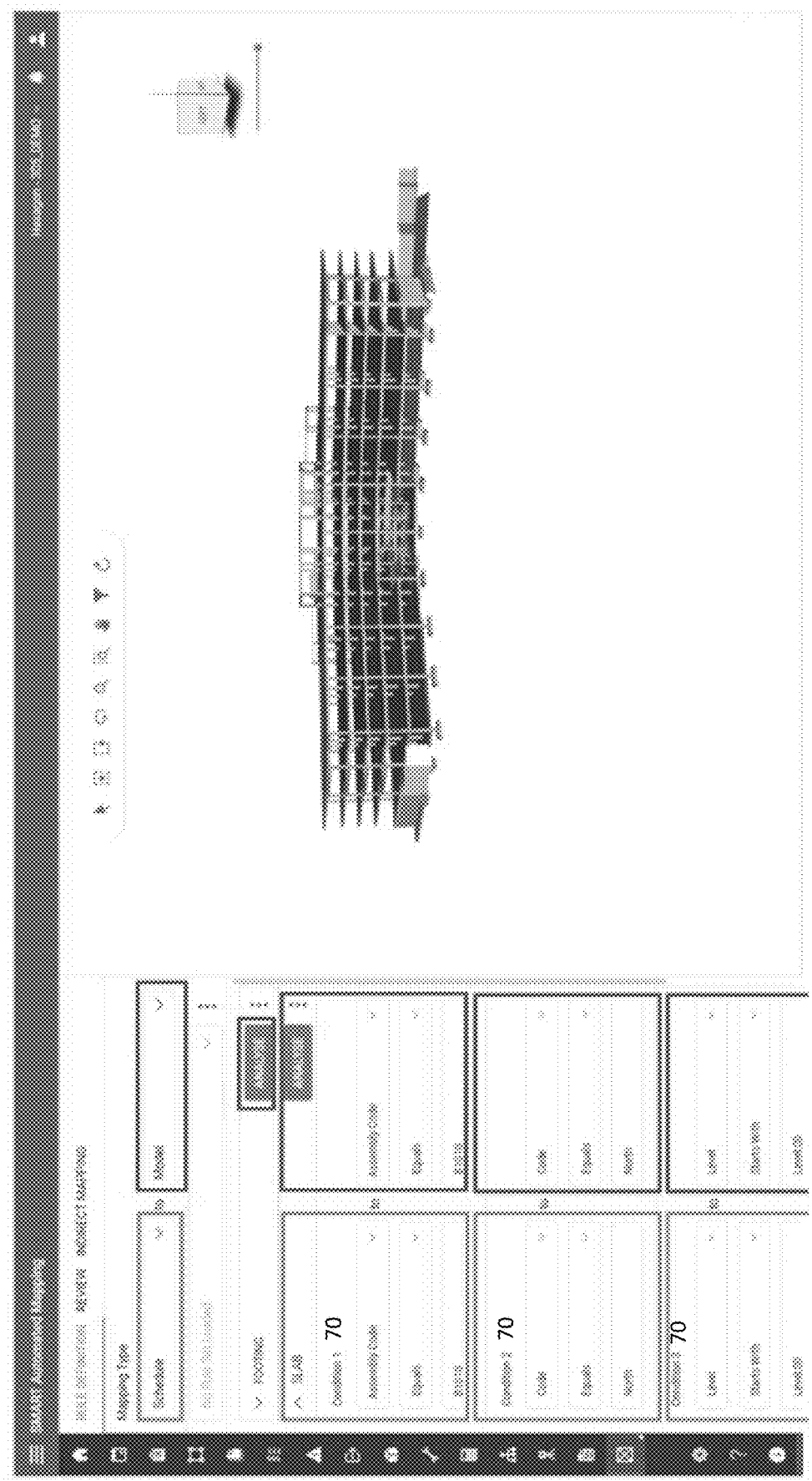
FIG. 12A shows a rule for mapping schedule items to model items using classification structure codes in accordance with illustrative embodiments of the invention.

FIG. 12A schematically shows an interface for mapping schedule items 64 to model items 62 using classification structure codes 60 in accordance with illustrative embodiments of the invention. In the example shown, the model items 62 being mapped are slabs for a particular stage of construction.

Similar to the interface of FIG. 11A, the type of item to be mapped can be selected (e.g., schedule to model). Additionally, the first condition 70 may be set. As shown, in order for the schedule item 64 to be automatically mapped to the model item 62, the assembly code 60 for both items must have an exact match (e.g., B1010). Additionally, in this example, in order for the mapping to occur a second condition 70 must be met. In this case, both the schedule item 64 and model item 62 must have the "North" code. This example further requires a third condition 70, where the level code 60 of the schedule item 64 and the model item 62 starts with the same sequence (e.g., Level: 00).

Figure 12B:
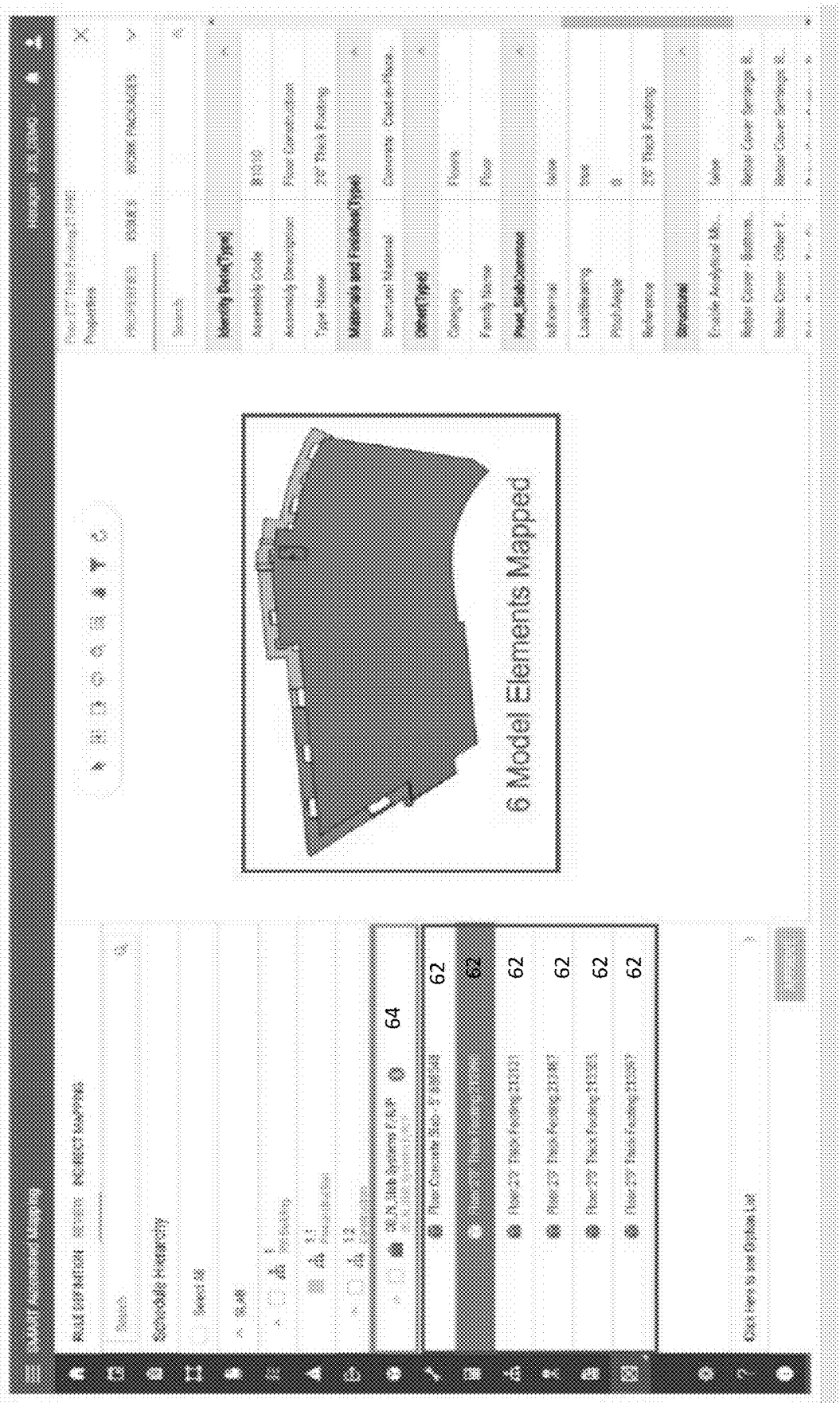
FIG. 12B shows a result of the mapping of FIG. 12A.

FIG. 12B schematically shows a result of the mapping of FIG. 12A.

Having run the rule with the three conditions 70 defined previously, the system 17 determines that six model elements 62 (Floor Concrete Slab-5'888548 to Floor 2'0' Thick Footing 211097) were mapped with the schedule item 64 (00_N_Slab Systems F/R/P).

After step 310, the process may once more run through steps 312-318. For example, the slabs model item 62 or schedule item 64 may need to be mapped with cost items 66.

Figure 12C:
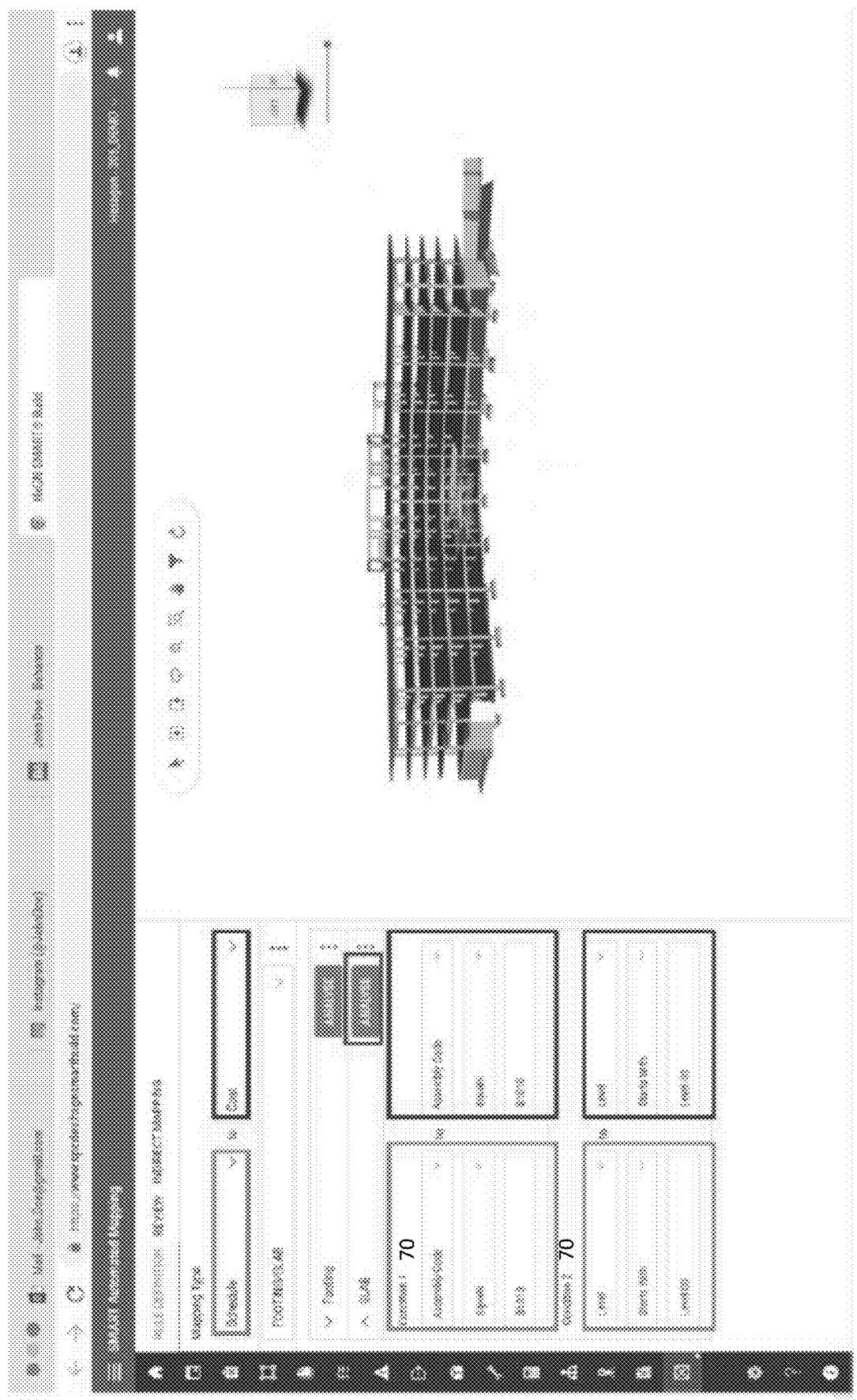
FIG. 12C shows a rule for mapping schedule items of FIGS. 12A-12B to cost items using classification structure codes in accordance with illustrative embodiments of the invention.

FIG. 12C shows the rule for mapping schedule items 64 of FIGS. 12A-12B to cost items 66 using classification structure codes 60 in accordance with illustrative embodiments of the invention. In the example shown, the schedule items 64 being mapped relate to slab model items 62 for a particular stage of construction. The schedule items 64 and cost items 66 are mapped using the schedule item-to-cost item rule, which has one or more conditions 70. Similar to the previously described rules, the conditions may include a plurality of operators (e.g., equals, contains) and stage qualifiers (e.g., initial, design, detailed design, as-built, etc.).

Figure 12D:
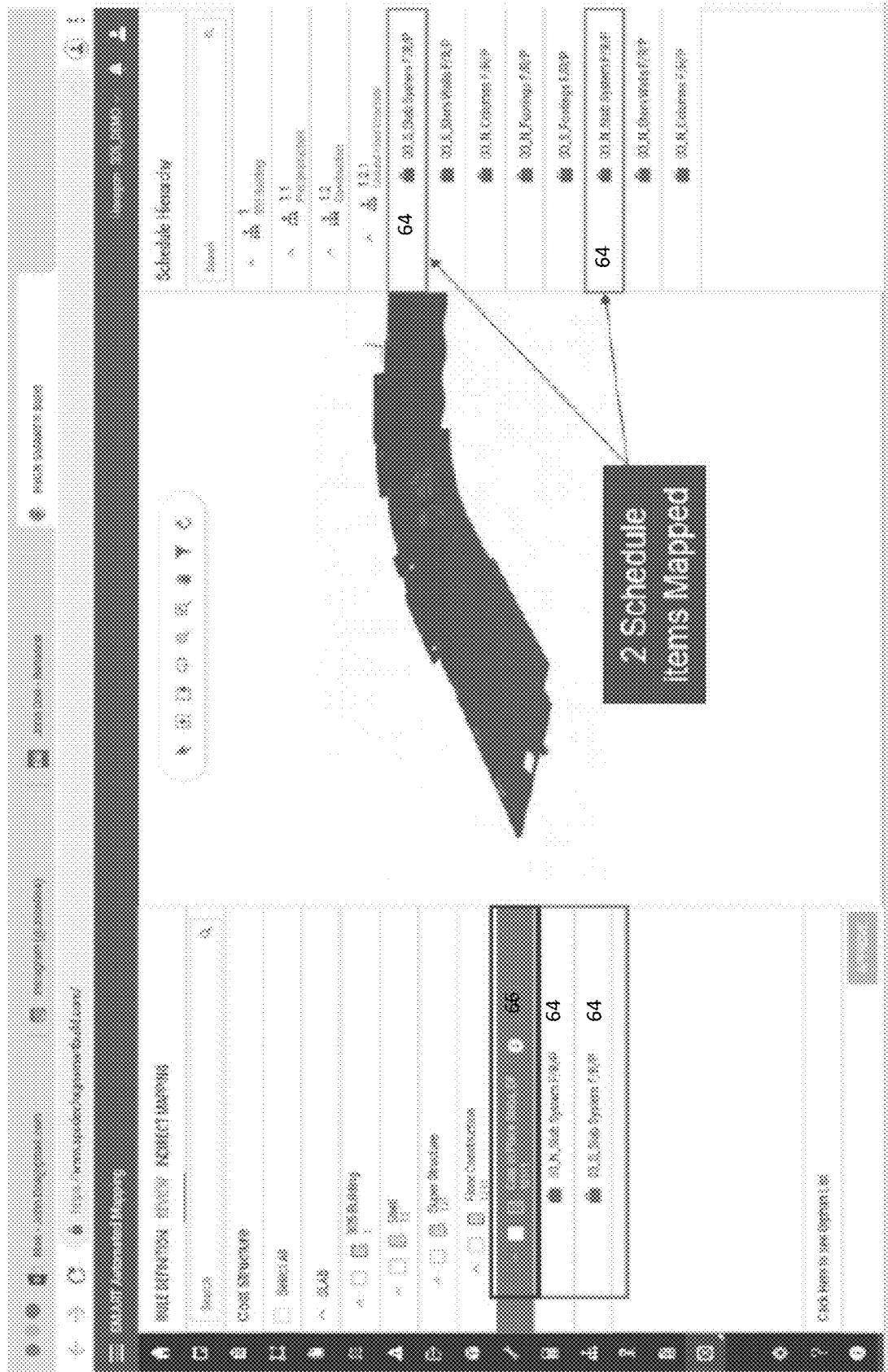
FIG. 12D shows a result of the mapping as defined by the rule of FIG. 12C.

The type of item to be mapped can be selected (e.g., schedule to cost). Additionally, the first condition 70 may be set. In this example, in order for the schedule item 64 to be automatically mapped with the cost item, the assembly code 60 for both items must have an exact match. (e.g., B1010). As shown, the cost to schedule mapping doesn't require the "North" code condition 70. However, in this example, the second condition requires the schedule item 64 and cost item 66 must start with the same sequence (e.g., Level: 00) to be mapped. FIG. 12D schematically shows a result of the mapping as defined by the rule of FIG. 12C. Having run the rule with the two conditions 70 defined previously, the mapping engine 50 determines that two schedule items 64 are mapped (00_S_Slab System F/R/P and 00_N_Slab System F/R/P) with the cast in place slabs cost item 66 (12111). Thus, the schedule items 64 are mapped to cost items 66 of the entire 00 level using various the conditions 70 in the rule.

Although the above embodiments described are simple, this is merely for ease of discussion. It should be understood that mapping may be relatively complex, requiring multiple rules and mapping of many more items than shown in these simplified examples.

Thus, the system 17 advantageously quickly identifies and maps changes to the model item 62 (e.g., from a change order) in accordance with the code-based rules previously established. To that end, the mapping engine 50 has the automated comparator 52, which compares the original item with the item in the change order.

Figure 13:
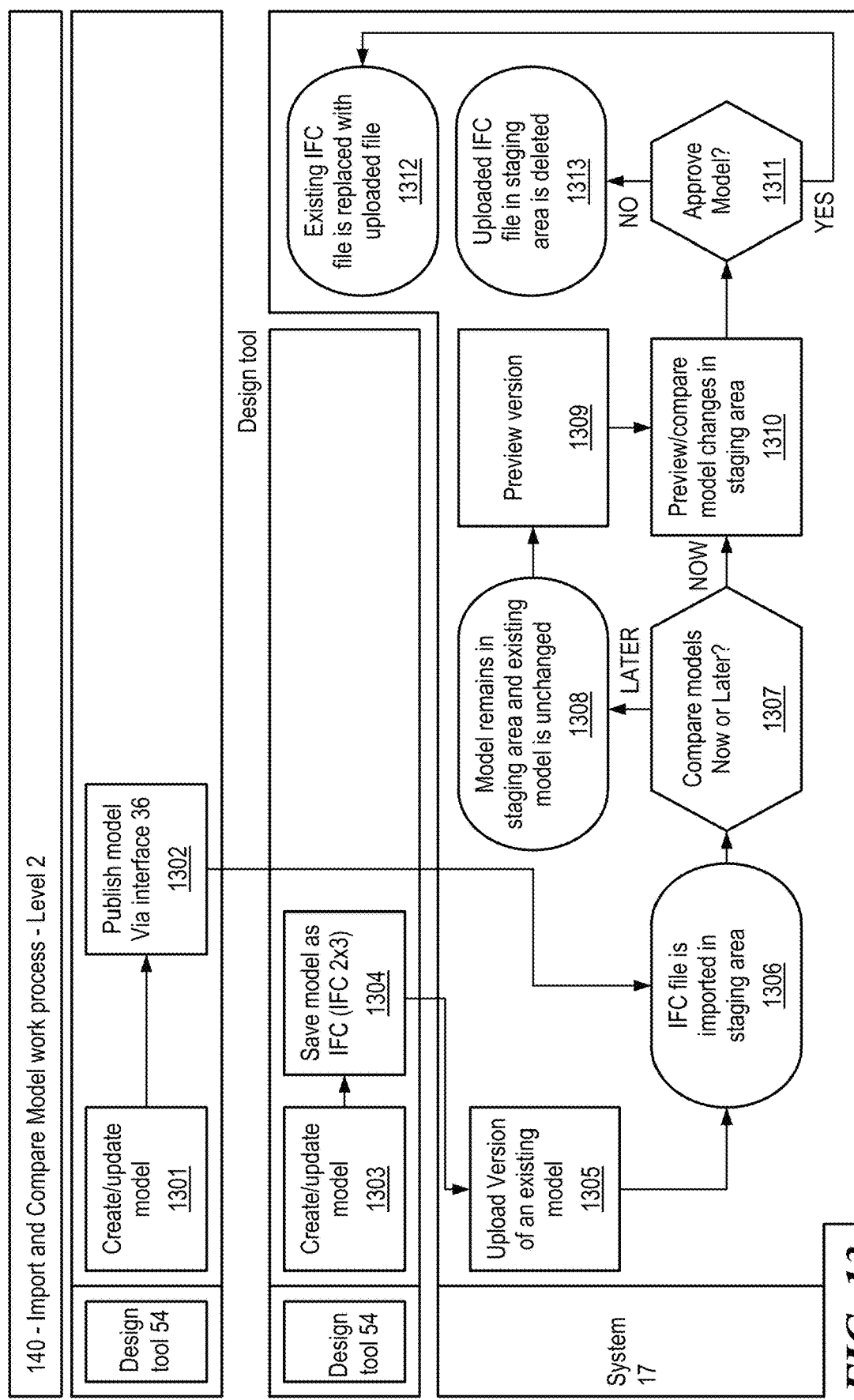
FIG. 13 shows a process of updating the rules-based mapping when a model item changes, in accordance with illustrative embodiments of the invention.

FIG. 13 schematically shows a process of updating the rules-based mapping when a model item 62 changes, in accordance with illustrative embodiments of the invention. To show the process in its entirety, the process begins at step 1301, which creates the initial model. The initial model is published at step 1302, and imported into the system 17 at step 1306 through the model interface 32.

At step 1303, the user may wish to create and/or update one or more of the model items. At step 1304, the model item 62 may be saved as IFC files. IFC is a global standard for data exchange in the building industries. IFC is both a common data model and an open file format. Building industry professionals can use IFC to share data regardless of what software application they use to get their job done. Similarly, data from one phase of the building lifecycle can be utilized in a later stage without the need for data reentry, custom import interfaces or proprietary plugins.

IFC models contain a structured combination of geometric and non-geometric data (e.g., including coded properties of the model items). This data can be displayed, analyzed and modified in different ways by the system. As described previously, the model item 62 includes both geometric (3D and 2D) and non-geometric data (e.g., codes). As an example, consider the footing model items.

The various footing model items 62 are defined as footings in the system 17. The footings may already be classified in the building domain, and information about the footings may be stored in the model item database 38. There are shared properties that are common to similar footings both in the same project 10 and across different projects 10. Both the type and the instance can have attributes and properties attached to them. Common information, like the maintenance instruction, model number, size, etc., may be attached to the type. However, specific properties like serial number, installation date, condition, etc. may be assigned to the particular instance.

Therefore, when these properties are assigned to particular model items 62, the model item interface 32 extracts these properties when the updated model item 62 is imported into the system 17. In some embodiments, the model may be saved as an IFC file. However, in some other embodiments, the model may have a different file type.

At step 1307, the system compares the new model item 62 to identify newly added items, modified items, deleted items, and unmodified items. Additionally, the various classification structure codes attached to the model items can be viewed. At step 13010, the model changes, additions, revisions, or deletions can be previewed. Thus, the system 17 advantageously allows users to identify deleted items, newly added items, modified items, and unmodified items. Additionally, the user can see the various classification structure codes attached to the model items. At step 13011, the process asks whether to approve the model. If the user does not approve the revisions to the model item(s), then the updated model items are not mapped. However, if the user does approve the revisions, then the process moves to step 13012, and the existing model item(s) are replaced with the new file and automatically mapped in accordance with the previously defined rules. Because of the new/revised model, the illustrative embodiments map the model with the schedule and the cost to update the relationship between model item 62 and cost item 66, or model item 62 and schedule item 64.

Advantageously, the entire new model does not have to be remapped. Previously, users had to adjust each model item 62 change. This could be incredibly tedious and time-consuming, as model items could be deleted, added, or revised. Furthermore, each model item 62 may be tied with multiple schedule items and/or cost items. Making these revisions manually is error prone and time consuming. Illustrative embodiments automatically map the changes by applying the previously defined code-based rules to the revised model item(s). Thus, the system runs the rules to map the model item, and newly added data is quickly available for downstream use.

During a capital project, the schedule is frequently revised on a weekly, twice-weekly, or monthly basis due to construction progress updates. For example, if project 10 activities are delayed, the revised program results in a change of dates. Thus, the schedule planner may release a new schedule to the construction team, either in the form of a catchup schedule or a new schedule.

In illustrative embodiments, the schedule interface 34 receives the new schedule and compares the activities of the new schedule with the existing schedule. The system 17 may output a comparison of the schedules, to allow the user to see the new activities, modified activities, or deleted activities.

Figure 14:
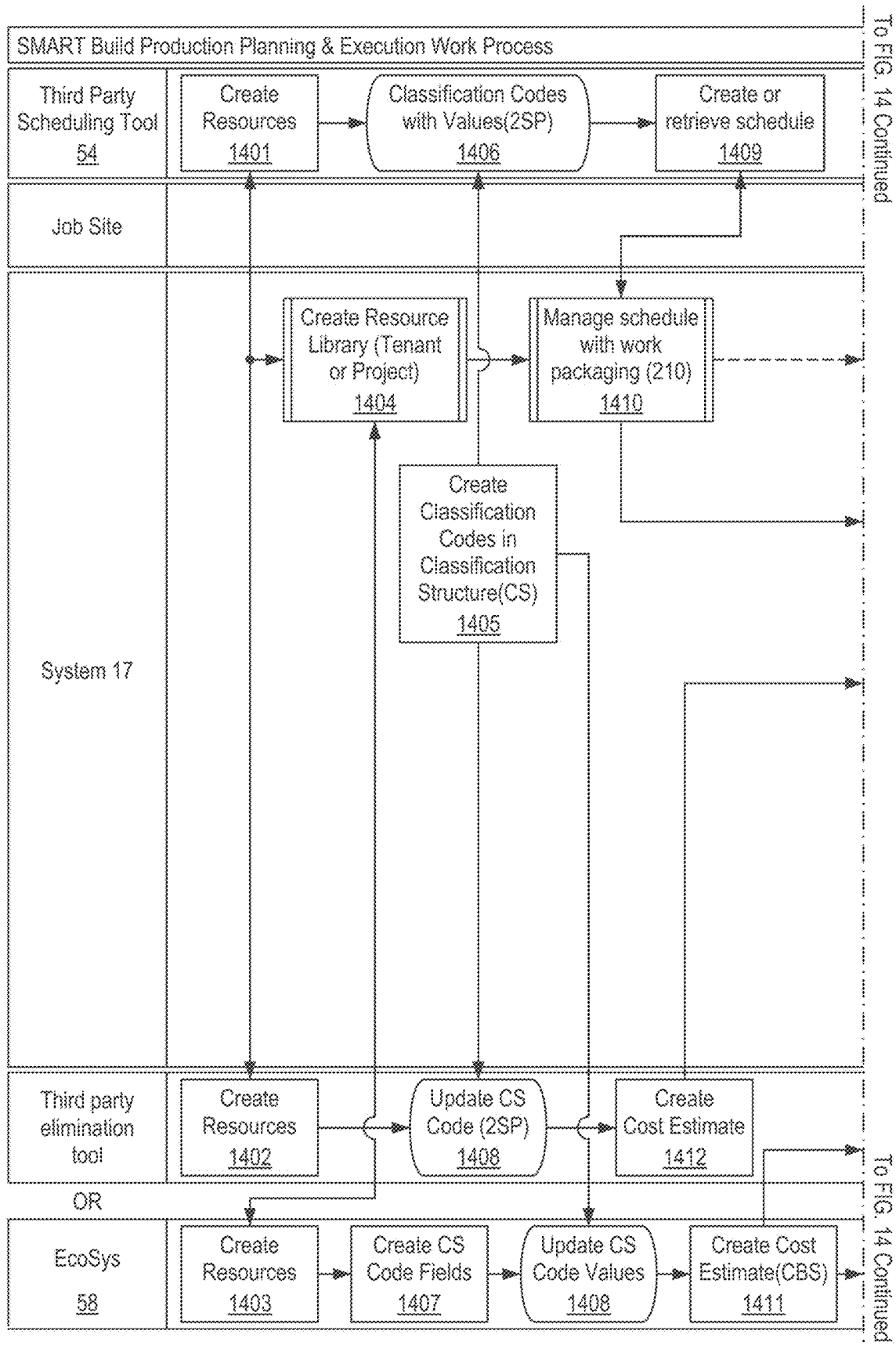
FIG. 14 shows a process of updating a mapped schedule item in accordance with illustrative embodiments of the invention.
Figure 14:
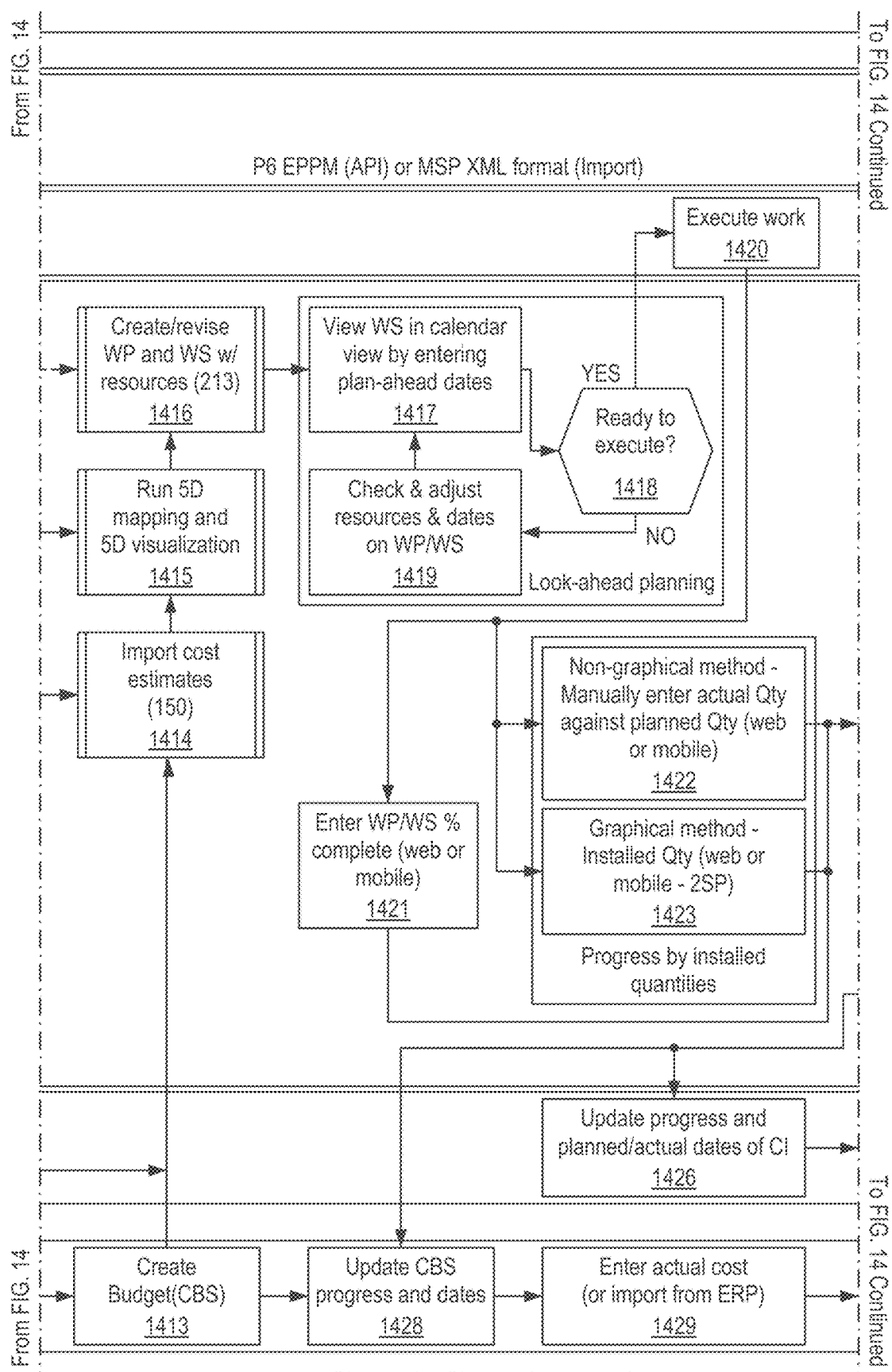
Figure 14:
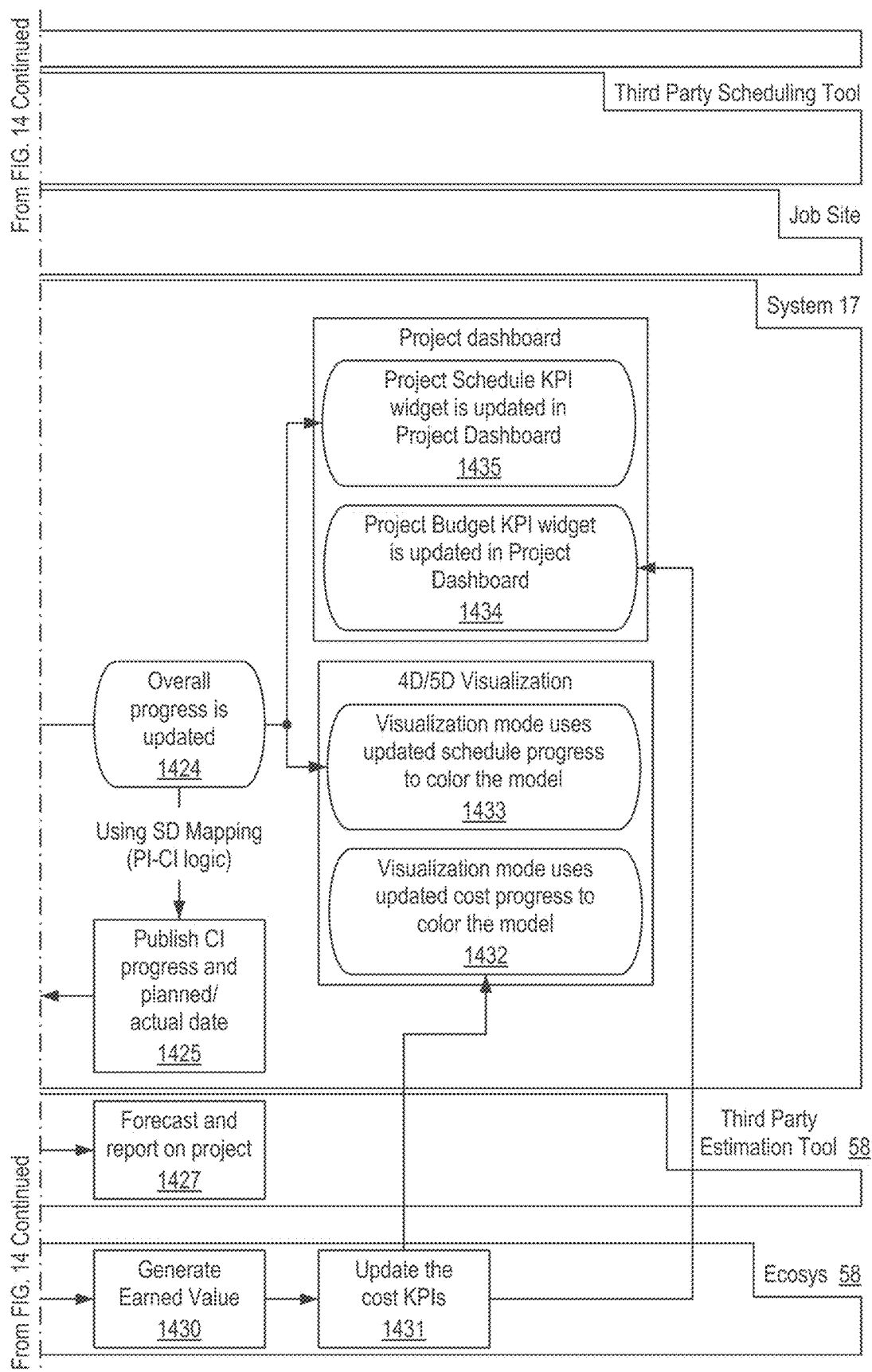

FIG. 14 schematically shows a process of mapping schedule items 64, model items 62 and cost items 66 in accordance with illustrative embodiments of the invention. This process enables more efficient monitoring of construction progress and provides further insight than traditional, manual practices. It should be noted that this process can be a simplified version of a more complex process of mapping schedule items 64, model items 62 and cost items 66. As such, the process may have additional steps that are not discussed. In addition, some steps may be optional, performed in a different order, or in parallel with each other. Accordingly, discussion of this process is illustrative and not intended to limit various embodiments of the invention. Finally, although this process is discussed with regard to performing a single mapping, the process of FIG. 14 can be expanded to cover mapping a plurality of model items, schedule items, and cost items, including the large number usually associated with large-scale capital projects 10.

The process begins at step 1401-1404, which define resources, such as labor, materials, equipment, and subcontractors to be used. Steps 1404-1408 describe the steps for creating the codes (using the classification structure) to be added to the schedule items 64, model items 62 and cost items 66. The schedule is created in step 1409, and imported into the system 17 in step 1410, where WPs (work packages) are created from the schedule items 64. The cost estimate and budget are created in steps 1411-1413 (two alternate applications are shown in the bottom two swimlanes-steps 1412 if an estimation-only tool is used, and steps 1411 and 1413 if a cost management platform is used for both estimate and budget). The project cost estimate is then imported into the system 17. After the system 17 has all three items: schedule items 64, model items 62 and cost items 66, step 1415 describes an embodiment for mapping the model items 62, schedule items 64, and cost items 66. This process has generally been described previously, and therefore is not described here again. At step 1416, the work packages are further defined with work steps that can be executed at the job site. The process then proceeds to step 1417, where the work steps are viewed (e.g., in a calendar view) by entering plan-ahead dates. Step 1418 asks if the plan is acceptable and work packages are ready to be executed (i.e., perform the scheduled construction). If not, then the process proceeds to step 1419 which checks and adjusts the resources and dates on the WP/WS. If yes, the contractor executes the work at the job site.

The user may use the system 17 to enter the WP/WS % that is completed using, for example, an internet-connected computing device. Alternatively, the process may proceed to step 1422 or 1423, which provide two different methods of updating progress by installed quantities. At step 1422, the user manually enters actual quantity used against planned quantity. At step 1423, the user uses a graphical method by selecting the objects completed in the 3D view of the model.

Step 1424 updates the overall progress using schedule item-cost item logic. This logic allows progress to be entered on the schedule WBS (Work Breakdown Structure) (e.g., by a project manager using an internet connected mobile device and application) and converts the progress to the CBS (Cost Breakdown Structure) in the project management cost platform 58 via the pre-established 5D mapping. The process proceeds to step 1425, which publishes cost item 66 progress and planned/actual dates. At step 1426, the progress of the actual cost item may be updated in a third-party cost estimation tool, such as the cost platform 58. Because the cost was mapped to the schedule and the model (in steps 1401-1415), at step 1427 a quick forecast and report can be created using the relation of the cost to the schedule and the model.

At step 1426 or 1428, the progress and actual dates are updated in the cost breakdown structure. At step 1429, the actual cost is inputted into the cost management platform 58 or directly into the system 17. If the cost is updated in the management platform 58, the cost may be extracted by the cost interface 36. At steps 1430-1431, the system may generate earned value and update the cost KPIs (e.g., CPI—cost performance index).

At steps 1432-1433 visual reports are generated, for example, showing a 5D visualization. The 5D visualization allows the progress of the 3D model to be graphically compared to the progress of the schedule and the cost/budget. Users can determine whether the budget is on target, overbudget, or underbudget. Additionally, the system can display whether the schedule is on track, behind schedule, or ahead of schedule. The visualization may have color indications based on the update schedule progress and/or the update cost progress (e.g., red is behind schedule and/or overbudget, green is on schedule and/or on budget). Finally, at steps 1433-1434, a project schedule KPI widget and project budget KPI widget may be updated in the user interface 46.

Figure 15:
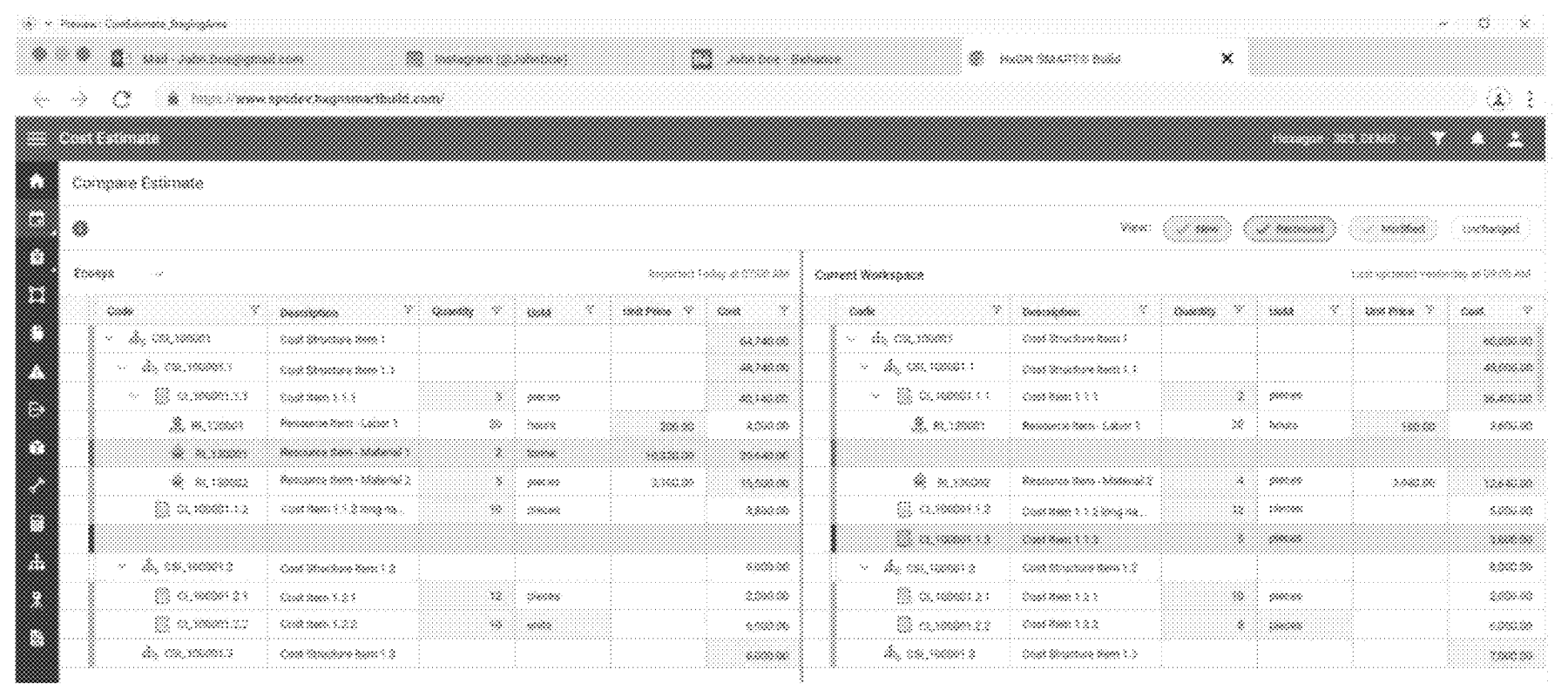

An additional advantage of illustrative embodiments includes easy identification of changes between versions of model items 62, schedule items 64, and/or budget items 64 using the automatic comparator 52. FIG. 15 schematically shows a user interface screen for a change to the budget that is highlighted by the automated comparator 52 in accordance with illustrative embodiments of the invention. In this example, the automated comparator 52 highlights added, deleted, and/or changed cost items 66 information and presents an option to reject or accept (i.e., import) the cost. After the cost changes are accepted, the mapping engine 50 must re-run the rule to connect the new cost items with the schedule items 64 or the model items 62. Accordingly, the system 17 may keep the WBS (schedule items) and budget (cost items) linked after the change and allows accurate cost forecasts to be prepared for the project 10 in real time. In a similar manner, changes to the schedule items 64 and/or model items 62 may be identified by the comparator 52 and displayed in the user interface 46.

Figure 16:
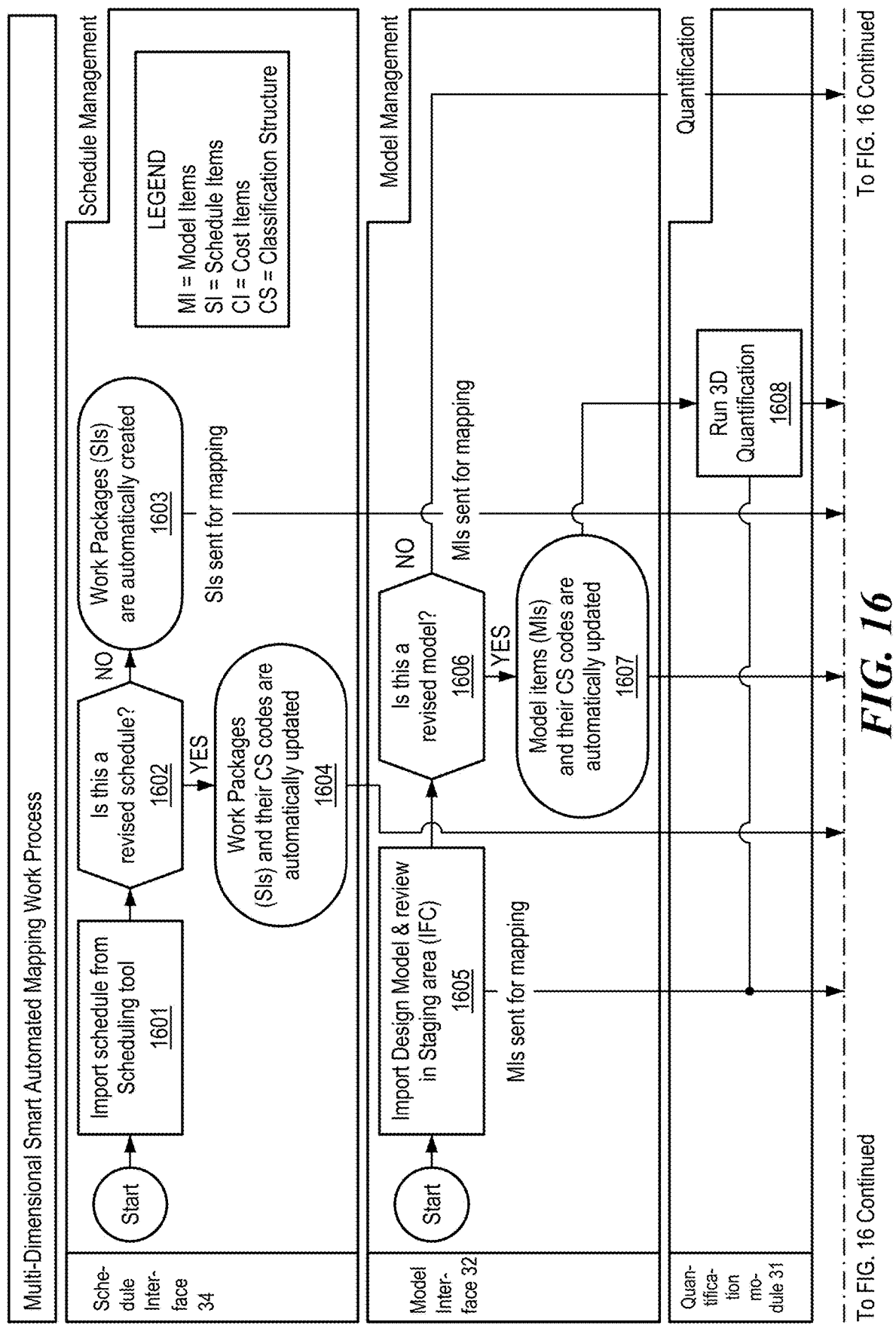
FIG. 16 shows a process of how the change management of model, cost, and schedule items affects the mapping in accordance with illustrative embodiments of the invention.
Figure 16:
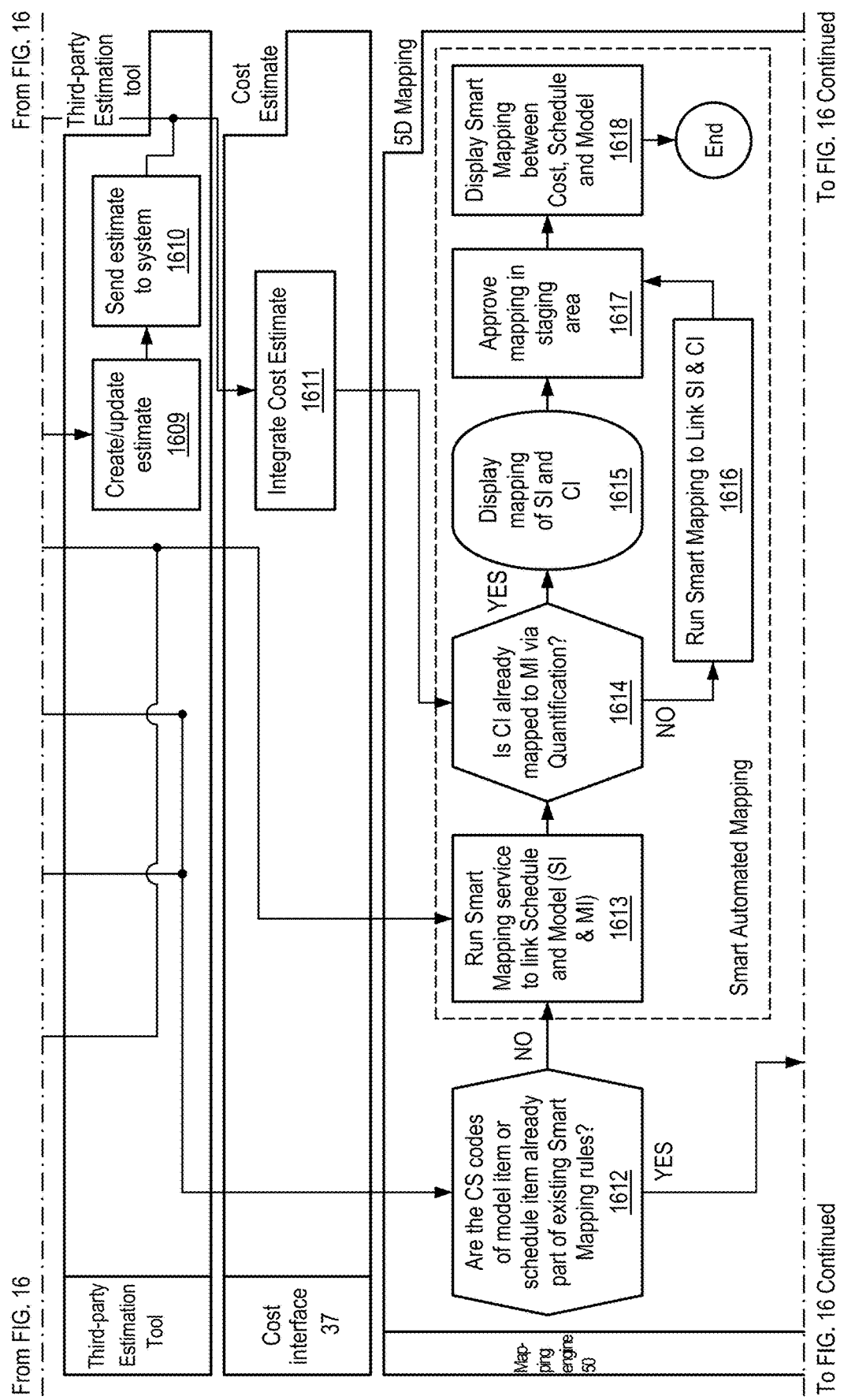
Figure 16:
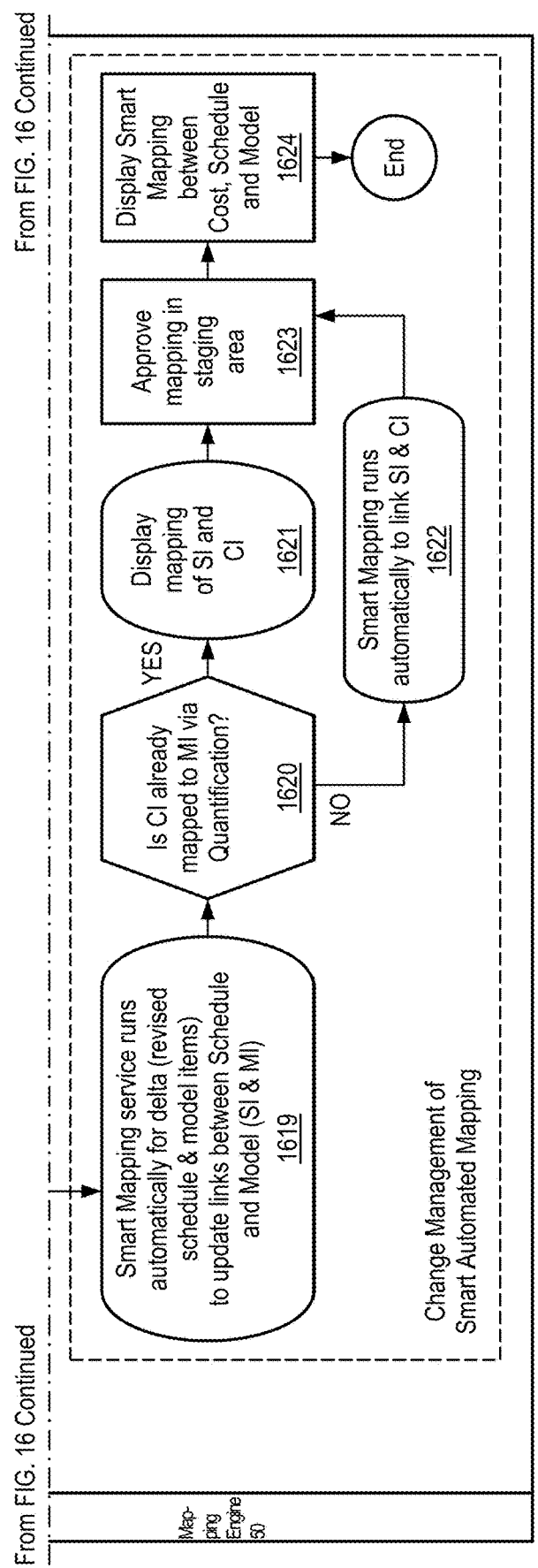

FIG. 16 shows a process of how change management of model, cost, and schedule items affects the mapping in accordance with illustrative embodiments of the invention. It should be noted that this process can be a simplified version of a more complex process of schedule item 64, model item 62 and cost item 66 change management. As such, the process may have additional steps that are not discussed. For example, illustrative embodiments may have steps from FIG. 14 incorporated in the process. In addition, some steps may be optional, performed in a different order, or in parallel with each other. Accordingly, discussion of this process is illustrative and not intended to limit various embodiments of the invention. Finally, although this process is discussed with regard to performing a single change order, the process of FIG. 16 can be expanded to cover a plurality of change orders.

At step 1601, the schedule is imported into the system 17 from the scheduling platform 56 via the schedule interface 34. The process asks at step 1602 if the imported schedule is a revised schedule. If no (e.g., this is the first time the schedule has been imported), then the process proceeds to step 1603 where the schedule items 64 are automatically created and sent for mapping. If yes, then the work packages and their classification structure codes 60 are automatically updated.

At step 1605, the model is imported into the system 17 from the modeling platform 54 via the model interface 32. The process asks if the imported model is a revised model. If no (e.g., this is the first time the model has been imported), then the model items 62 are automatically sent for mapping. If yes, then the model items and their classification structure codes 60 are automatically updated. At step 1608, the 3D model is sent to a quantification module 31 so that a quantification of the 3D items may be determined. The quantification may be performed by a quantification module 31 of the system. The quantification module 31 analyzes the model to determine how many quantities there are of each model item 62. The total of each item is an output of the quantification. The quantification module 31 may be part of the code extraction engine 30. However, in some embodiments, the quantification module 31 may be an entirely separate module.

Figure 17A:
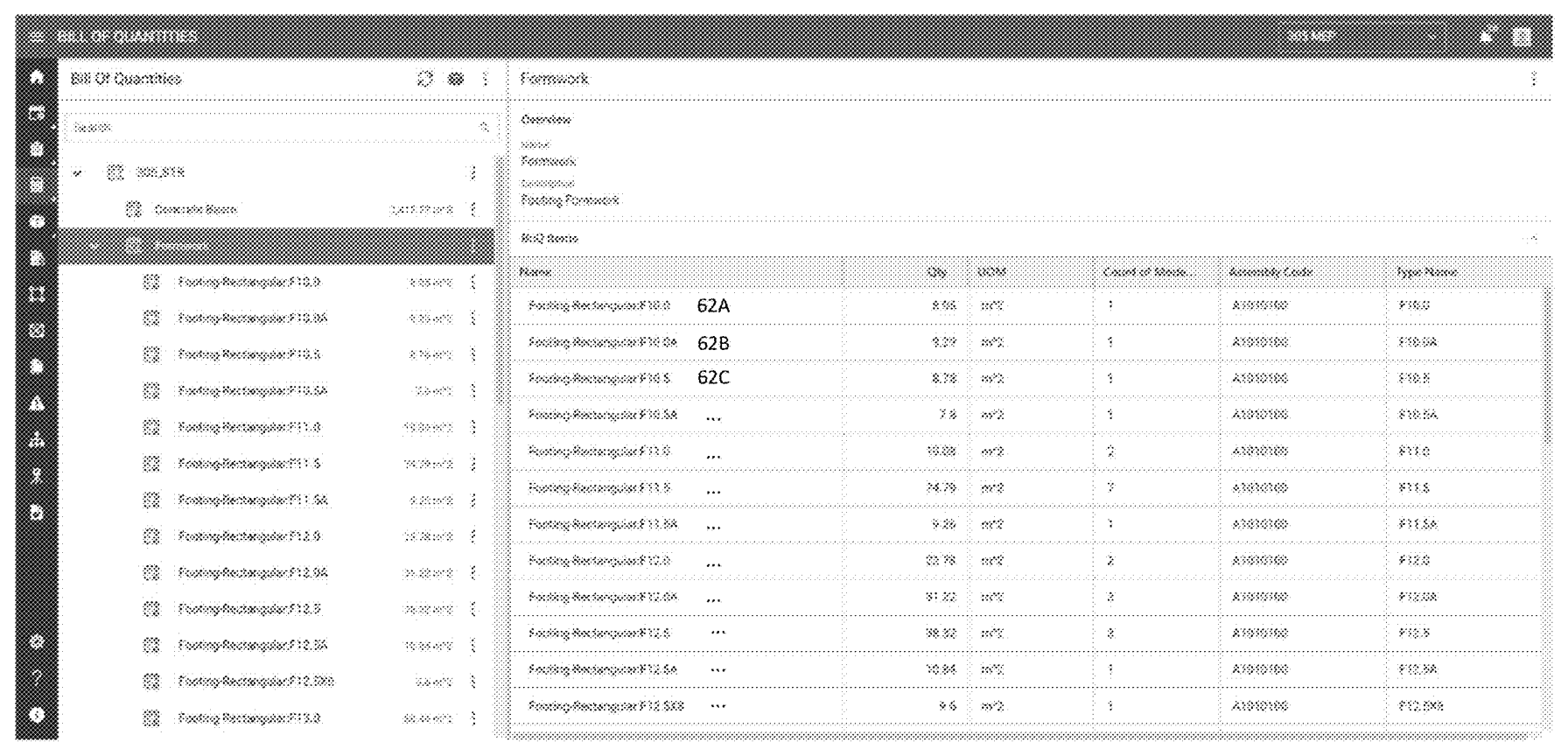

FIG. 17A shows a screenshot of an output of the quantification module 31 in accordance with illustrative embodiments. In this example, the output is a detailed quantity takeoff. The quantification module 31 may calculate a quantity for each of the model items 62A . . . 62N using a rule-based quantification formula. Although only footings are shown in this figure, it should be understood that all project 10 model items 62 may be quantified. This particular set of footings is shown merely for discussion purposes, and is not intended to limit illustrative embodiments of the invention. Other model items 62, such as concrete beams and slabs may also be quantified. The interface screen may also display the various properties of classification code against each bill of quantity (BOQ) line item. The user interface may display the various grouping of footing types based on size and shapes as calculated in BOQ.

Figure 17B:
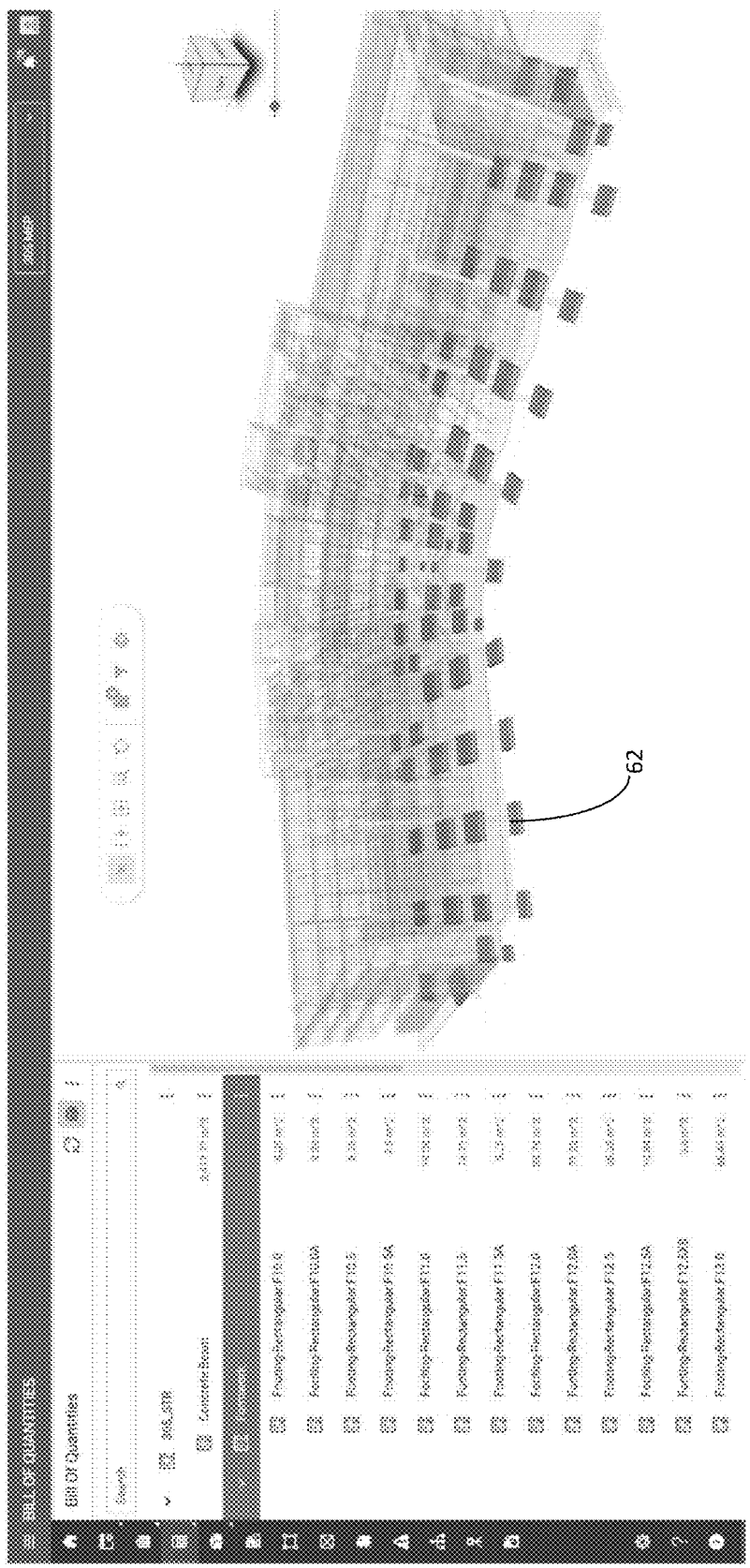
FIG. 17B shows a model view of the detailed quantity takeoff in accordance with illustrative embodiments of the invention.

FIG. 17B shows a model view of the detailed quantity takeoff in accordance with illustrative embodiments of the invention. The user may switch from the table view shown in FIG. 17A to the model view shown in FIG. 17B. The model view can enhance visualization by showing BOQ quantities as well as connected model items 62. By clicking on BOQ item, the system 17 highlights connected model items 62.

The quantification from step 1608 may be provided to the third-party estimation tool (e.g. cost platform 58). The third-party estimation tool may use the quantification to create a budget (or part thereof) and/or update the budget. Therefore, in some embodiments, sending the quantification to create the budget is another method of mapping the cost items 66 with the model items 62. At step the budget is communicated to the system 17 (e.g., via the construction cost interface 36).

Figure 18A:
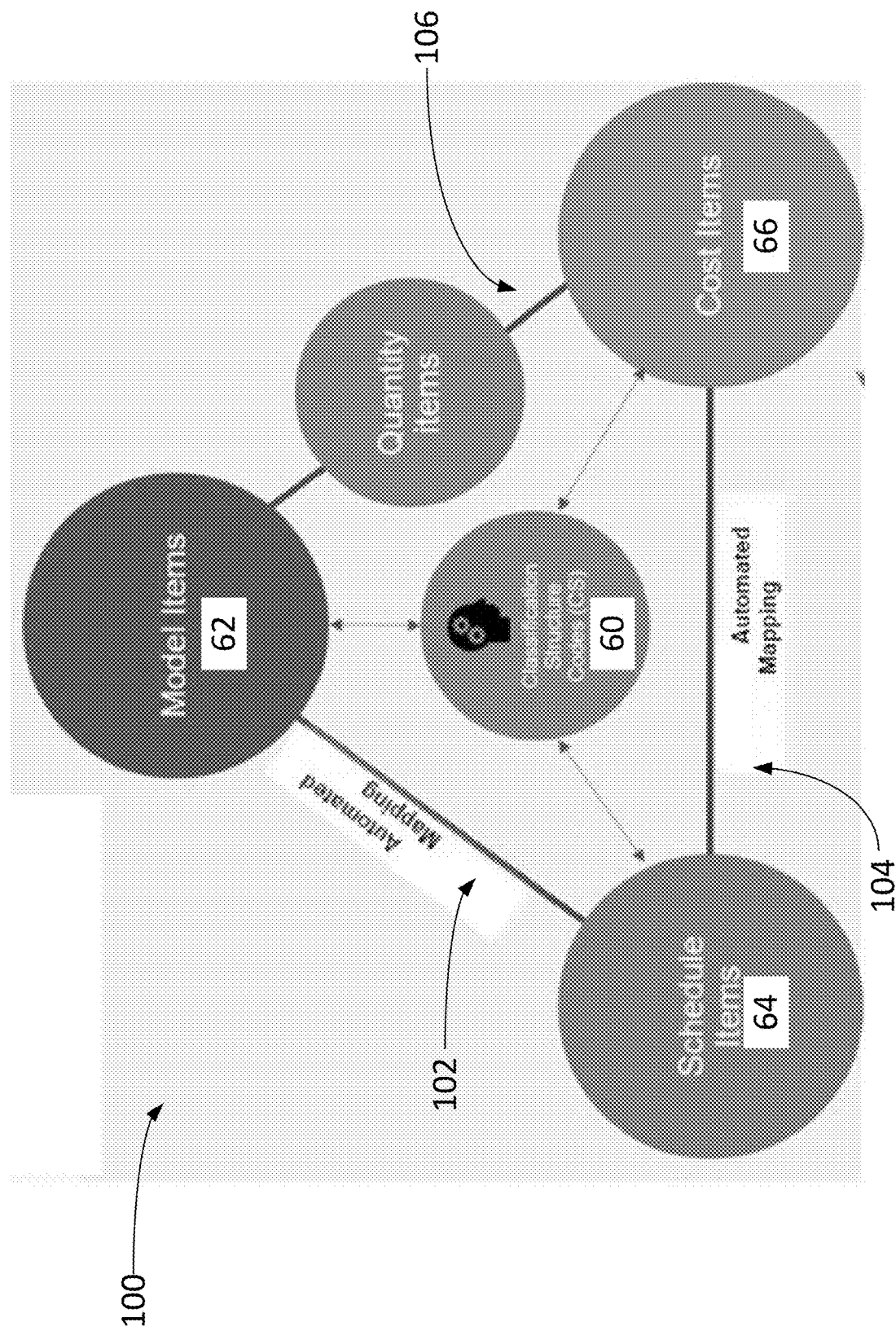
FIG. 18A schematically shows a representation of 5D mapping in accordance with illustrative embodiments of the invention.

The process then proceeds to step 1612, which asks if the classification structure codes 60 of the model item 62 or the schedule item 64 are already in the 10 system 17 (e.g., in the databases 38-42). If not, then the mapping process is run at steps 1613-1618. FIG. 18A schematically shows a representation of 5D mapping 100 in accordance with illustrative embodiments of the invention. As discussed previously, during 5D mapping, the model items 62, the schedule items 64, and the cost items 66 are mapped together. Accordingly, three generic links exist, schedule-model link 102 (also referred to as model-schedule link 102), schedule-cost link 104 (also referred to as cost-schedule link 104), and model-cost link 106 (also referred to as cost-model link 106).

In illustrative embodiments, mapping two of the three links 102, 104, and 106 allows the system 17 to automatically map the third link. These links are created using the code-based rules described previously.

Figure 18B:
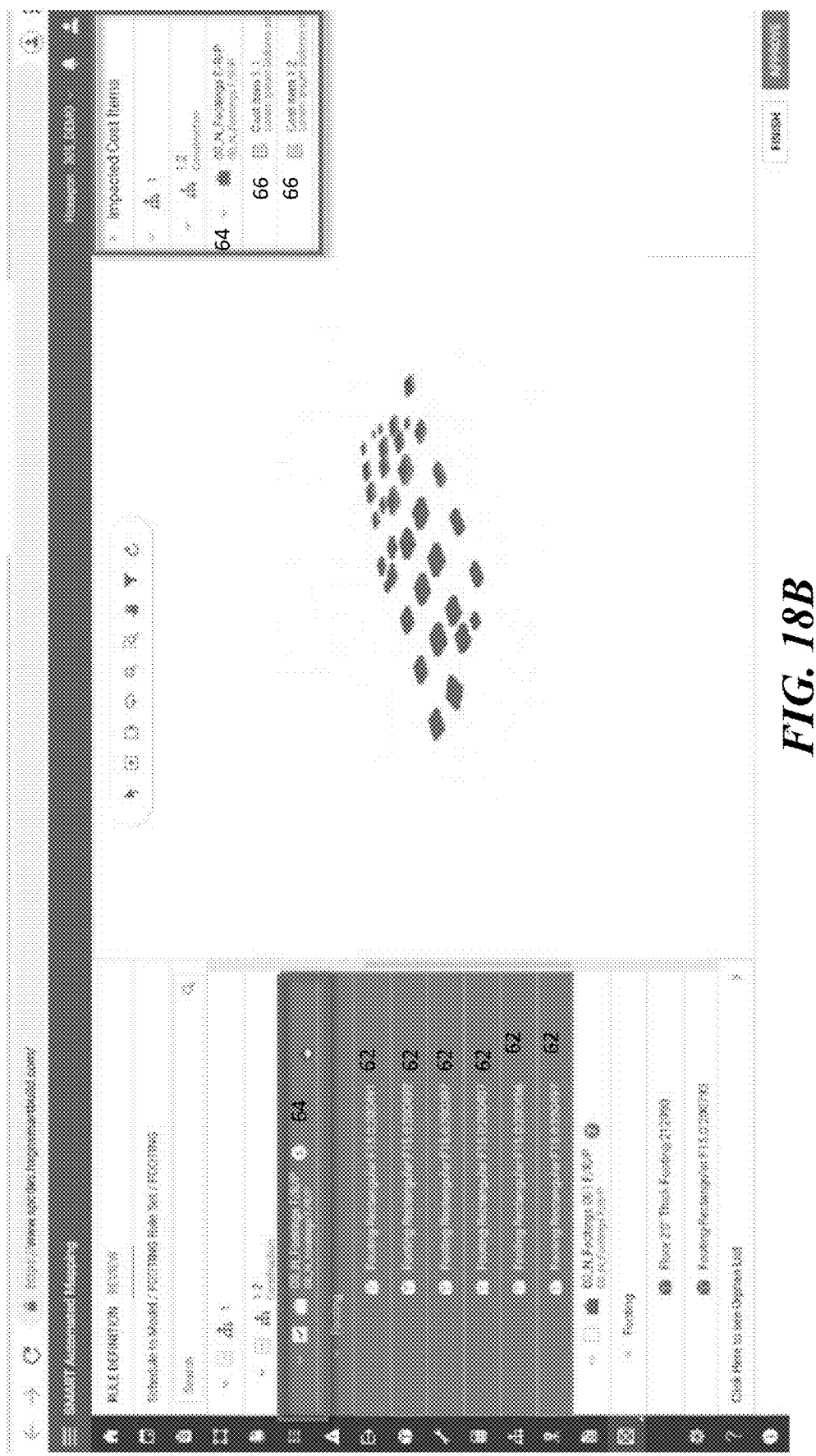
FIGS. 18B-18C show implicit mapping of a third link between item types based on two previously mapped links in accordance with illustrative embodiments of the invention.
Figure 18C:
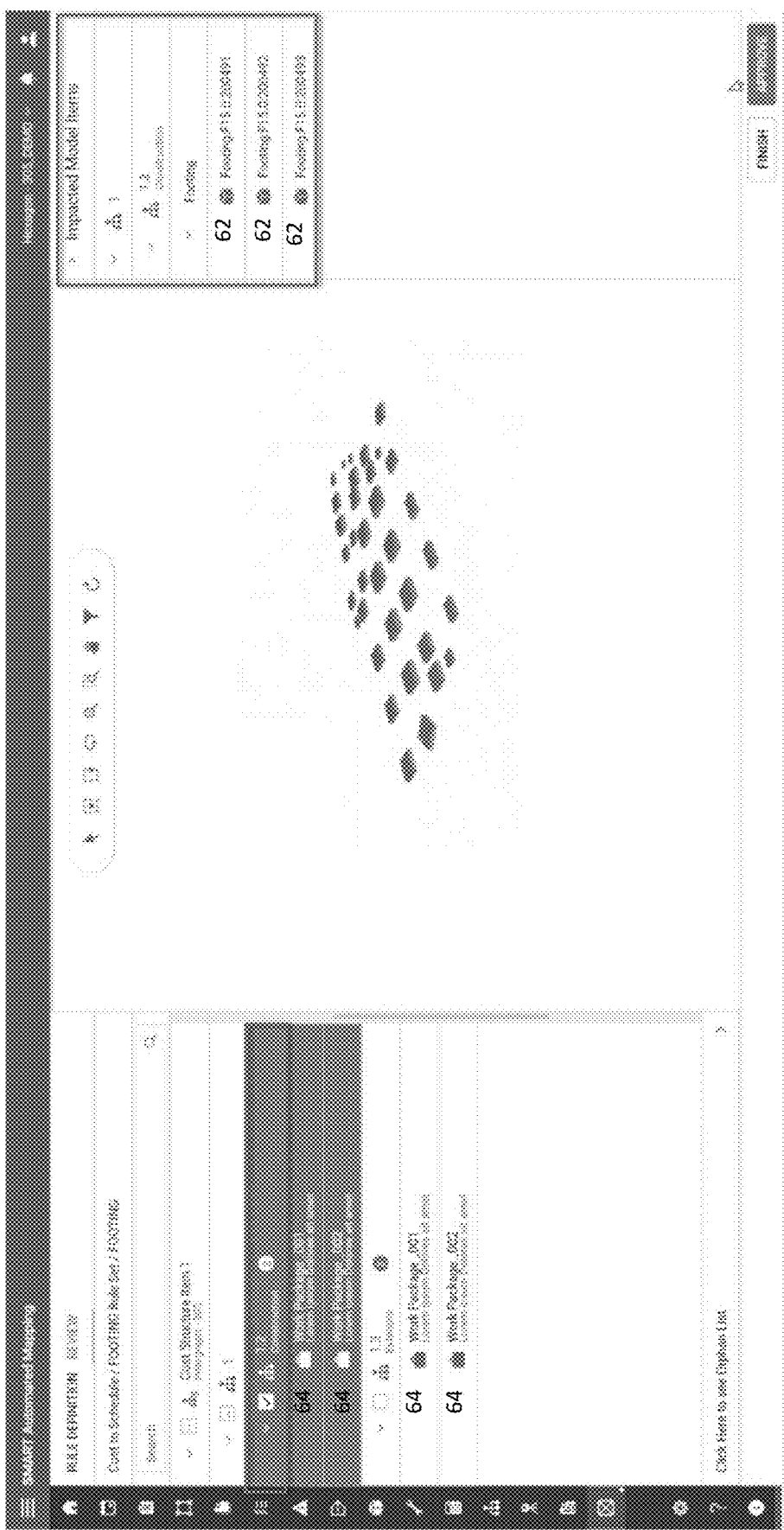

FIGS. 18B-18C show automatic mapping of the third based on a mapping of two links in accordance with illustrative embodiments of the invention. In FIG. 18B, schedule items 64 are automatically mapped with cost items 66 (link 104 of FIG. 18A) as the system 17 has already mapped the relationship between schedule items 64 and model items 62 (link 102) as well as the relationship between cost items 66 and model items 62 (link 106). In FIG. 18C, cost items 66 are automatically mapped to model items 62 (link 106), because the system 17 already has mapped the relationship between cost items 66 and schedule items 64 (link 104) and the relationship between model items 62 and schedule items 64 (link 102).

Figure 18D:
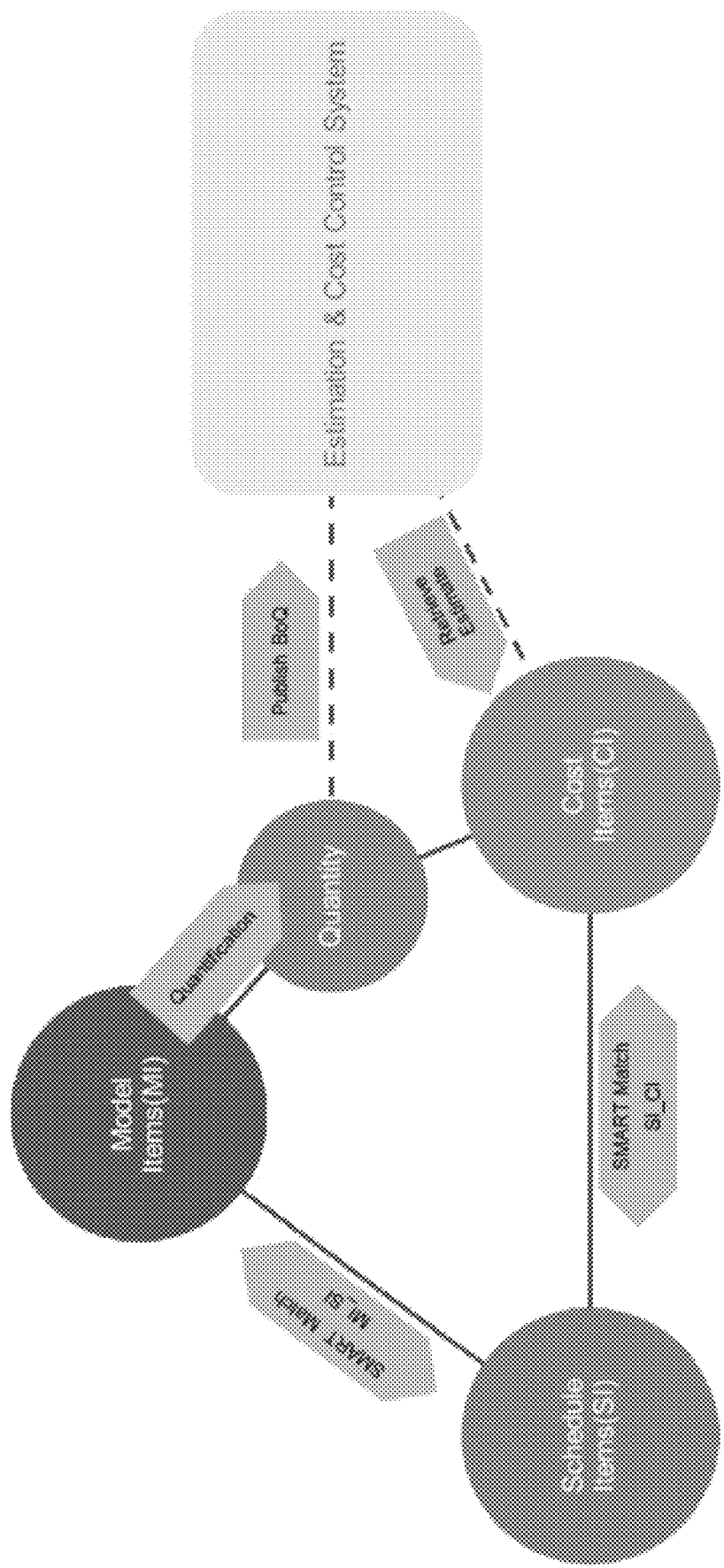
FIG. 18D schematically shows a representation of 5D mapping using quantification in accordance with illustrative embodiments of the invention.

In some embodiments, the model items 62 may be linked with the cost items 66 using quantification. FIG. 18D schematically shows a representation of 5D mapping 100 using quantification in accordance with illustrative embodiments of the invention. However, in some other embodiments, model items 62 and cost items 66 may be mapped using the code-based rules.

Although steps 1613-1618 refer to mapping schedule items 64 and model items 62 first, it should be understood that the order of mapping may be changed. For example, model items 62 may be first mapped with cost items 66. Alternatively, cost items 66 and schedule items 64 may be mapped first. Therefore, in some embodiments, step 1614 may not exist, or may occur at an earlier stage of the process. Additionally, some embodiments may have a corresponding variation of step 1616 in which the order of mapping is correspondingly changed to complete the necessary link for 5D mapping.

Figure 19A:
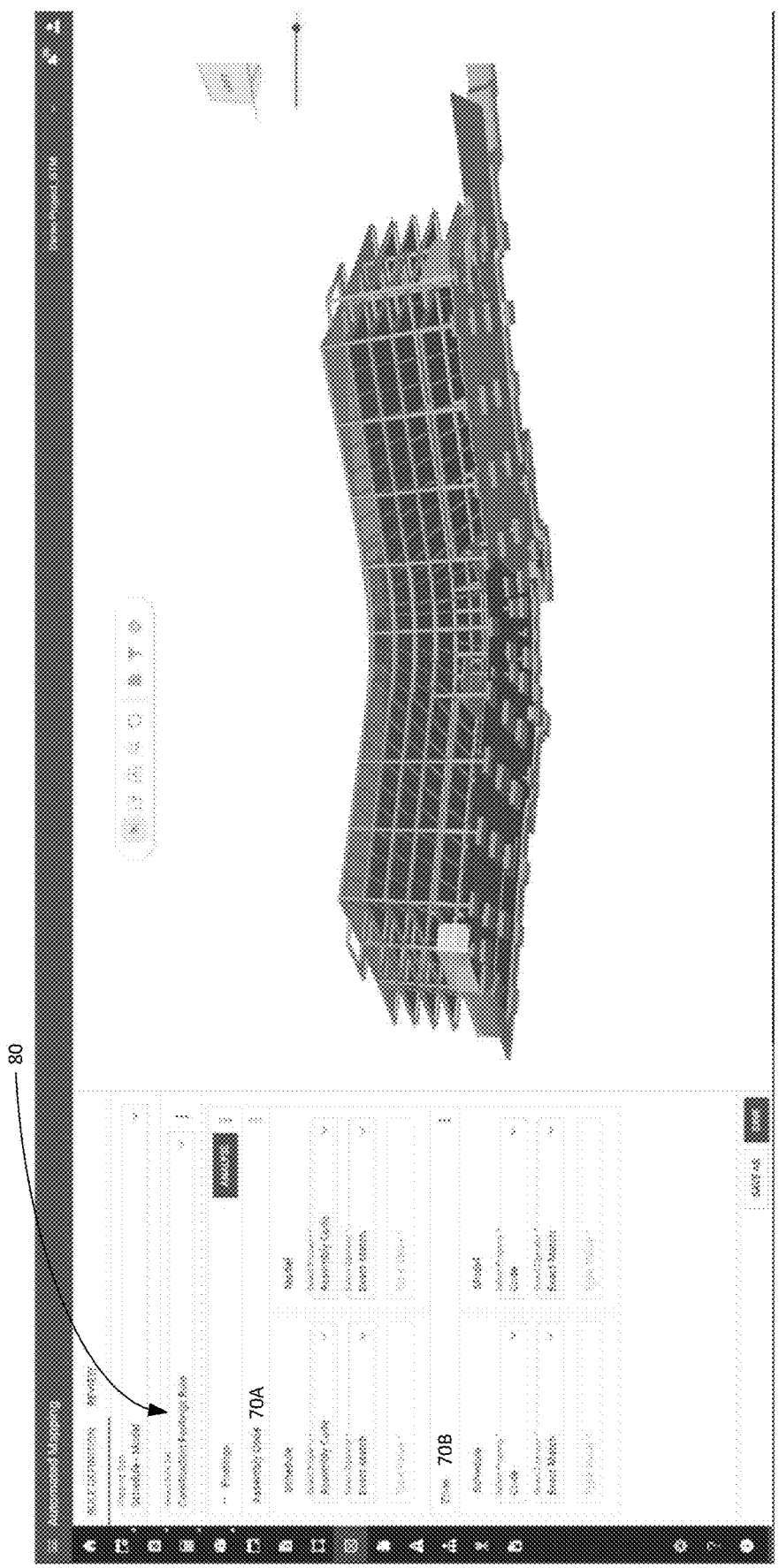
FIGS. 19A-19B are screenshots of an interface for mapping schedule items and model items in accordance with illustrative embodiments of the invention.

FIG. 19A shows a screenshot of step 1613, which maps schedule items 64 and model items 62. Specifically, FIG. 19A shows an interface for creating mapping rules. In the present example, the user maps schedule items 64 that relate to footings with corresponding model items 62. To that end, the user defines a rule 80 having conditions 70A and 70B for mapping. The conditions in this example include (70A) an assembly code 60 match between the schedule items 64 and the model items 62, and (70B) a zone code 60 match between the schedule items 64 and the model items 62. The assembly match condition 70A requires an "exact match" between codes 60. As an example, the schedule items 64 with the assembly code "A1010" are mapped with model items 62 having the exact same assembly code (i.e., "A1010"). Additionally, the schedule items 64 with assembly code "A1010" are mapped with model items 62 having the exact same assembly code (i.e., "A1010"). This process may be repeated for all assembly codes 60. For example, if there are N assembly codes, then there are N total mapped sets (where each set includes one or more schedule items 64 and one or more model items 62). This assumes that there is at least one model item 62 and one schedule item 64 having each of the N number of assembly codes.

The rules engine 48 also defines a second zone match condition which requires an "exact match" between zone codes. The schedule items 64 with the zone code "North" are mapped with the model items 62 having the exact same zone code (i.e., "North"). Additionally, the schedule items 64 with the zone code "South" are mapped with the model items 62 having the exact same zone code (i.e., "South"). In a similar manner to described above, the second condition 70B may be said to map M mapping sets, where M=total number of zone codes that exist in schedule items 64 and model items 62. This assumes that there is at least one zone code in each of the schedule items 64 and the model items 62.

After the rule is run, the system 17 links corresponding model items 62 and corresponding schedule items 64 that meet the conditions 70A, 70B (referred to as a mapped set). Because the rule specified two "exact match" conditions, the total number of mapping sets is M×N (e.g., mapping 1=zone North, assembly code A1010, mapping 2=zone North, assembly code A1020, mapping 3=zone South, assembly code A1010, mapping 2=zone South, assembly code A1020). While this is an extremely simple example, it should be understood that manually mapping large-scale projects 10 is incredibly difficult, time-consuming, and error-prone, and that illustrative embodiments alleviate many of these problems.

Figure 19B:
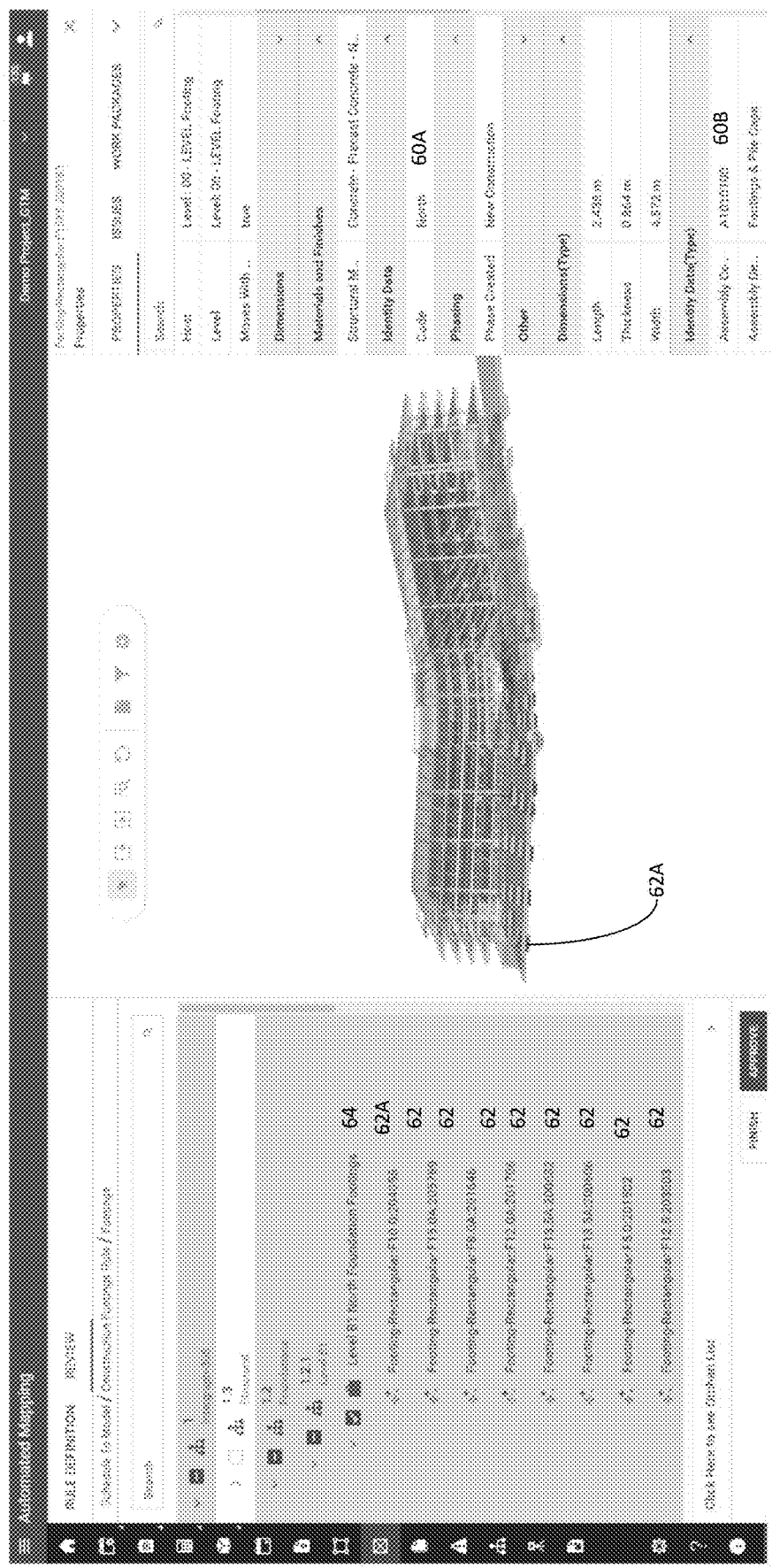

FIG. 19B is a screenshot of an interface showing a result of the mapping of FIG. 19A. In FIG. 19B, one of the mapped schedule items 64 has been selected. Specifically, as shown in FIG. 19B, the footing model items 62 having both the "north" zone code 60A and the "A1010100" assembly code 60B have been mapped with the schedule item 64 having the "north" zone code 60A and the "A1010100" assembly code 60B. In this example, the mapped set shown includes thirty-three model items 62 and a single schedule item 64. The rule may have created additional mapped sets of schedule items 64 and model items 62 (e.g., with items having "south" zone code 60A, and "a1010100" assembly code 60B), but in the current view only a single mapped set is selected. Additionally, it should be understood that more model items 62 are available for viewing/selection in the interface, but that the screenshot has only captured a portion of those items in the list view. The user may scroll down to see the remainder of the model items 62 in the list view. The user may review and approve the mapping from the screen.

The 5D Mapping of step 1613 provides a number of advantages, including:
  enhancing information exchange and provides the ability to visualize the cost linkages for easier communications.
  simplification of linking disparate data, providing better project insight into cost and schedule.
  improved design document quality by testing the design against construction sequencing, eliminating or reducing difficult sequence issues (4D BIM).
  improved site use planning and coordination with ongoing operations, constructability, and safety issue identification.
  reducing complexity, human errors, and enabling rapid and precise links between model items, schedule items, and cost items for planners/cost manager.

At step 1614, the process asks whether the cost item is already mapped to the model item via quantification. If no, then the schedule item and cost item are mapped. The process then proceeds to steps 1617-1618, where the mapping is approved and displayed.

Figure 20A:
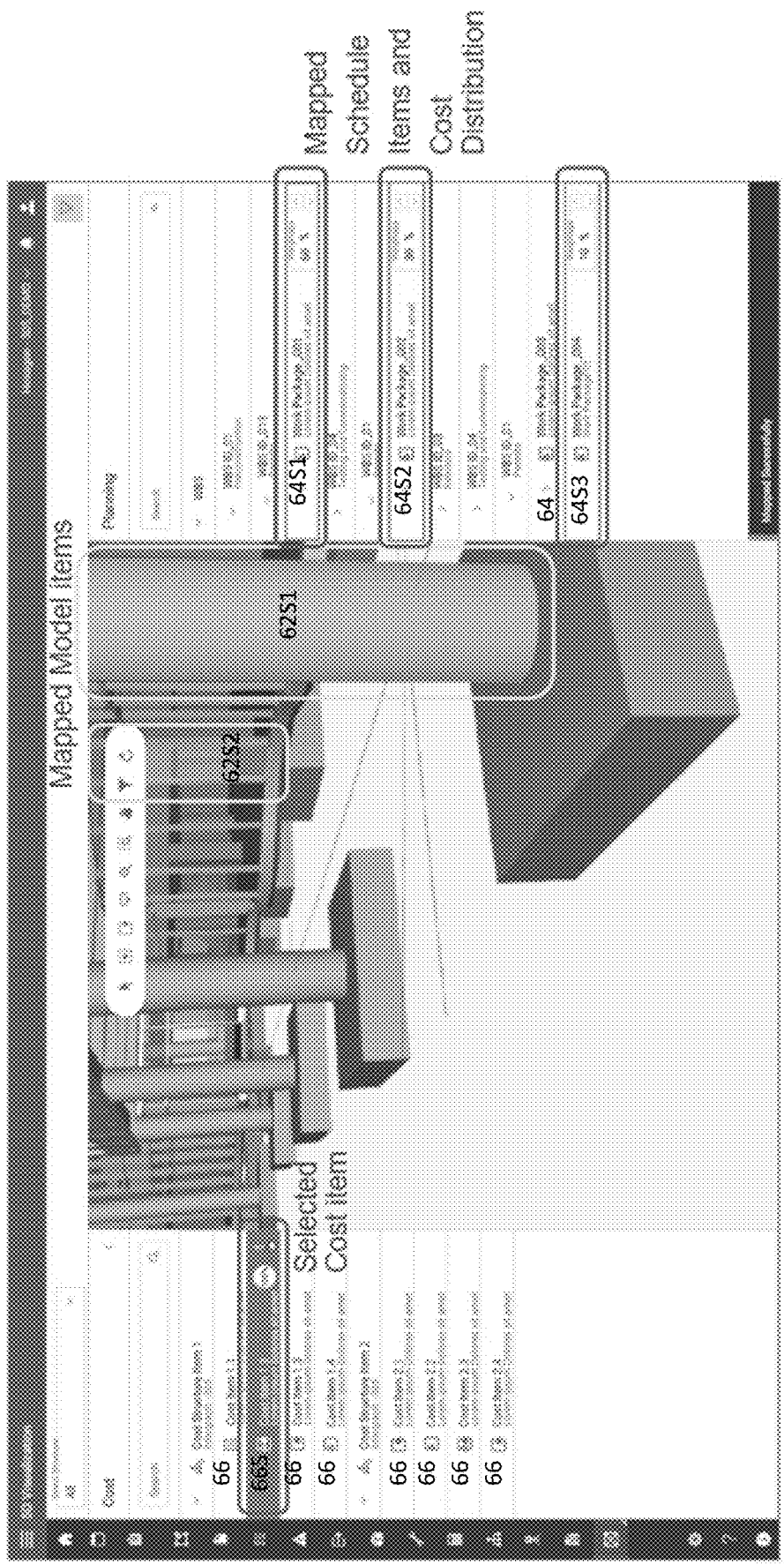
FIG. 20A shows a 5D visualization displaying the mapping between cost, schedule, and model.

FIG. 20A shows a 5D visualization displaying the mapping between cost, schedule, and model of step 1618. This is a 5D visualization. In this example, the user selects cost item 66S. Cost item 66S has been mapped with three work packages 64S1, 64S2, and 64S3. Each of the three work packages 64S-64S3 mapped to the cost item 66S have been budgeted to take a % amount (totaling 100%) of the cost item. The weighted percentages may be inputted by one of the contractors and/or subcontractors (e.g., based on their experience with similar projects). This cost % breakdown may factor in the cost of materials, labor, and equipment, among other things. As also shown in FIG. 20A, the selected cost item 66S is mapped with two model items 62S1 and 62S2.

The mapping also works in reverse. If one of the schedule items 64 is selected 64S1, the linked cost item 66S and model items 62S are shown. Additionally, if one of the model items, 62S1 or 62S2 is selected, the associated schedule items 64S1, 64S2, and/or 64S3, and the associated cost item 66S are selected/shown. Returning to FIG. 16, if at step 1612 the codes of the classification structure codes 60 of the model item 62 or the schedule item 64 are already in the system 17, then the process proceeds to steps 1619-1624, where the mapping is updated as described previously. The process thus comes to an end.

FIGS. 14 and 16 represent examples of two different possible processes in accordance with illustrative embodiments of the invention. Steps from either of these processes may be incorporated into the other where appropriate, and may not be mentioned again for convenience. Additionally, illustrative embodiments may take some steps and put them in a different order, and/or may not require other connecting steps described herein.

Throughout various embodiments, the system 17 may publish its own classification structure (along with codes) to third party systems, such as scheduling and/or cost management platforms. If the system extracts codes 60 and/or classification structures from the third-party platforms (e.g., 54-58), the system 17 may retrieve the information using the appropriate interface of the code extraction engine 30. Accordingly, illustrative embodiments ensure that the classification structures are aligned and that there are no orphan classification structure codes.

The system 17 may identify if there are new codes 60, modified codes 60, or deleted codes 60 when compared to existing codes 60 in the model item database 38, schedule item database 40, or cost item database 42.

It should be apparent that illustrative embodiments described herein provide a number of advantages. The system 17 provides automated mapping based on specific codes and rules. Code-based rules make real-time mapping of cost, schedule, and model feasible. Alternatively, a manual mapping process of mapping CBS (cost) to WBS (schedule) takes several days to finish, and as a result, can't provide the immediate results of illustrative embodiments.

Some other approaches may include creating a group of model items 62 and filtering the items to create a selected set. However, filtering model items 62 requires manually assigning each individual model item 62 to a category for filtering. Therefore, filters alone are not sufficient to provide automated mapping of WBS, CBS, and model items, and suffer from their reliance on manual mapping (e.g., drag and drop).

Illustrative embodiments further provide the advantage of 5D visualization based on the mapping. The 5D visualization allows the progress of the 3D model to be graphically compared to the progress of the schedule and the cost/budget. Users can determine whether the budget is on target, overbudget, or underbudget. Additionally, the system can display whether the schedule is on track, behind schedule, or ahead of schedule.

Figure 20B:
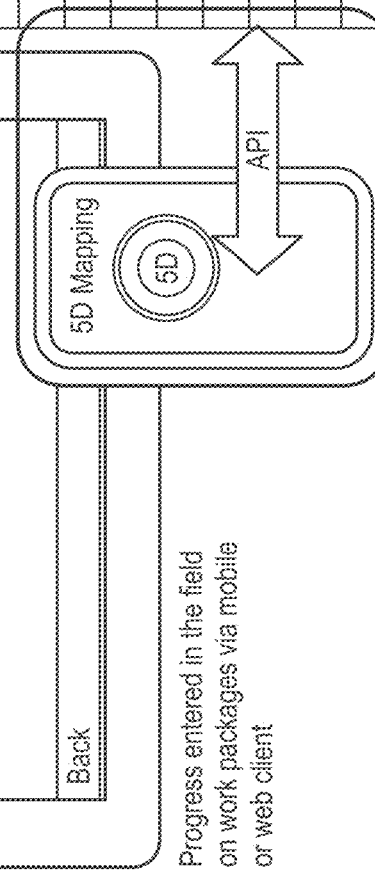
FIG. 20B schematically shows using the user interface to communicate with the project management cost platform to update the progress of the construction schedule items in accordance with illustrative embodiments of the invention.

FIG. 20B schematically shows using the user interface 46 to communicate with the project management cost platform 58 to update the progress of the construction schedule items 64 in accordance with illustrative embodiments of the invention. The user (e.g., a project manager) updates the progress of the schedule items 64 by inputting 90 a completed % using a mobile device or directly on a web client. The system 17 automatically converts the progress from the schedule item 64 to the mapped cost item(s) 66.

Figure 20C:
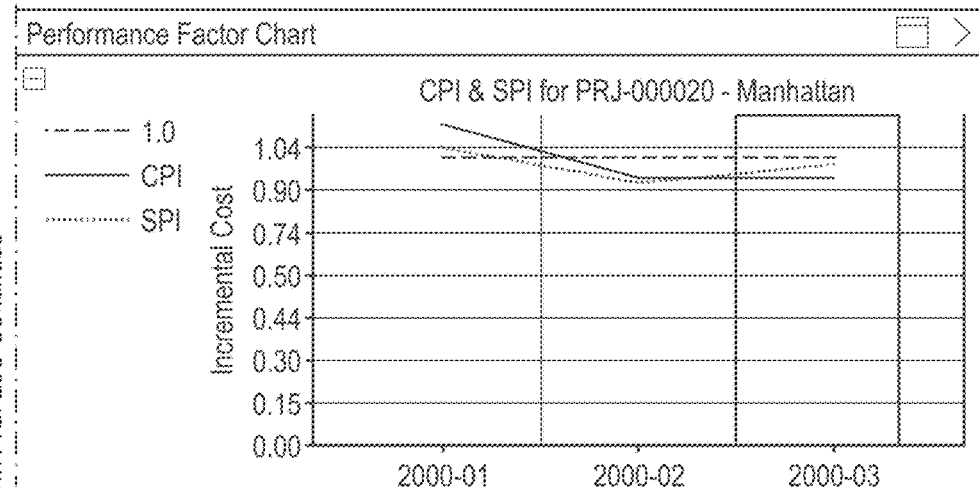
FIG. 20C shows a screenshot of the cost platform after it receives progress updates from the cost interface.

FIG. 20C shows a screenshot of the cost platform 58 after it receives progress updates from the cost interface 36. In FIG. 20C, the earned value may be generated automatically in the cost management platform 58 through the construction cost interface 36. Cost performance index (CPI) values are generated based on the inputted 90 actual cost against the cost item estimated cost. In illustrative embodiments, the system 17 highlights the cost item 66 with color (e.g., red) when CPI<0.8. When CPI<0.8 the contractor has spent more money than planned (i.e., went over budget for that cost item 66). The system 17 may display various colors based on the CPI Index (less or more than 1) as per individual company standards.

Figure 20D:
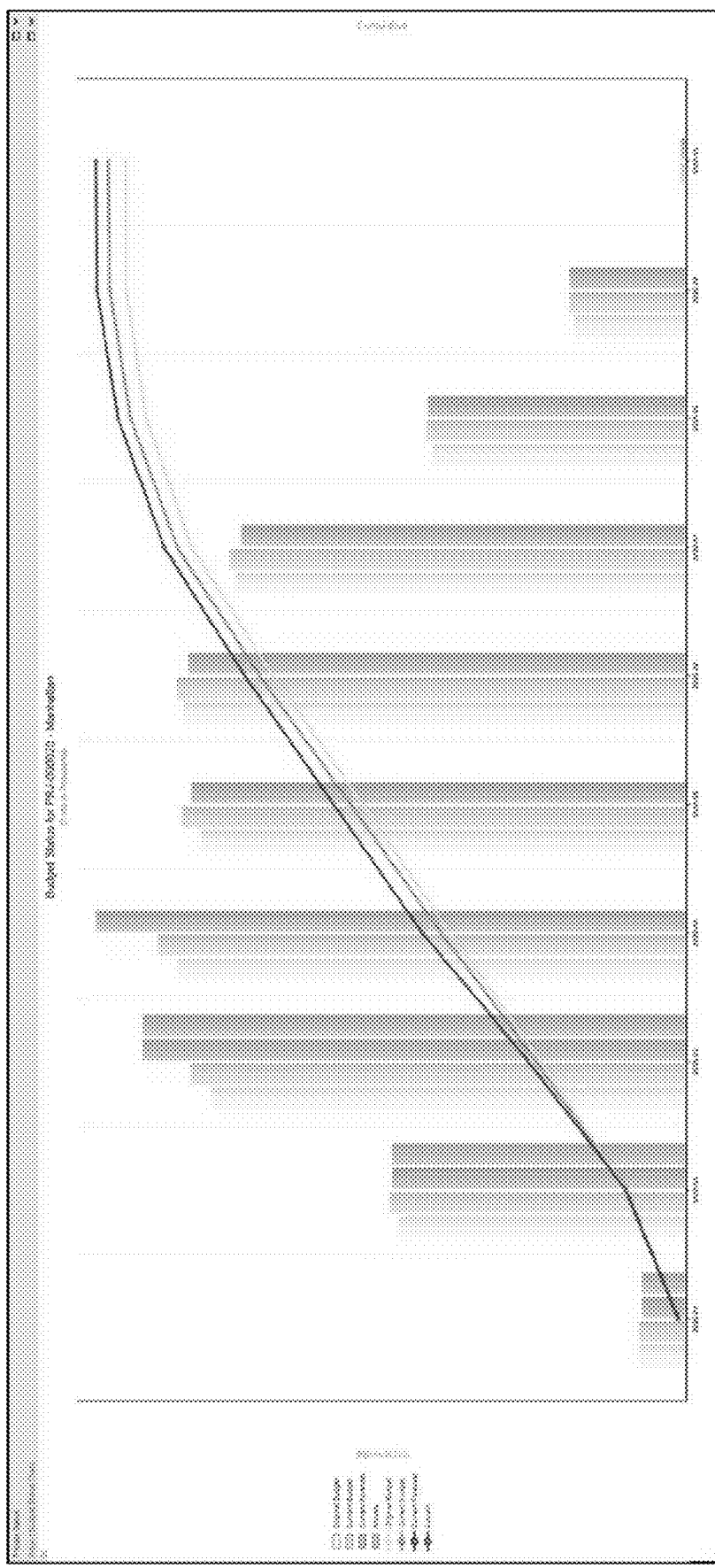
FIG. 20D shows a forecasting using the progress updates from FIG. 20C.

FIG. 20D shows a forecasting using the progress updates from FIG. 20C. Forecasts allow the user to graphically display a variety of information, such as the original budget v. the most recent budget v. newly updated. Thus, the project managers can clearly and quickly obtain updated forecasts for the budget. This provides the added ability of taking corrective actions and reducing cost overrun for the project as changes occur. A similar forecasting may be run for the schedule items.

It should be understood that illustrative embodiments use classification structure codes that are pre-assigned in tools such as Revit, Primavera P6 and Estimation solution. The rules allow substring and other mathematical operations (e.g., starts with, in between, contains, etc.) to provide the user with the flexibility to appropriately map items. Furthermore, the rules-based mapping does not require that the data be organized or filtered in any particular way.

Figure 21A:
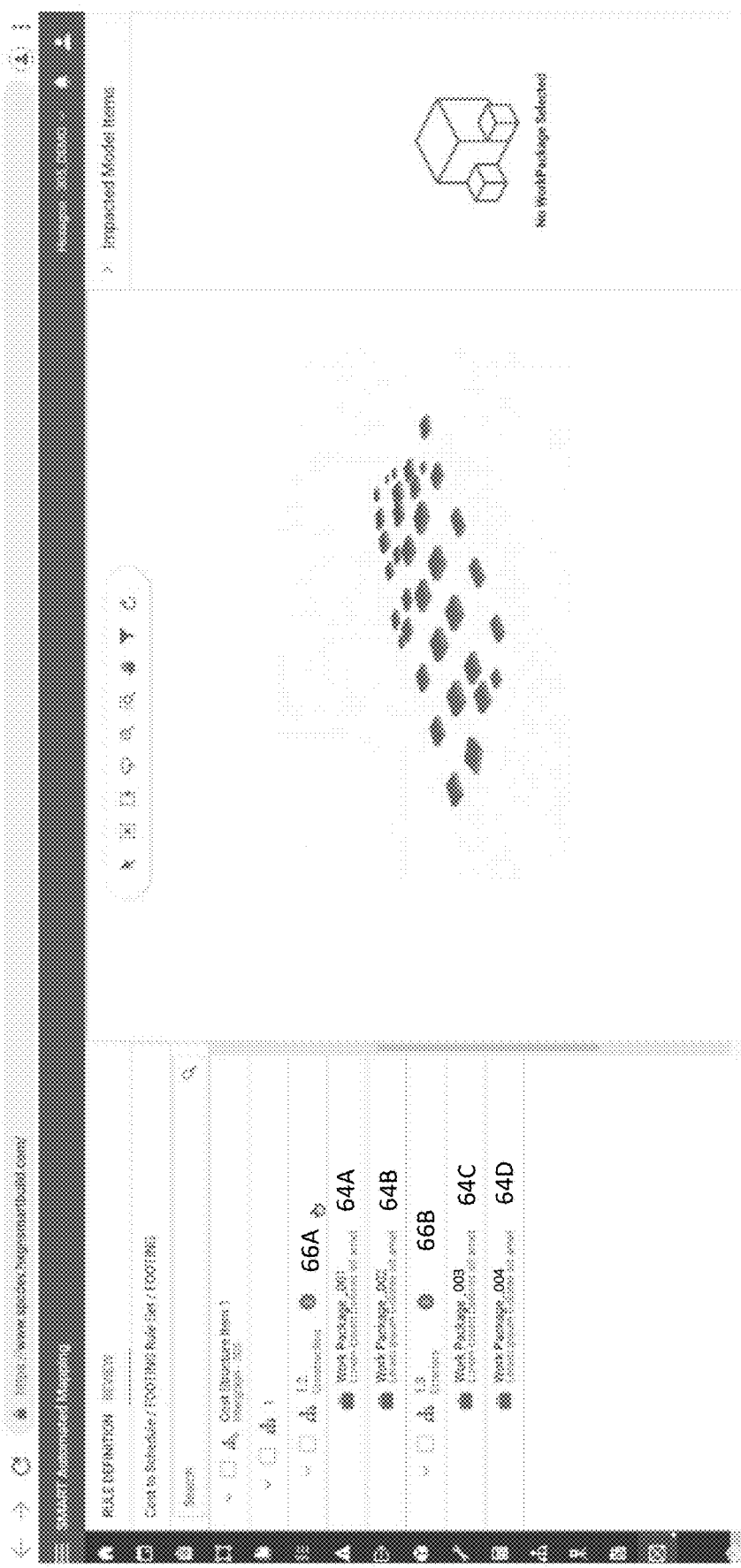
FIG. 21A is a screenshot showing that schedule items mapped with cost items in accordance with illustrative embodiments.
Figure 21B:
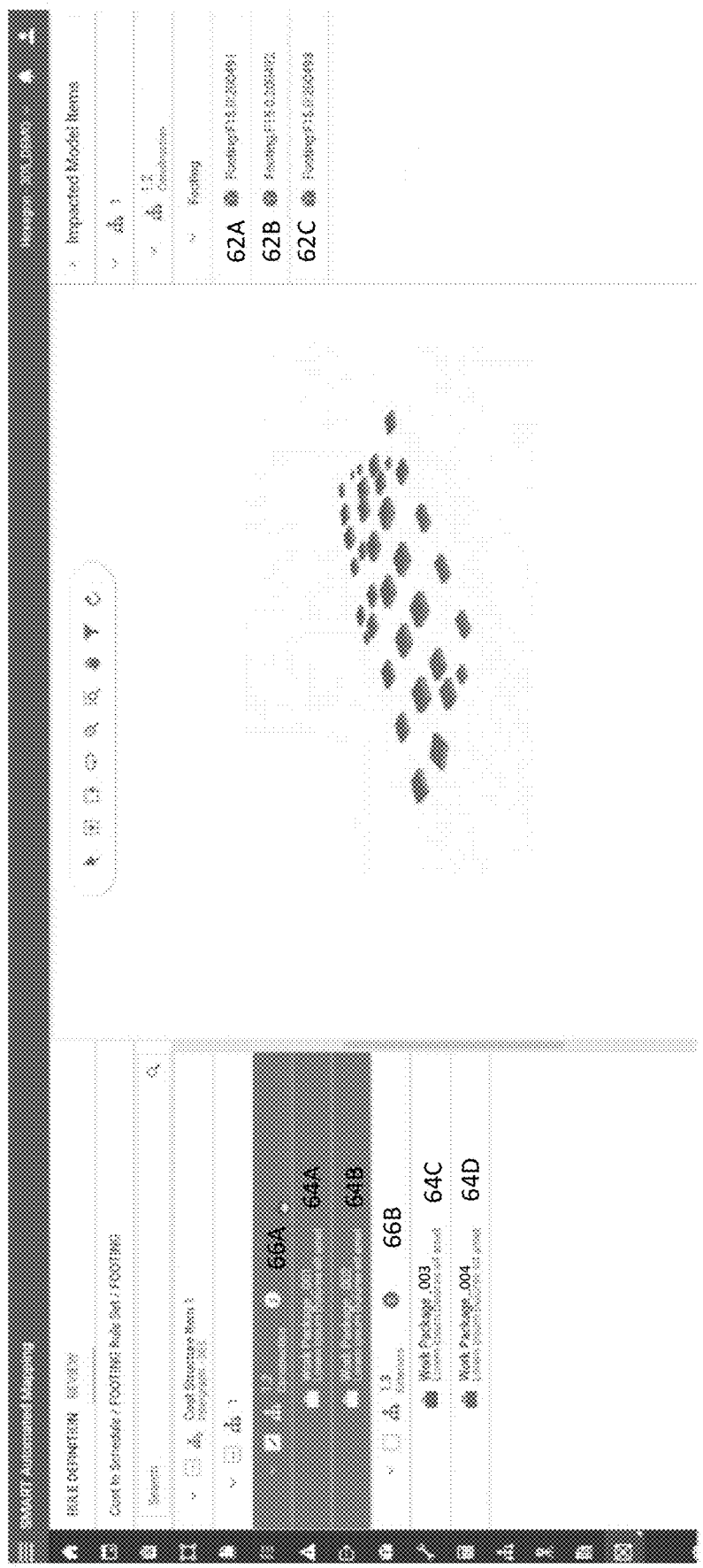
FIG. 21B is a screenshot showing the interface of FIG. 21A with a selected cost item.

The 5D mapping system described above provides a number of advantages, including ease of accessing data linked using the code-based rules described above. FIG. 21A shows four schedule items 64A, 64B, 64C, and 64D mapped with two cost items 66A and 66B in two different mapped sets in accordance with illustrative embodiments. FIG. 21B is a screenshot showing that cost item 66A is selected. By selecting cost item 66A, the associated schedule items 64A and 64B are selected. Additionally, the associated model items 62A, 62B, and 62C are automatically populated.

Another advantage enabled by illustrative embodiments include enhanced visualizations. FIGS. 22A-22D are screenshots showing various views of enhanced visualizations.

Figure 22A:
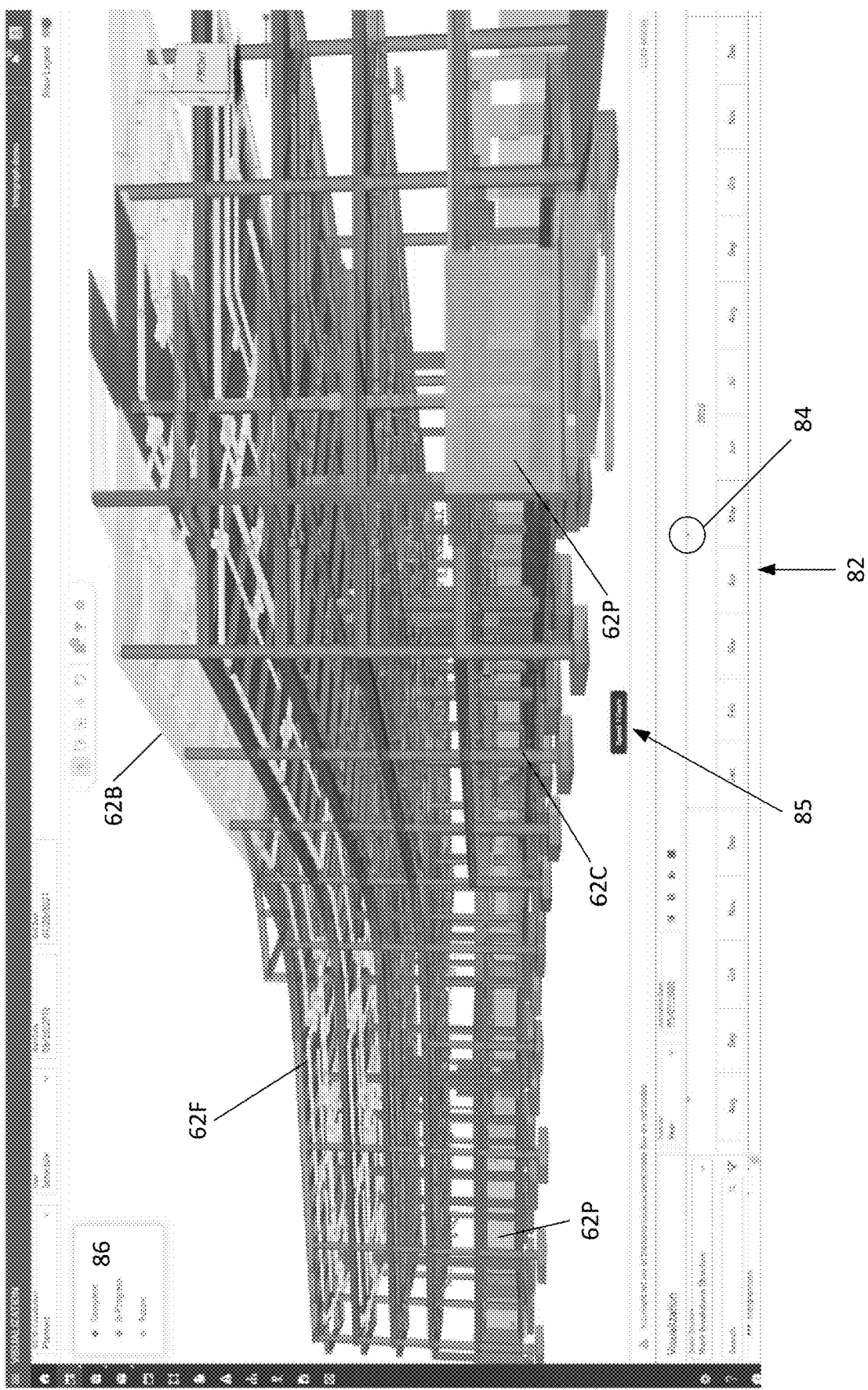
FIGS. 22A-22D are screenshots showing various views of enhanced multidimensional visualizations.

FIG. 22A shows a 5D visualization from the work breakdown structure perspective, in accordance with illustrative embodiments of the invention. The work breakdown structure includes a large number of schedule items 64 spanning over the course of the planned project 10 schedule. Accordingly, a schedule timeline 82 is shown. The progress of the model items 62 over the course of the timeline 82 may be displayed with images and/or videos. For video progress, the speed 85 of the animation may be controlled (e.g., 1 construction day/second). FIG. 22A shows the progress of construction at a selected date 84 in early May, based on mapping the schedule items 64 (which includes start/finish dates) with the model items 62. At the selected date 84 in early May, a number of insights can be determined from the visualization. To assist with the visualization, the progress of each model item 62 may be color coded in accordance with a color-coded legend 86. Although not shown in this screenshot, the mapped associated cost items 66 may also be viewed by selection of associated model items 62 and/or schedule items 64.

In FIG. 22A, a number of model items 62C are complete, a number of model items 62P and 62B are in progress, and a number of future model items 62F have not been installed or even brought to the worksite yet. To further enhance visualization, the depth of color can be used to show the status of the progress. For example, model items 62P are dark green, representing that they are almost complete. In contrast, model items 62B are light green, representing that they are in the early stages of construction, and are not near completion. The different model items 62P and 62B may be mapped with different schedule items 64 (e.g., that have slight overlap in dates). Therefore, it is possible that construction on model items 62P began prior to construction on model items 62B, but they may have overlapping periods.

Figure 22B:
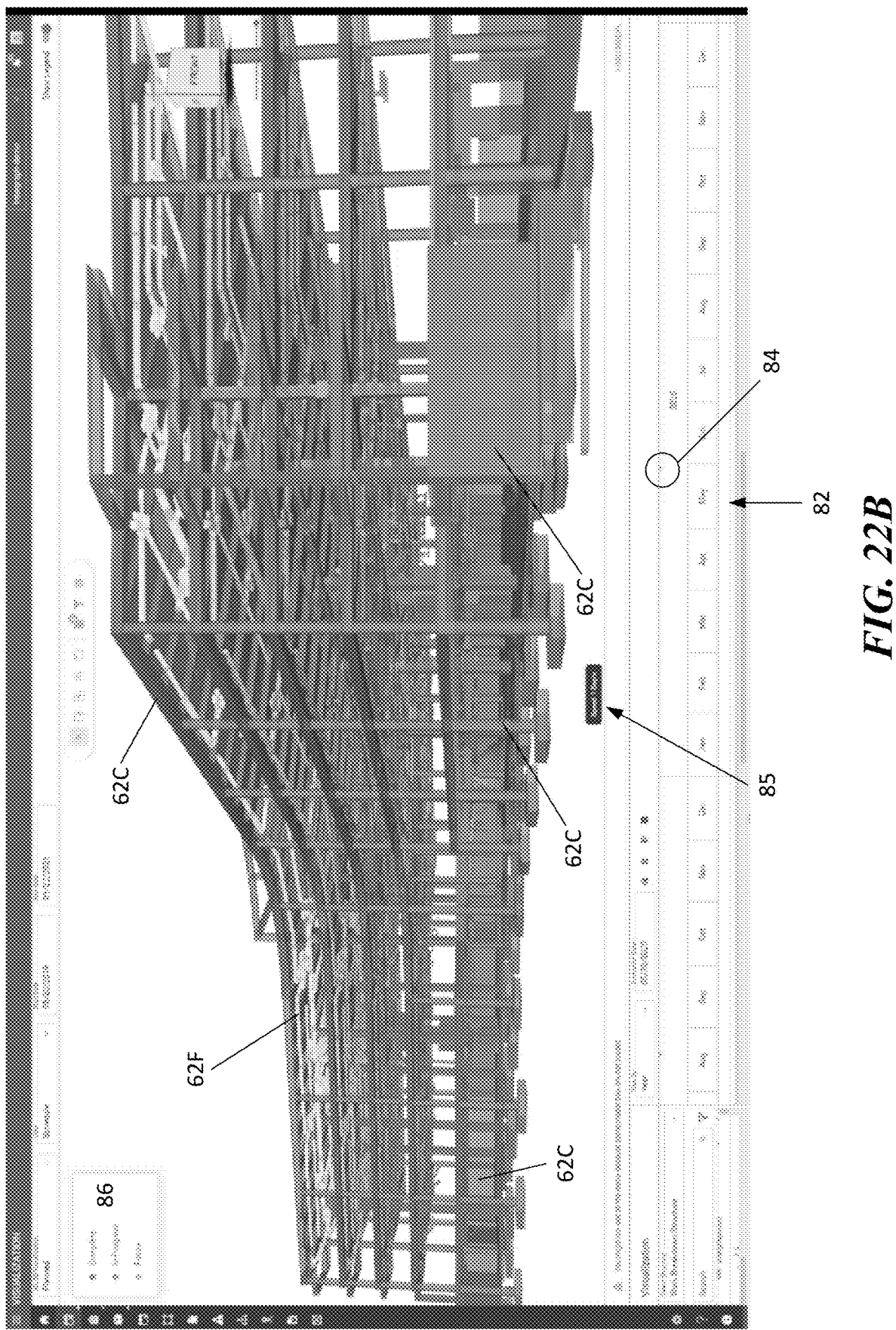

FIG. 22B shows the model of FIG. 22A but at a different selected date 84. Here, the date is shown as being end of May. As can be seen, the previous model items 62P, 62C, and 62B have all been completed. Therefore, the completed model items 62C color may change to reflect their status at the timeline 82. The future model item 62F still has not been constructed.

Figure 22C:
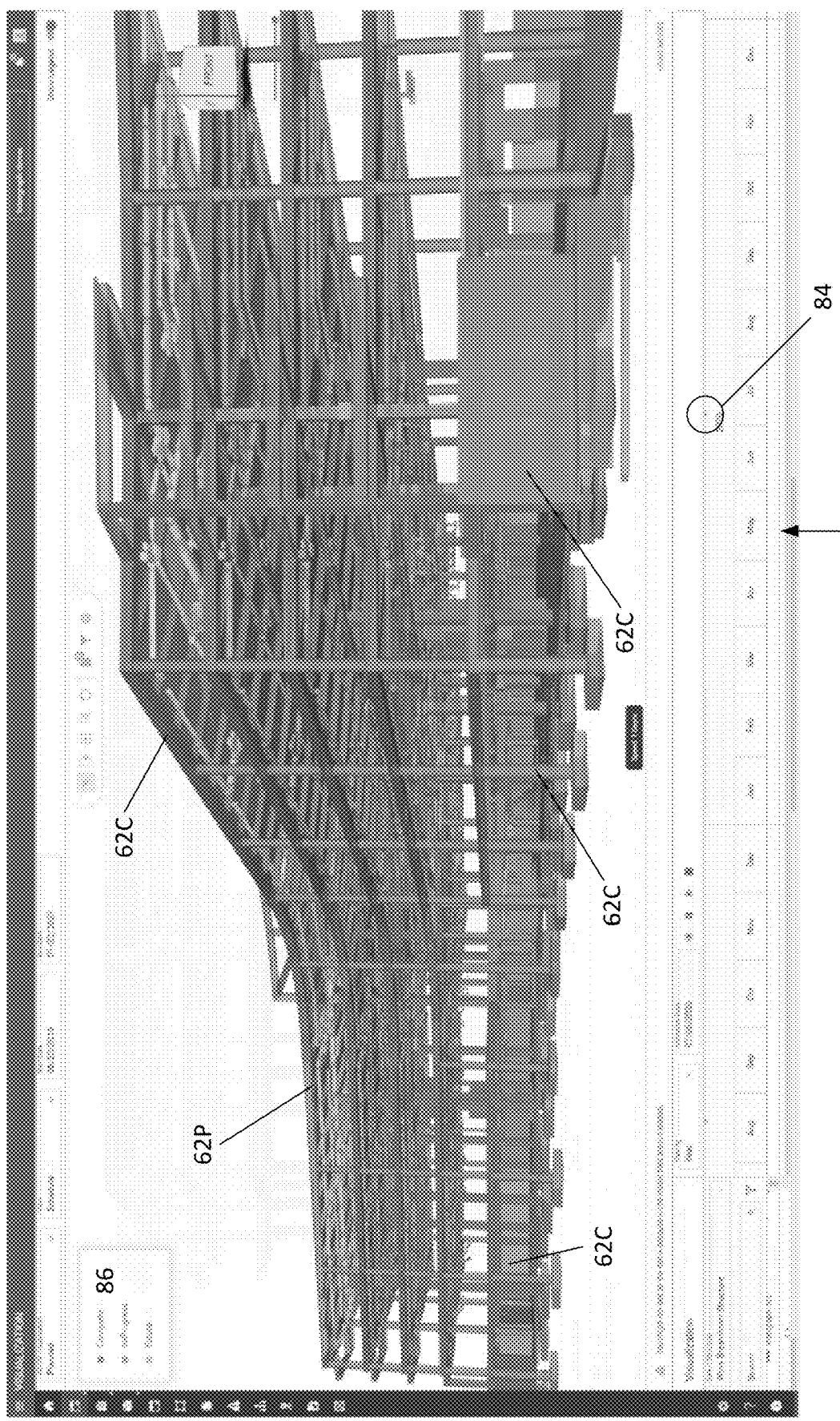

FIG. 22C shows the model of FIGS. 22A-22B but at a different selected date 84. Here, the date is shown as being early July. By early July, the future model item 62F in FIG. 22B is shown as having become the in-progress model item 62P.

Figure 22D:
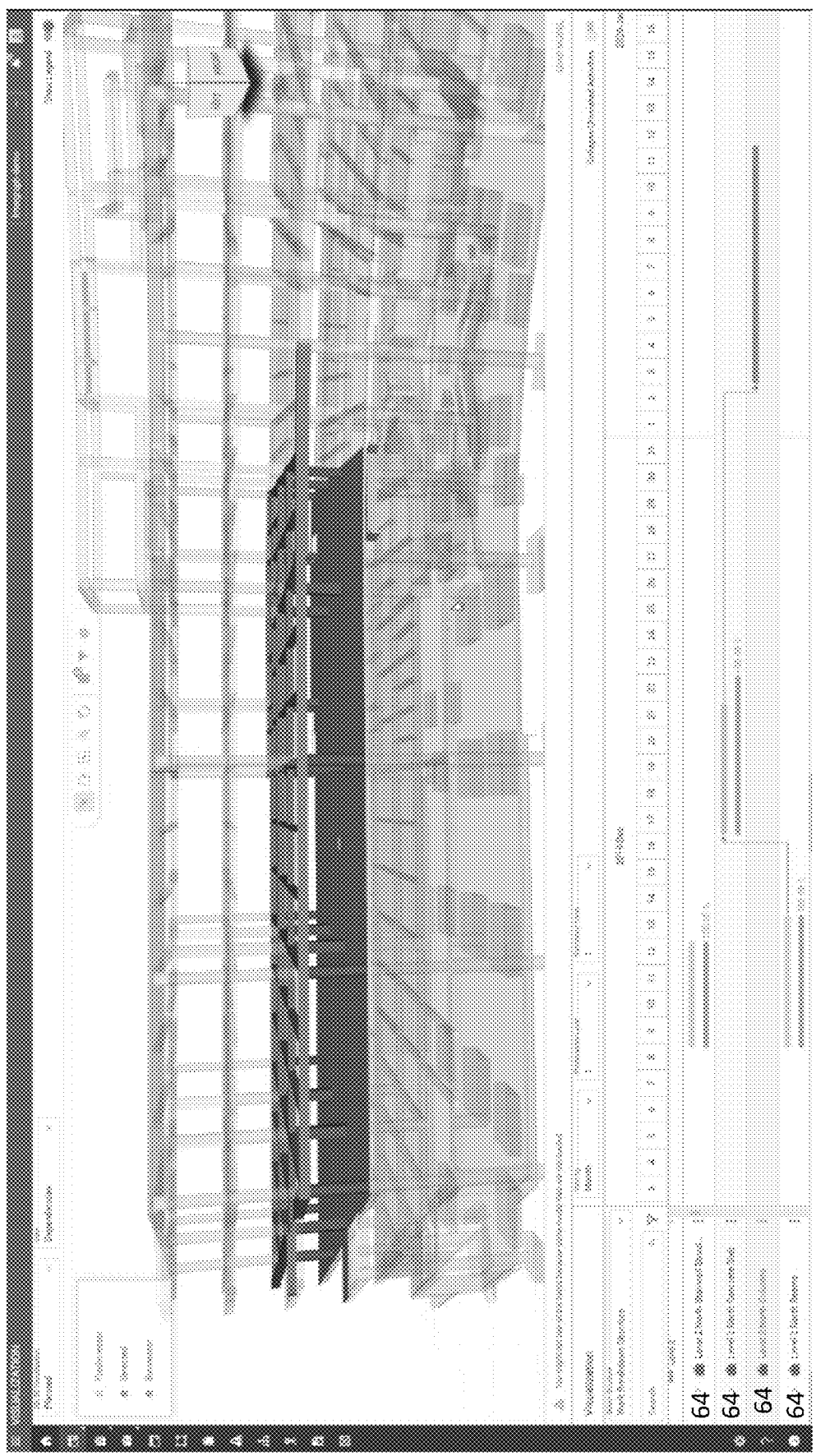

FIG. 22D shows the model of FIGS. 22A-22C with a detailed timeline 82. The detailed timeline 82 shows specific dates and percentage breakdowns by given dates. The timeline 82 may also show the schedule items 64, and the percentage completed breakdown. This percentage completed breakdown may include the estimated percentage completed by a given date and/or the actual completed percentage, which may be entered by the user as described with reference to FIG. 20B.

Figure 23A:
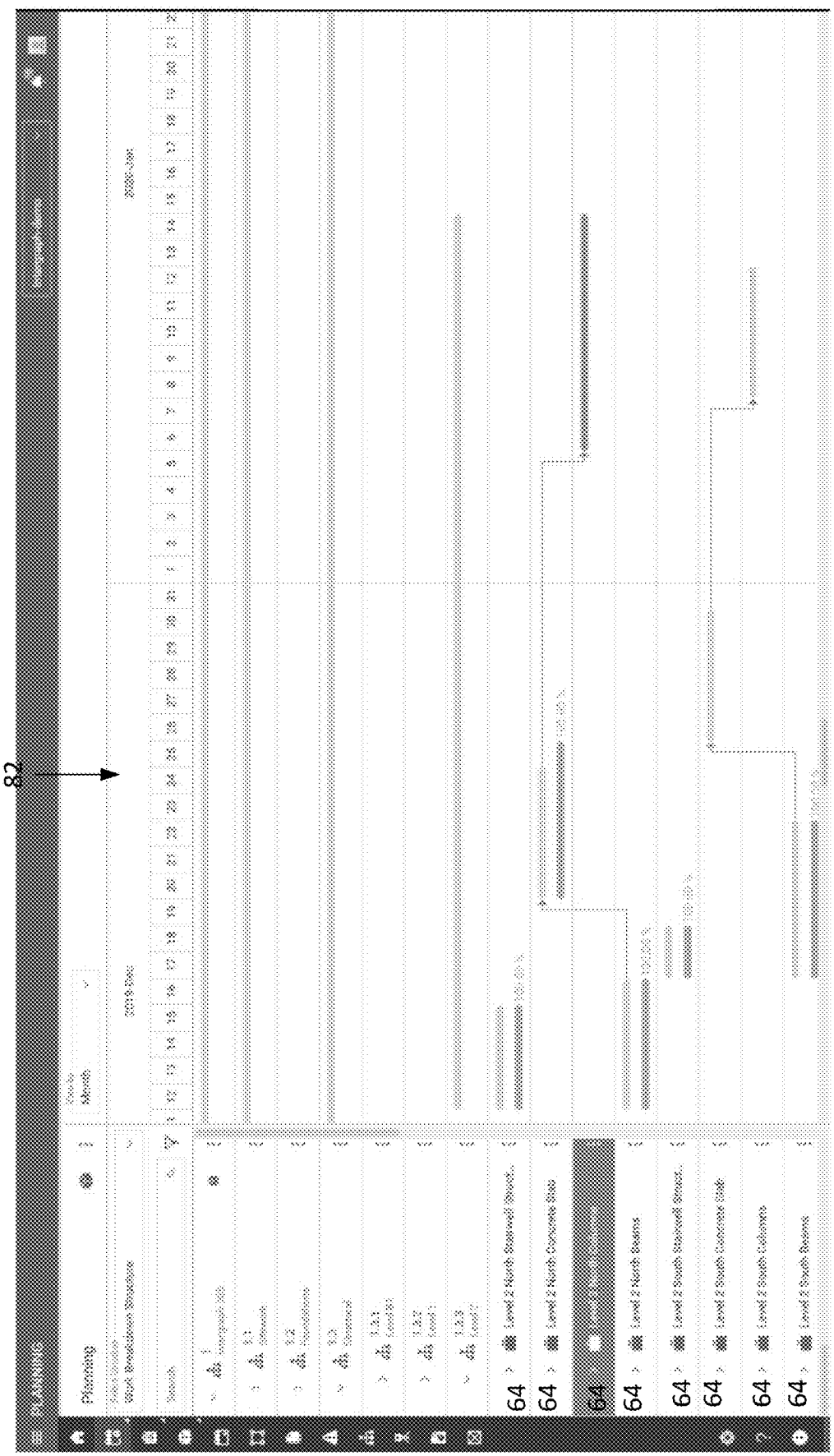
FIGS. 23A-23C are screenshots showing various views of enhanced multidimensional visualizations
Figure 23B:
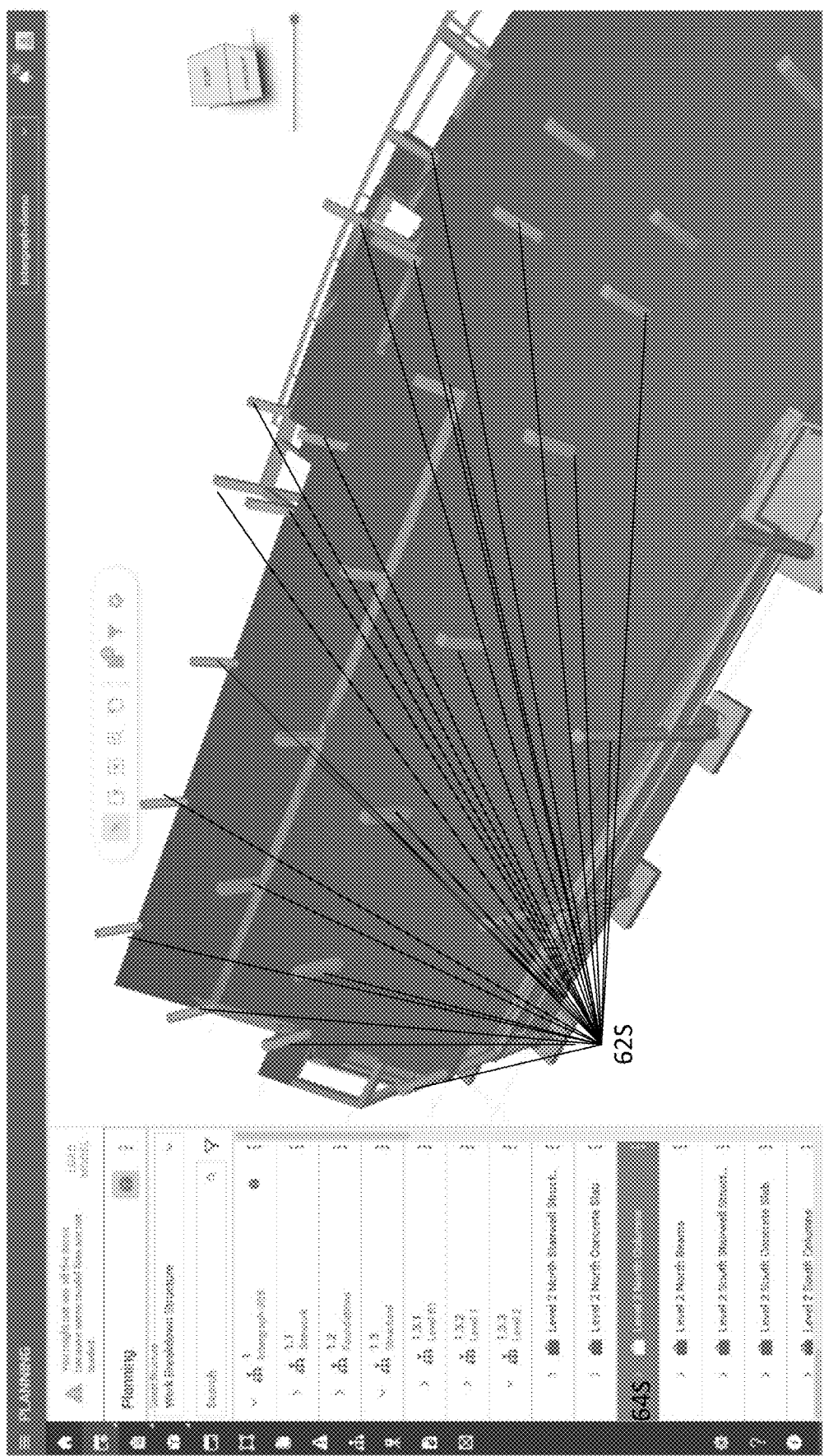

FIG. 23A shows a detailed timeline 82 organized by schedule item 64. FIG. 23B shows associated model items 62S when a given schedule item 64S is selected. Although illustrative embodiments refer to 5D mapping, it should be understood that in various embodiments the 5D mapping system 17 may map N-dimensions. In the context used herein, each item type (e.g., schedule item 64, cost item 66, etc.) is referred to as having a single dimension, with the exception of model item 62 types, which are referred to as having 3-dimensions.

Figure 23C:
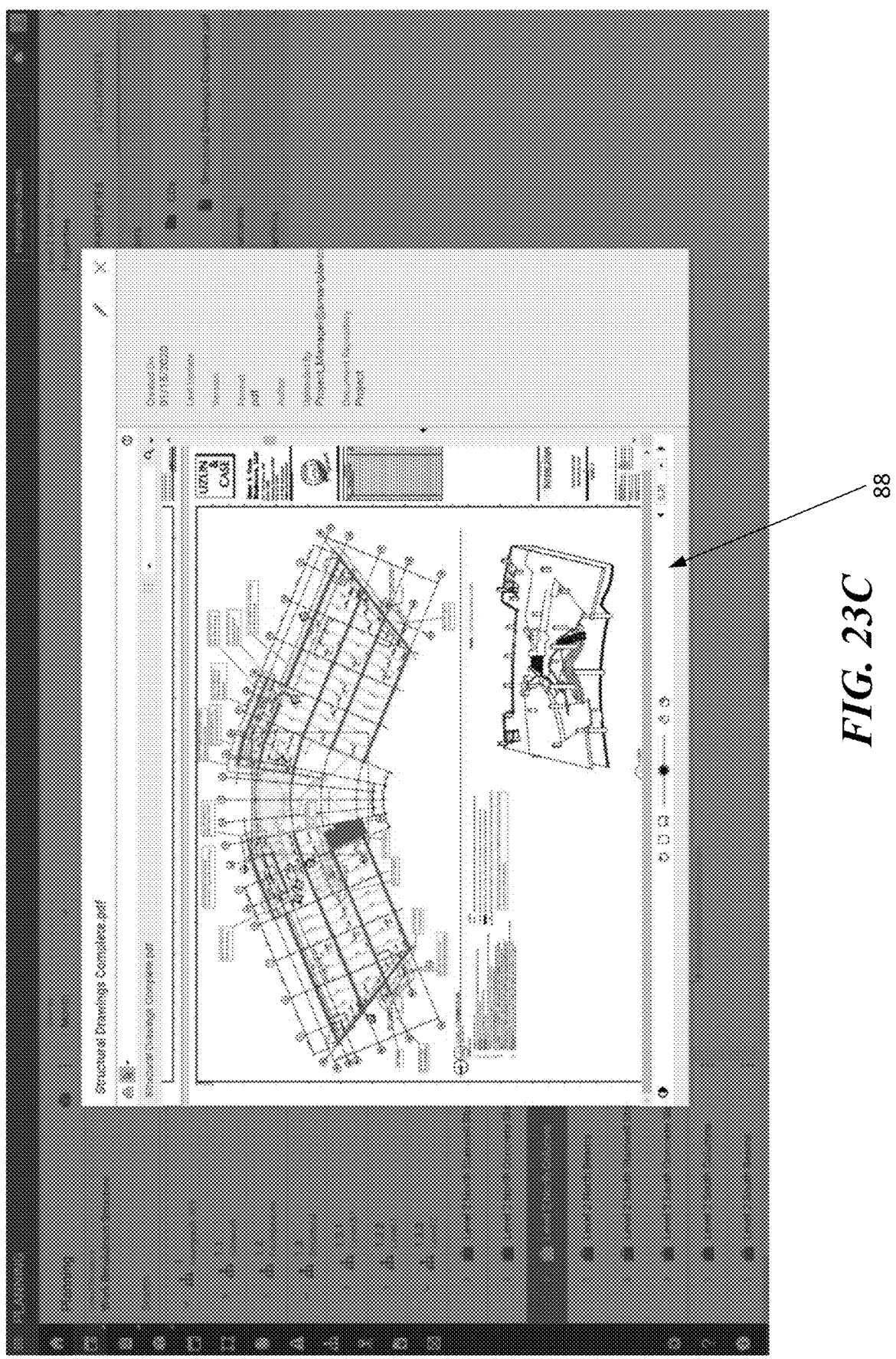

Some embodiments may map 2-dimensions (e.g., cost-schedule). Some other embodiments may map 4-dimensions (e.g., model-schedule or model-cost). Other embodiments may map more than 5 dimensions. The additional dimensions may be mapped in a manner similar to that described with reference to the 5D mapping (e.g., rules having code-based conditions). Thus, as an additional example, the schedule item 64, cost item 66, and model item 62, may further be mapped with associated documents 88 to create a 6D mapping, as shown in FIG. 23C. Thus, in illustrative embodiments, 5D mapping includes at least schedule, model, and cost items, but may include additional dimensions while still being considered as a 5D mapping system 17. Some embodiments may also use the 5D mapping system 17 to map less than 5-dimensions (i.e., not all of cost, model, and schedule). Furthermore, illustrative embodiments may include multi-dimensional mapping, by mapping documents, logistics items, metadata, and other information in addition to or alternatively from model, cost, and schedule. Accordingly, the term 5D is not intended to limit the amount and/or variety of types of items that may be mapped using illustrative embodiments.

Various embodiments of the invention may be implemented at least in part in any conventional computer programming language. For example, some embodiments may be implemented in a procedural programming language (e.g., "C"), as a visual programming process, or in an object oriented programming language (e.g., "C++"). Other embodiments of the invention may be implemented as a pre-configured, stand-along hardware element and/or as preprogrammed hardware elements (e.g., application specific integrated circuits, FPGAs, and digital signal processors), or other related components.

In an alternative embodiment, the disclosed apparatus and methods (e.g., see the methods described above) may be implemented as a computer program product for use with a computer system. Such implementation may include a series of computer instructions fixed either on a tangible, non-transitory, non-transient medium, such as a computer readable medium (e.g., a diskette, CD-ROM, ROM, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). In fact, some embodiments may be implemented in a software-as-a-service model ("SAAS") or cloud computing model. Of course, some embodiments of the invention may be implemented as a combination of both software (e.g., a computer program product) and hardware. Still other embodiments of the invention are implemented as entirely hardware, or entirely software.

Although the above discussion discloses various exemplary embodiments of the invention, it should be apparent that those skilled in the art can make various modifications that will achieve some of the advantages of the invention without departing from the true scope of the invention.

What is claimed is:

1. A system for mapping of a capital project, the system comprising:
   at least one hardware processor;
   a model item database executed by the at least one hardware processor to contain thousands of model items from a model representing capital project components of the capital project, corresponding to a plurality of model item codes, including a first model item of a plurality of model items corresponding to a first model item code of the plurality of model item codes, the first model item code including a first assembly code;
   a schedule item database executed by the at least one hardware processor to contain a work breakdown structure including thousands of schedule items, each corresponding to a scheduled capital project construction activity of a capital project construction schedule, and corresponding to a plurality of schedule item codes, including a first schedule item of a plurality of schedule items corresponding to a first schedule item code of the plurality of schedule item codes, the first schedule item code including a second assembly code;
   a cost item database executed by the at least one hardware processor to contain a cost breakdown structure including thousands of cost items representing a portion of a budget for the capital project construction schedule and the capital project components, corresponding to a plurality of cost items corresponding to a plurality of cost item codes, including a first cost item corresponding to a first cost item code of the plurality of cost item codes, the first cost item code including a third assembly code;
   a code extraction engine executed by the at least one hardware processor to:
      extract and import, from the plurality of model item codes, the first model item code according to a first classification structure from a building information modeling platform by way of a 3D model interface using predefined uniformat and masterformat of the first classification structure,
      extract and import from the plurality of schedule item codes, the first schedule item code according to a second classification structure from a project management platform by way of a schedule interface,
      extract and import from the plurality of cost item codes, the first cost item code according to a third classification structure from an enterprise project management cost platform by way of a cost construction interface,
      identify remaining items among the plurality of model item codes, the plurality of schedule item codes and the plurality of cost item codes, that were imported with missing instance codes because of an error during the importing, and
      identify, among the plurality of model item codes, the plurality of schedule item codes, and the plurality of cost item codes, other items imported with inaccurate instance codes entered incorrectly that need to be mapped;
   a code creator and modifier module executed by the at least one hardware processor to:
      add the missing instance codes by importing only those type of codes that are generic to a type of item regardless of the capital project, and
      modify the inaccurate instance codes with the added missing codes, and subsequently storing the modified instance codes in the model item database, the schedule item database, and the cost item database respectively;
   a rules engine executed by the at least one hardware processor to create, based on the extracted first model item code, first schedule item code, and first cost item code, a plurality of code-based rules for mapping the plurality of model items model items from the model item database, the plurality of schedule items from the schedule item database, and the plurality of cost items from the cost item database, the plurality of rules including a first rule including matching at least two of the first assembly code, the second assembly code, and the third assembly code;
   a mapping engine executed by the at least one hardware processor to communicate with the model item database, the schedule item database, and the cost item database, the mapping engine further executed by the at least one hardware processor to:
      generate a mapping including the first model item, the first schedule item, and the first cost item based on the first rule requiring the first schedule item and the first model item to start with a same sequence to create a schedule-model link and a second rule requiring the first schedule item and the first cost item to start with the same sequence to create a schedule-cost link, and
      automatically link the first model item with the first cost item based on implicit mapping inferred from the schedule-model link and the schedule-cost link;
   an automated comparator configured to:
      detect an update of the first model item code, the first cost item code, and the first schedule item code,
      automatically compare the updated first model item code, first cost item code, and first schedule item code, and
      instruct the mapping engine to reapply the plurality of rules to automatically reapply the mapping with the updated first model item code, first cost item code, and first schedule item code; and
   a graphical user interface configured to:
      receive a selection of one of the first model item, the first schedule item, and the first cost schedule item that are mapped together, and
      output a visualization of remaining two of the first model item, the first schedule item, and the first cost item based on the implicit and reapplied mappings, and the received selection.

2. The system as defined by claim 1, wherein each of the first assembly code, the second assembly code, and the third assembly code have at least a portion of identical characters, and the first rule matches the identical characters.

3. The system as defined by claim 1, further comprising a quantification module executed by the at least one hardware processor to receive the model and determine quantities of the plurality of model items, the system further executed by the at least one hardware processor to output the determined quantities of the plurality of model items to the project management cost platform.

4. The system as defined by claim 3, further comprising an automated comparator executed by the at least one hardware processor to compare an updated version of the model with an existing version of the model to identify new, deleted, or revised model items.

5. The system as defined by claim 4, wherein the quantification module is further executed by the at least one hardware processor to determine quantities of the revised model items, and the automated comparator is further executed by the at least one hardware processor to update the plurality of cost items based on the quantities of the revised model items.

6. The system as defined by claim 1, wherein the first rule requires an exact match of two of the following three types of items: the first model item code, the first cost item code, and the first schedule item code, and the mapping engine is further configured to map one or more documents with the plurality of model items, the plurality of schedule items, or the plurality of cost items based on the first rule.

7. A method for mapping of a capital project, the method comprising:
    storing, at a model item database, thousands of model items from a model representing capital project components of the capital project, corresponding to a plurality of model item codes, including a first model item of a plurality of model items corresponding to a first model item code of the plurality of model item codes, the first model item code including a first assembly code;
    storing, at a schedule item database, a work breakdown structure including thousands of schedule items, each corresponding to a scheduled capital project construction activity of a capital project construction schedule, and corresponding to a plurality of schedule item codes, including a first schedule item of a plurality of schedule items corresponding to a first schedule item code of the plurality of schedule item codes, the first schedule item code including a second assembly code;
    storing, at a cost item database, a cost breakdown structure including thousands of cost items representing a portion of a budget for the capital project construction schedule and the capital project components, corresponding to a plurality of cost items corresponding to a plurality of cost item codes, including a first cost item corresponding to a first cost item code of the plurality of cost item codes, the first cost item code including a third assembly code;
    executing a code extraction engine by at least one hardware processor to:
        extract and import, from the plurality of model item codes, the first model item code according to a first classification structure from a building information modeling platform by way of a 3D model interface using predefined uniformat and masterformat of the first classification structure,
        extract and import from the plurality of schedule item codes, the first schedule item code according to a second classification structure from a project management platform by way of a schedule interface,
        extract and import from the plurality of cost item codes, the first cost item code according to a third classification structure from an enterprise project management cost platform by way of a cost construction interface,
        identify remaining items among the plurality of model item codes, the plurality of schedule item codes and the plurality of cost item codes, that were imported with missing instance codes because of an error during the importing, and identify, among the plurality of model item codes, the plurality of schedule item codes, and the plurality of cost item codes, other items imported with inaccurate instance codes entered incorrectly that need to be mapped;
    executing a code creator and modifier module by the at least one hardware processor to:
        add the missing instance codes by importing only those type of codes that are generic to a type of item regardless of the capital project, and
        modify the inaccurate instance codes with the added missing codes, and subsequently storing the modified instance codes in the model item database, the schedule item database, and the cost item database respectively;
    executing a rules engine by the at least one hardware processor to create, based on the extracted first model item code, first schedule item code, and first cost item code, a plurality of code-based rules for mapping the plurality of model items model items from the model item database, the plurality of schedule items from the schedule item database, and the plurality of cost items from the cost item database, the plurality of rules including a first rule including matching at least two of the first assembly code, the second assembly code, and the third assembly code;
    executing a mapping engine by the at least one hardware processor to communicate with the model item database, the schedule item database, and the cost item database, the mapping engine further executed by the at least one hardware processor to:
        generate a mapping including the first model item, the first schedule item, and the first cost item based on the first rule requiring the first schedule item and the first model item to start with a same sequence to create a schedule-model link and a second rule requiring the first schedule item and the first cost item to start with the same sequence to create a schedule-cost link, and
        automatically link the first model item with the first cost item based on implicit mapping inferred from the schedule-model link and the schedule-cost link;
    executing an automated comparator by the at least one hardware processor to:
        detect an update of the first model item code, the first cost item code, and the first schedule item code,
        automatically compare the updated first model item code, first cost item code, and first schedule item code, and
        instruct the mapping engine to reapply the plurality of rules to automatically reapply the mapping with the updated first model item code, first cost item code, and first schedule item code;
    receiving, at a graphical user interface, a selection of one of the first model item, the first schedule item, and the first cost schedule item that are mapped together; and
    outputting, a graphical user interface, a visualization of remaining two of the first model item, the first schedule item, and the first cost item based on the implicit and reapplied mappings, and the received selection.

8. The method of claim 7, wherein each of the first assembly code, the second assembly code, and the third assembly code have at least a portion of identical characters, and the first rule matches the identical characters.

9. The method of claim 7, further comprising:
    receiving, at a quantification module, the model and determine quantities of the plurality of model items, and
    output the determined quantities of the plurality of model items to the project management cost platform.

10. The method of claim 9, further comprising:
    comparing, by an automated comparator, an updated version of the model with an existing version of the model to identify new, deleted, or revised model items.

11. The method of claim 10, further comprising:
determining, by the quantification module, quantities of the revised model items, and the automated comparator is further executed by the at least one hardware processor to update the plurality of cost items based on the quantities of the revised model items.

12. The method of claim 7, wherein the first rule requires an exact match of two of the following three types of items: the first model item code, the first cost item code, and the first schedule item code, and the mapping engine is further configured to map one or more documents with the plurality of model items, the plurality of schedule items, or the plurality of cost items based on the first rule.

13. A non-transitory computer readable medium comprising instructions stored thereon for mapping of a capital project, which when executed by a hardware processor perform:
storing, at a model item database, thousands of model items from a model representing capital project components of the capital project, corresponding to a plurality of model item codes, including a first model item of a plurality of model items corresponding to a first model item code of the plurality of model item codes, the first model item code including a first assembly code;
storing, at a schedule item database, a work breakdown structure including thousands of schedule items, each corresponding to a scheduled capital project construction activity of a capital project construction schedule, and corresponding to a plurality of schedule item codes, including a first schedule item of a plurality of schedule items corresponding to a first schedule item code of the plurality of schedule item codes, the first schedule item code including a second assembly code;
storing, at a cost item database, a cost breakdown structure including thousands of cost items representing a portion of a budget for the capital project construction schedule and the capital project components, corresponding to a plurality of cost items corresponding to a plurality of cost item codes, including a first cost item corresponding to a first cost item code of the plurality of cost item codes, the first cost item code including a third assembly code;
executing a code extraction engine to:
extract and import, from the plurality of model item codes, the first model item code according to a first classification structure from a building information modeling platform by way of a 3D model interface using predefined uniformat and masterformat of the first classification structure,
extract and import from the plurality of schedule item codes, the first schedule item code according to a second classification structure from a project management platform by way of a schedule interface,
extract and import from the plurality of cost item codes, the first cost item code according to a third classification structure from an enterprise project management cost platform by way of a cost construction interface,
identify remaining items among the plurality of model item codes, the plurality of schedule item codes and the plurality of cost item codes, that were imported with missing instance codes because of an error during the importing, and
identify, among the plurality of model item codes, the plurality of schedule item codes, and the plurality of cost item codes, other items imported with inaccurate instance codes entered incorrectly that need to be mapped;
executing a code creator and modifier module to:
add the missing instance codes by importing only those type of codes that are generic to a type of item regardless of the capital project, and
modify the inaccurate instance codes with the added missing codes, and subsequently storing the modified instance codes in the model item database, the schedule item database, and the cost item database respectively; and
executing a rules engine to create, based on the extracted first model item code, first schedule item code, and first cost item code, a plurality of code-based rules for mapping the plurality of model items model items from the model item database, the plurality of schedule items from the schedule item database, and the plurality of cost items from the cost item database, the plurality of rules including a first rule including matching at least two of the first assembly code, the second assembly code, and the third assembly code;
executing a mapping engine to communicate with the model item database, the schedule item database, and the cost item database, the mapping engine further executed to:
generate a mapping including the first model item, the first schedule item, and the first cost item based on the first rule requiring the first schedule item and the first model item to start with a same sequence to create a schedule-model link and a second rule requiring the first schedule item and the first cost item to start with the same sequence to create a schedule-cost link, and
automatically link the first model item with the first cost item based on implicit mapping inferred from the schedule-model link and the schedule-cost link;
executing an automated comparator to:
detect an update of the first model item code, the first cost item code, and the first schedule item code,
automatically compare the updated first model item code, first cost item code, and first schedule item code, and
instruct the mapping engine to reapply the plurality of rules to automatically reapply the mapping with the updated first model item code, first cost item code, and first schedule item code;
receiving, at a graphical user interface, a selection of one of the first model item, the first schedule item, and the first cost schedule item that are mapped together; and
outputting, a graphical user interface, a visualization of remaining two of the first model item, the first schedule item, and the first cost item based on the implicit and reapplied mappings, and the received selection.

14. The non-transitory computer readable medium of claim 13, wherein each of the first assembly code, the second assembly code, and the third assembly code have at least a portion of identical characters, and the first rule matches the identical characters.

15. The non-transitory computer readable medium of claim 13, where the instructions are further executed by the hardware processor to receive the model and determine quantities of the plurality of model items, and output the determined quantities of the plurality of model items to the project management cost platform.

16. The non-transitory computer readable medium of claim 15, where the instructions are further executed by the hardware processor to compare an updated version of the model with an existing version of the model to identify new, deleted, or revised model items.

17. The non-transitory computer readable medium of claim 16, where the instructions are further executed by the hardware processor to determine quantities of the revised model items, and to update the plurality of cost items based on the quantities of the revised model items.

18. The non-transitory computer readable medium of claim 13, wherein the first rule requires an exact match of two of the following three types of items: the first model item code, the first cost item code, and the first schedule item code, and wherein the instructions are further executed by the hardware processor to map one or more documents with the plurality of model items, the plurality of schedule items, or the plurality of cost items based on the first rule.

* * * * *